US012654348B2

(12) United States Patent
Shabazian et al.

(10) Patent No.: US 12,654,348 B2
(45) Date of Patent: Jun. 16, 2026

(54) SLICER FOR ITEMS AND METHOD OF MANUFACTURING AND USING THE SAME

(71) Applicant: BonTek, LLC, East Orleans, MA (US)

(72) Inventors: Michael Shabazian, East Orleans, MA (US); John Porter, Epping, NH (US)

(73) Assignee: BonTek, LLC, East Orleans, MA (US)

( * ) Notice: Subject to any disclaimer, the term of this patent is extended or adjusted under 35 U.S.C. 154(b) by 233 days.

(21) Appl. No.: 18/236,825

(22) Filed: Aug. 22, 2023

(65) Prior Publication Data

US 2024/0066736 A1 Feb. 29, 2024

Related U.S. Application Data

(60) Provisional application No. 63/532,168, filed on Aug. 11, 2023, provisional application No. 63/400,275, filed on Aug. 23, 2022.

(51) Int. Cl.
*B26B 29/06* (2006.01)

(52) U.S. Cl.
CPC .................................. *B26B 29/063* (2013.01)

(58) Field of Classification Search
CPC .......... B26B 29/063; B26D 3/30; B26D 1/08; B26D 7/02; Y10S 83/932; A47G 21/062; A21C 15/04; Y10T 83/695; Y10T 83/0267
See application file for complete search history.

(56) References Cited

U.S. PATENT DOCUMENTS

| | | | | |
|---|---|---|---|---|
| 5,431,078 | A * | 7/1995 | Ricard | B26B 29/063 83/870 |
| 5,690,013 | A * | 11/1997 | Kanarek | A21C 15/04 83/870 |
| 7,007,583 | B1 * | 3/2006 | Fiola | B26B 29/063 83/870 |
| 7,954,408 | B1 | 6/2011 | Keely, Sr. | |
| 9,211,651 | B2 * | 12/2015 | Xydis | B26B 29/063 |
| 2006/0073257 | A1 * | 4/2006 | Strenio | B26D 3/30 426/614 |

(Continued)

OTHER PUBLICATIONS

Cenleoha, "Adjustable Bagel Cutter Slicer for Small and Large Bagels—Bagel Cutter Bread Slicer Bagel Slicer Bagel holder for Buns, Muffins and Rolls," Mar. 18, 2023, retrieved via Amazon.com on Aug. 11, 2023, 8 pages.

(Continued)

*Primary Examiner* — Jonathan G Riley
(74) *Attorney, Agent, or Firm* — HG LAW LLP

(57) ABSTRACT

Devices and methods are provided for slicing an item such as a bagel. One slicer has an upper assembly, which has an upper interior portion, and a blade; and a lower assembly, separable from the upper assembly, has a holding plate to support the item when placed within the lower assembly, and movable centering plates to secure the item in a position that lies substantially in the center of the lower assembly to facilitate a substantially even bisection of the item when the upper assembly engages with the lower assembly. Another slicer has an upper assembly with interior vertical rails, and a blade affixed to the upper assembly within the rails; and a lower assembly similar to the first slicer with interior vertical rails containing a vertical slot down the center for receiving a knife for slicing items. The device cuts the item within about +/−one-sixteenth of an inch.

20 Claims, 47 Drawing Sheets

(56) References Cited

U.S. PATENT DOCUMENTS

2025/0276464 A1 9/2025 Shabazian et al.

OTHER PUBLICATIONS

Bagelpod, "Bagelpod Bagel Slicer Red Black Color Combination," Dec. 8, 2008, retrieved via Amazon.com on Aug. 11, 2023, 7 pages.
Halve Your Bagel Store, "Halve Your Bagel—Bagel Slicer, Durable Kitchen Gadgets & Apartment Essentials, Bagel Cutter for All Bagel Sizes, Dishwasher-Safe Bagel Cutter Slicer for Home, Bakeries, Coffee Shops, & More, White," Oct. 4, 2016, retrieved via Amazon.com on Aug. 11, 2023, 10 pages.
Hoan, "Hoan The Original Bagel Guillotine Universal Slicer, 9.25-Inch, White," Aug. 15, 2006, retrieved via Amazon.com on Aug. 11, 2023, 9 pages.
Yerdos, Yerdos Foldable Bread Cutting Bread Slicer Guide, Compact Sandwich Bagel Loaf Slicer & 4 Thickness Adjustable Plastic Household Toast, Aug. 12, 2020, retrieved via Amazon.com on Aug. 11, 2023, 8 pages.
Pampered Chef, "The Pampered Chef Bagel Grip Bagel Slicer #2437 Mint Condition," Aug. 8, 2023, retrieved via eBay.com on Aug. 11, 2023, 10 pages.

* cited by examiner

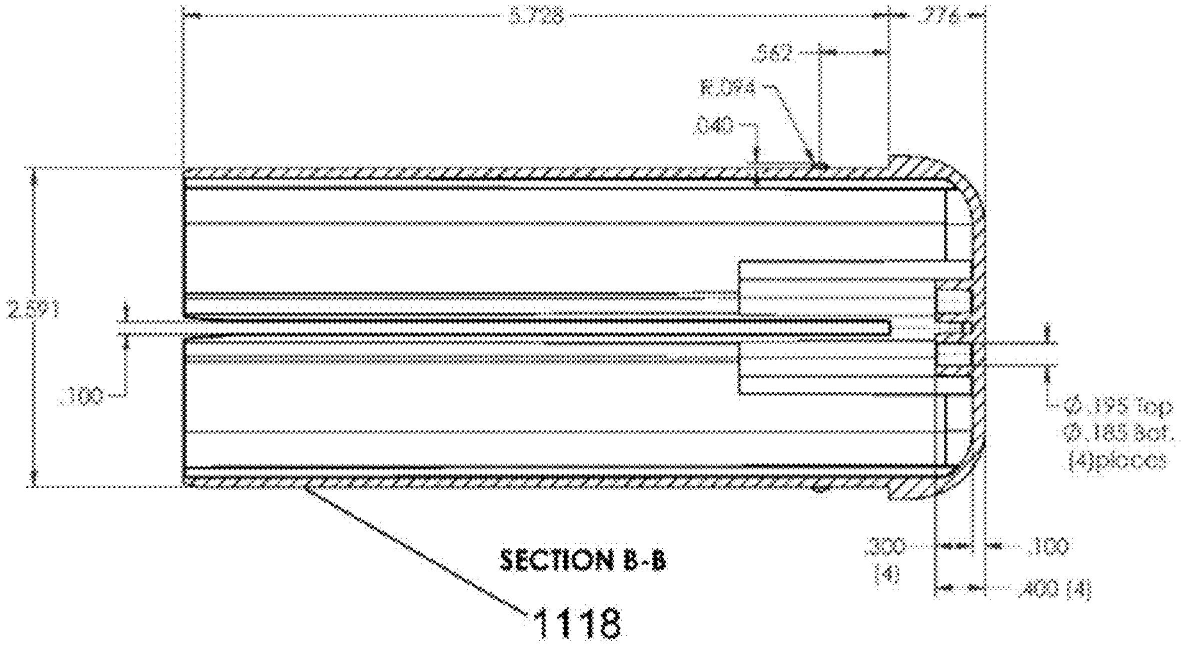
FIG. 11B4
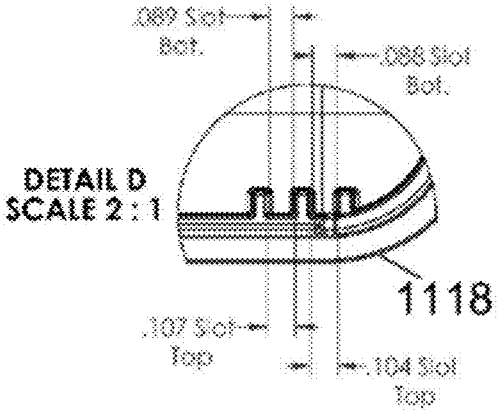
FIG. 11B5
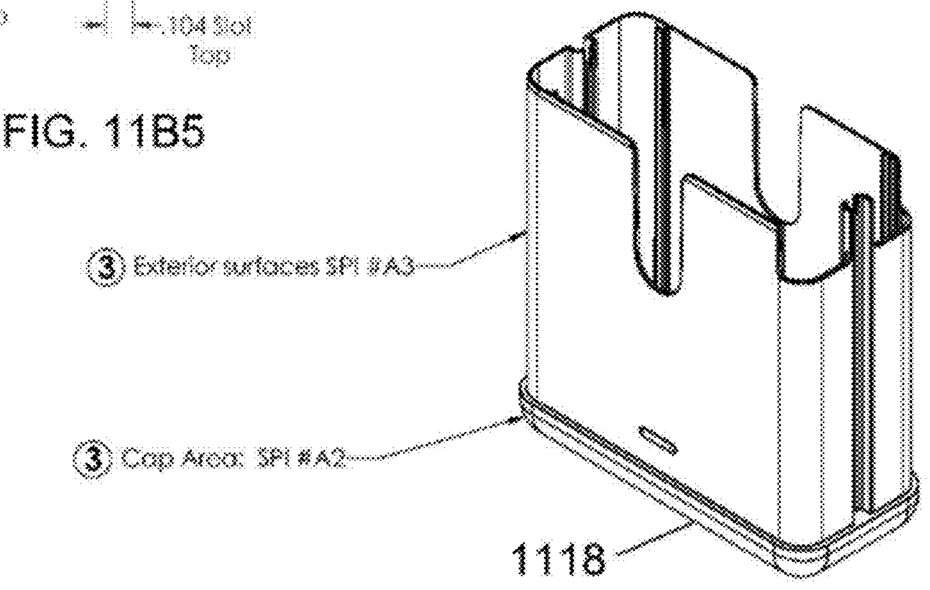
FIG. 11B6

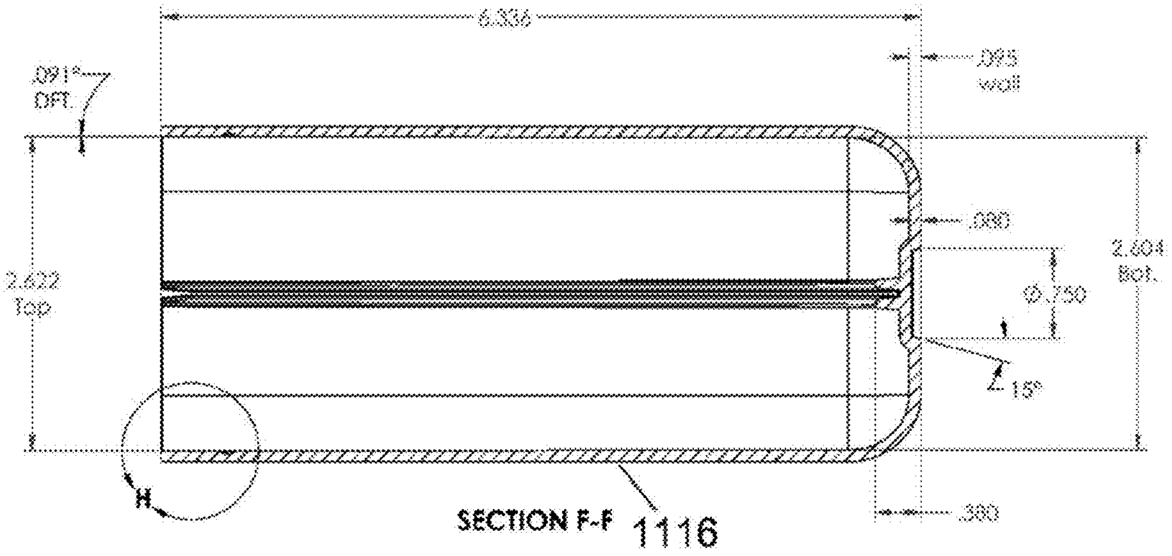
FIG. 11C3
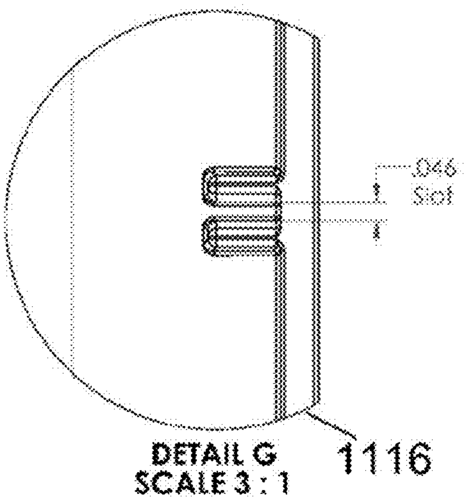
FIG. 11C4
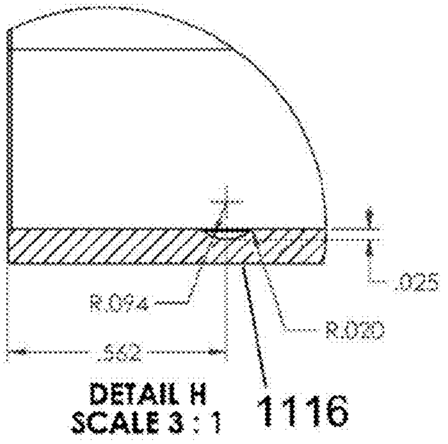
FIG. 11C5
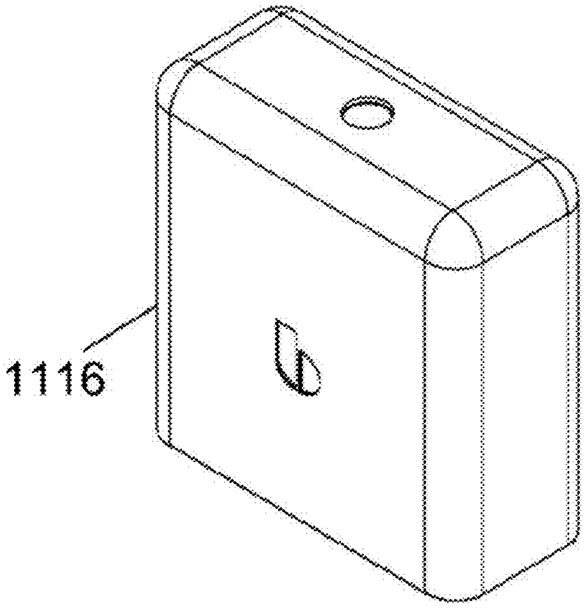
FIG. 11C6

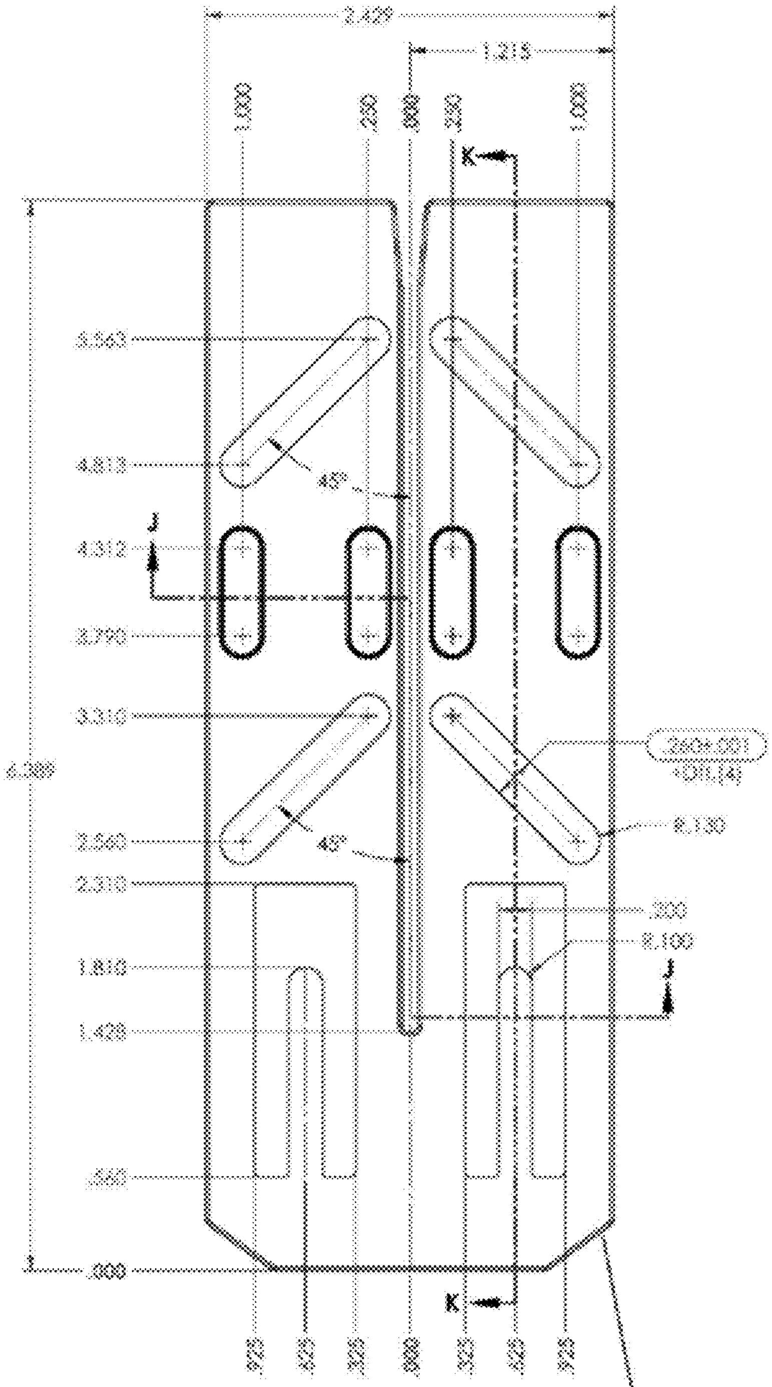
FIG. 11D1
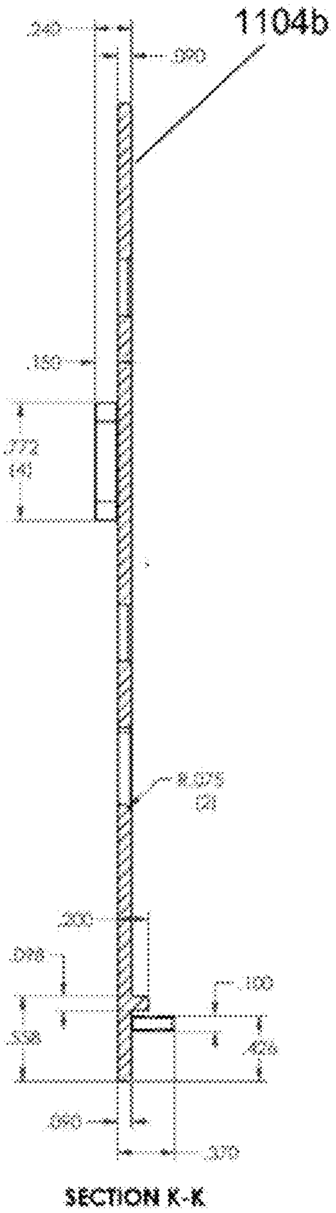
FIG. 11D3
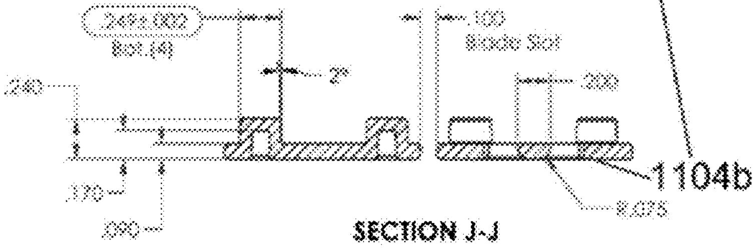
FIG. 11D2

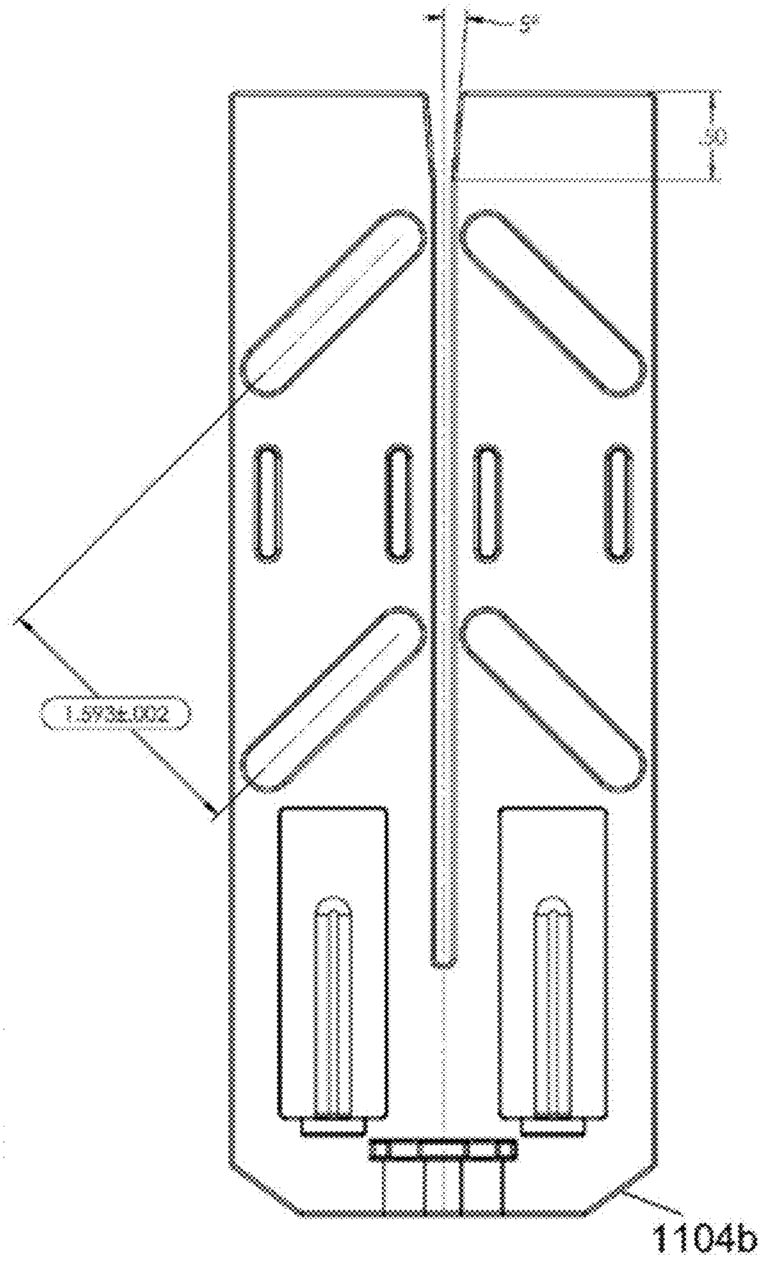
FIG. 11D4
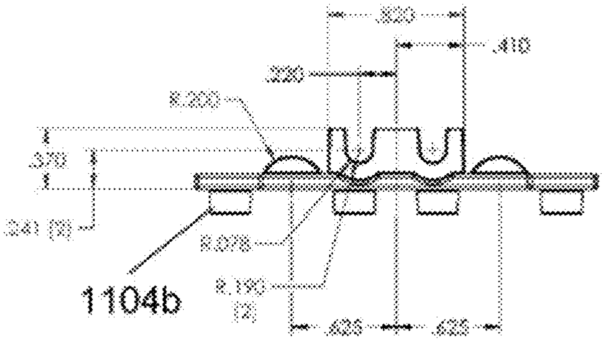
FIG. 11D5

FIG. 11D6
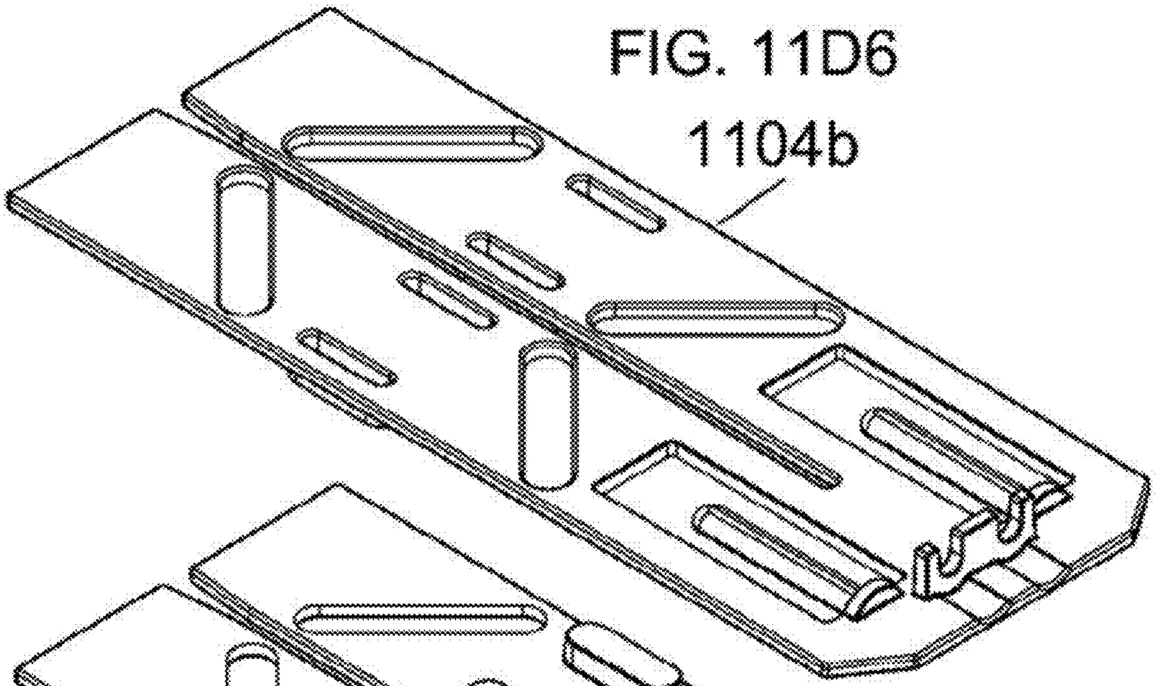
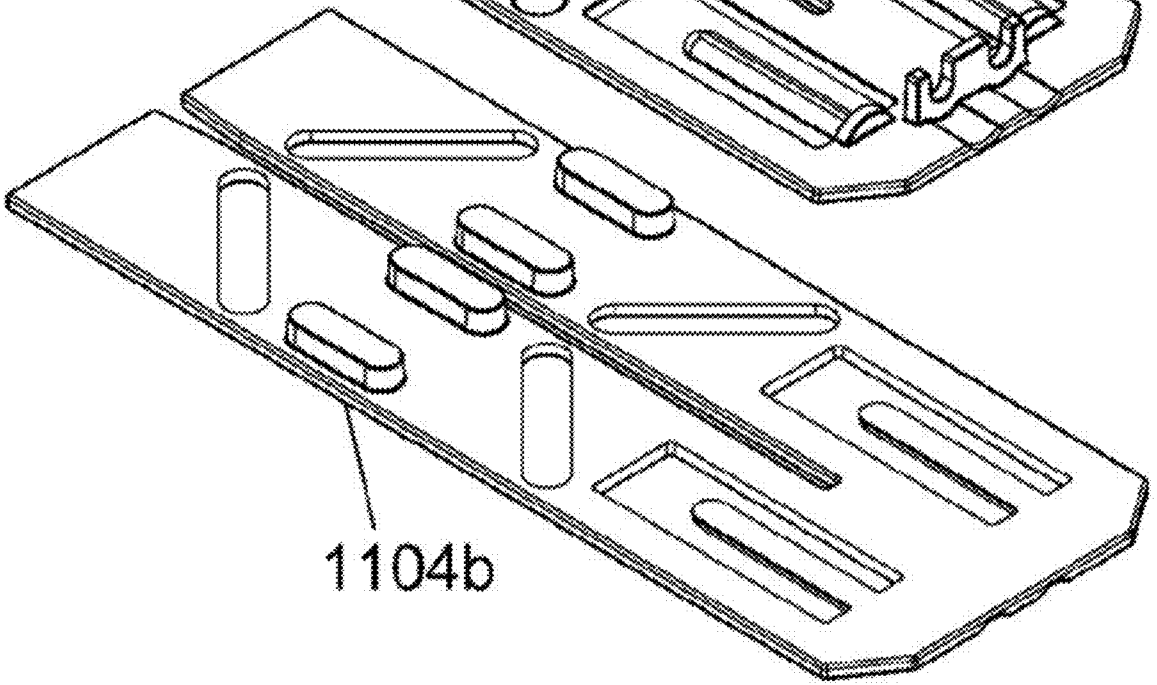
FIG. 11D7

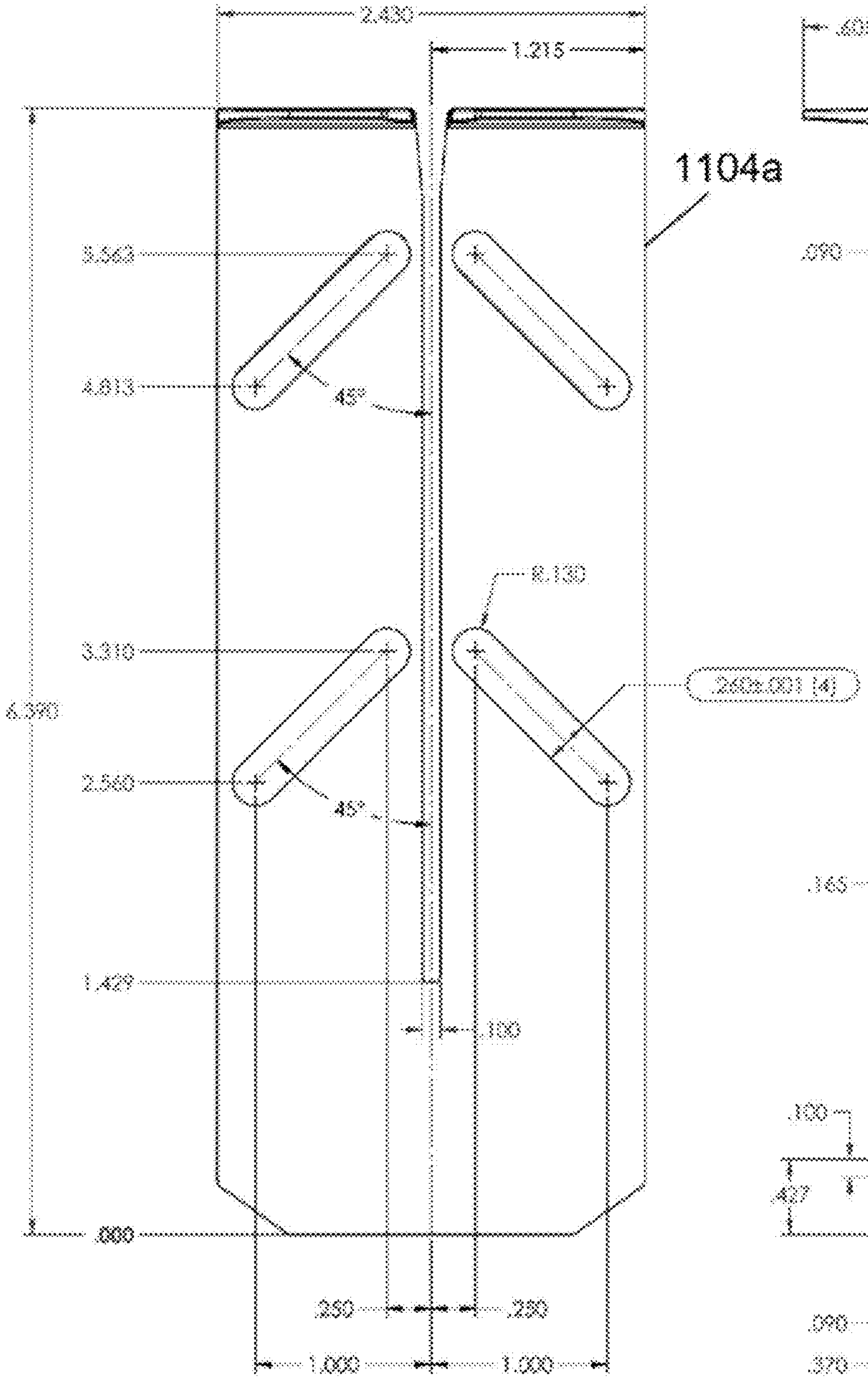
FIG. 11E1
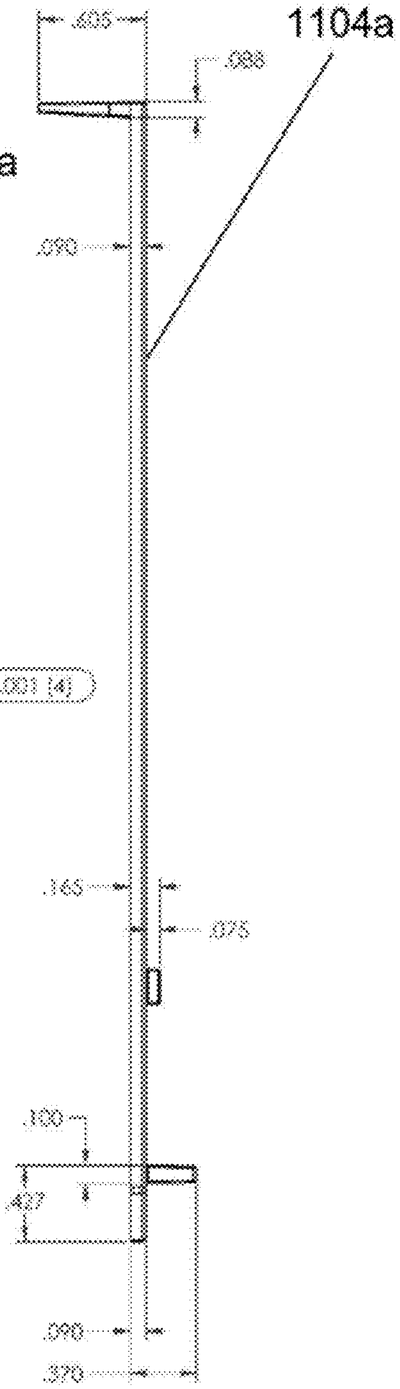
FIG. 11E3
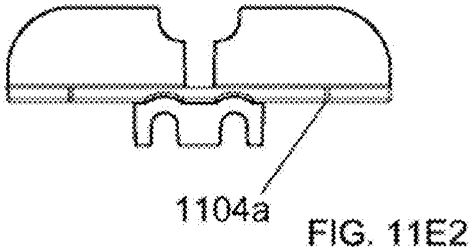
FIG. 11E2

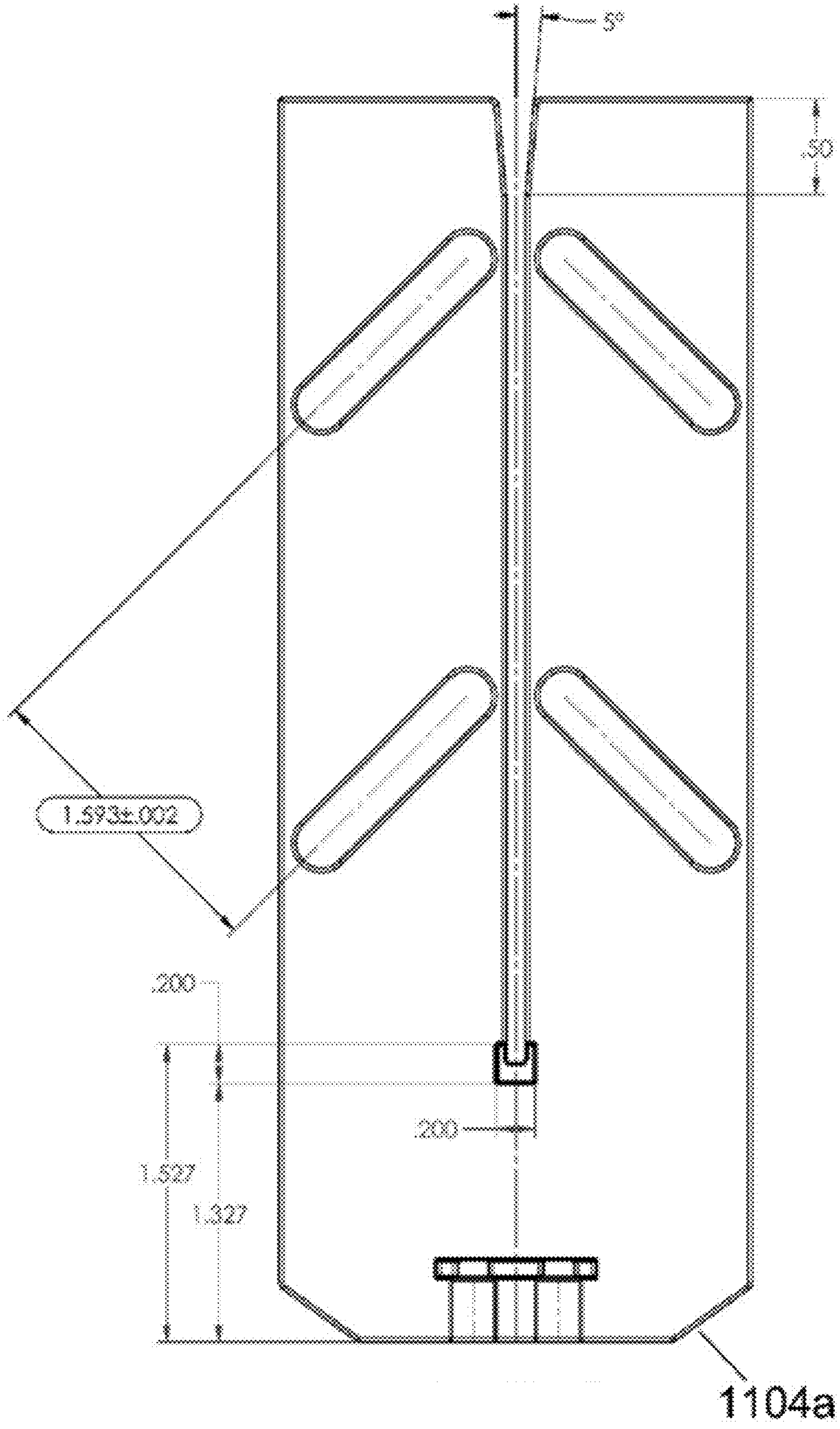
FIG. 11E4

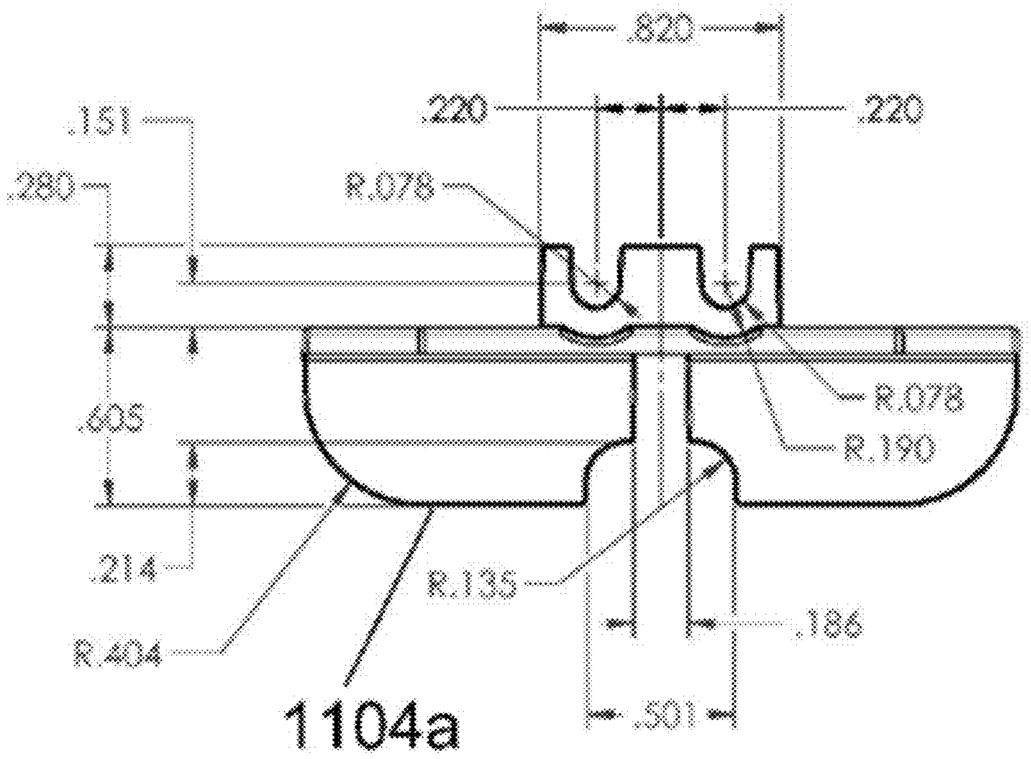
FIG. 11E5
FIG. 11E6
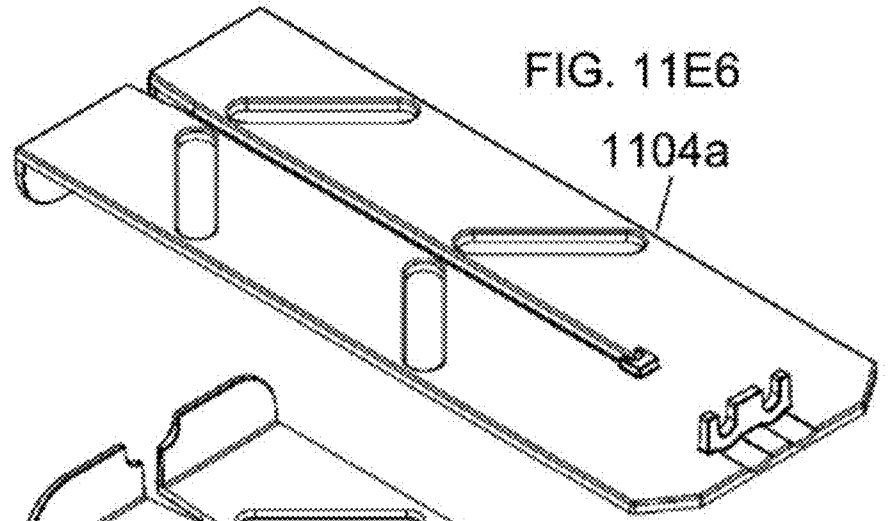
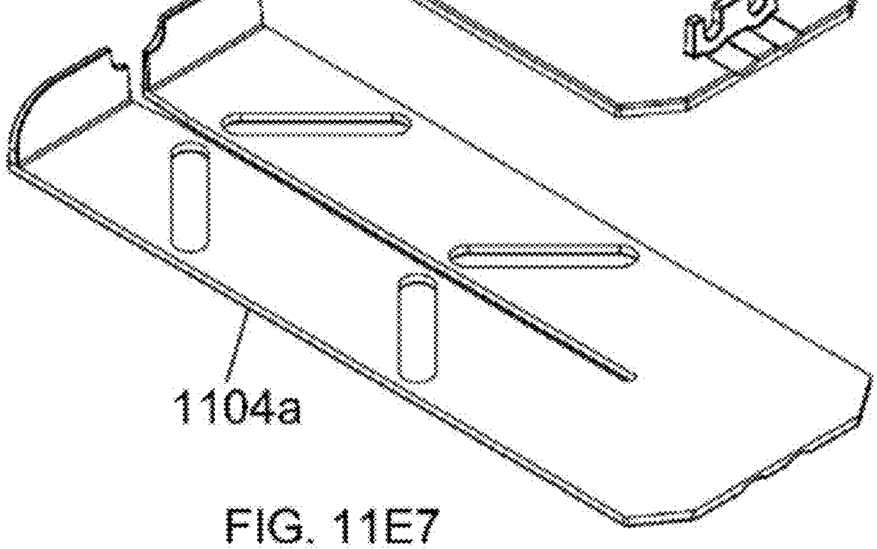
FIG. 11E7

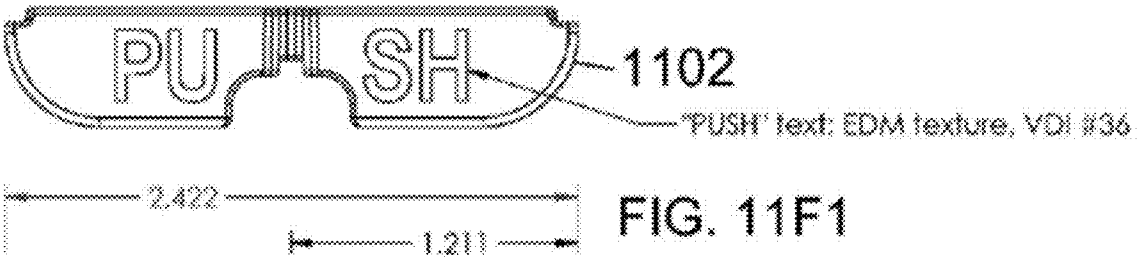
FIG. 11F1
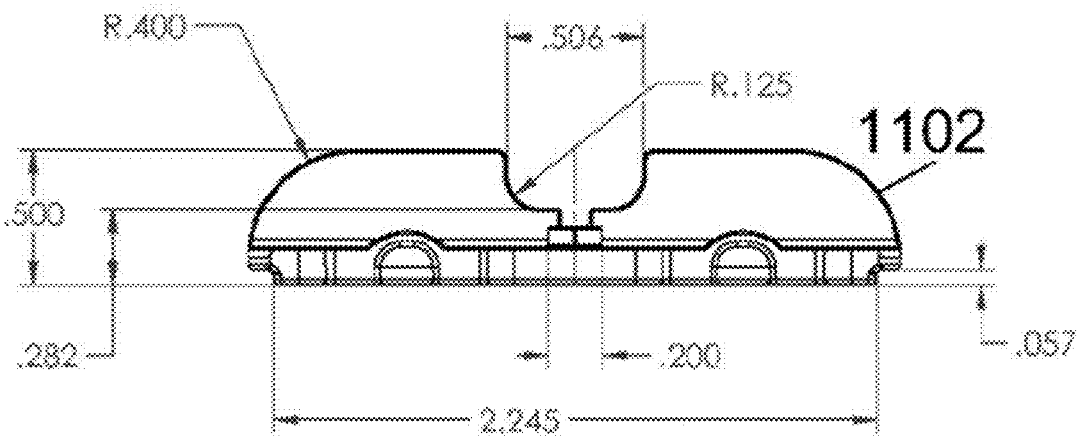
FIG. 11F3
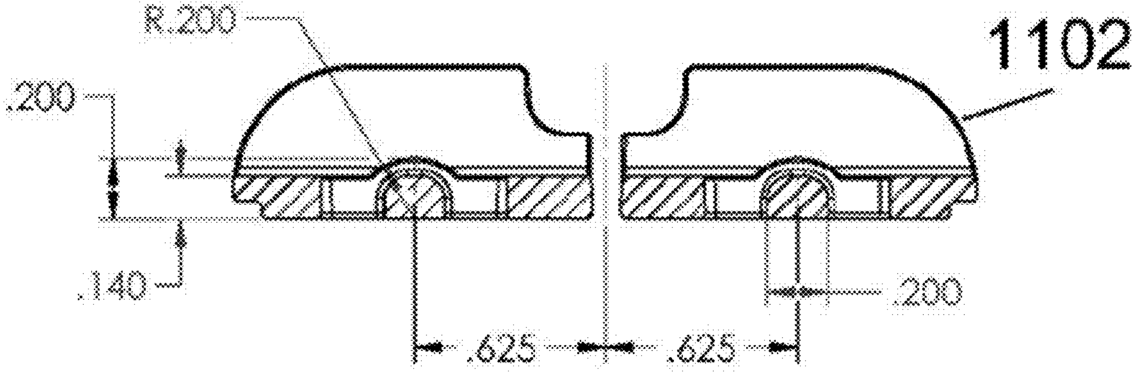
FIG. 11F5

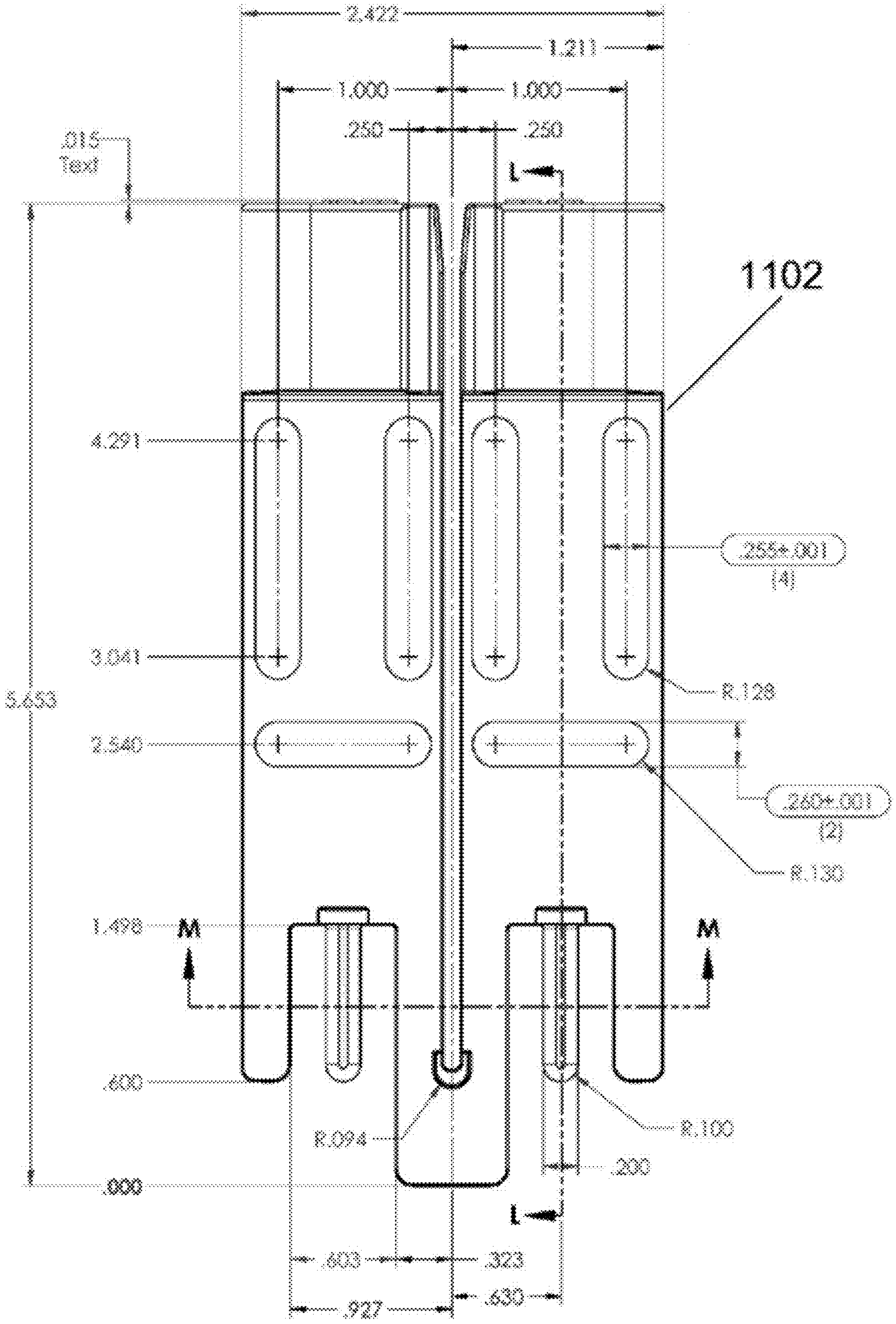
FIG. 11F2

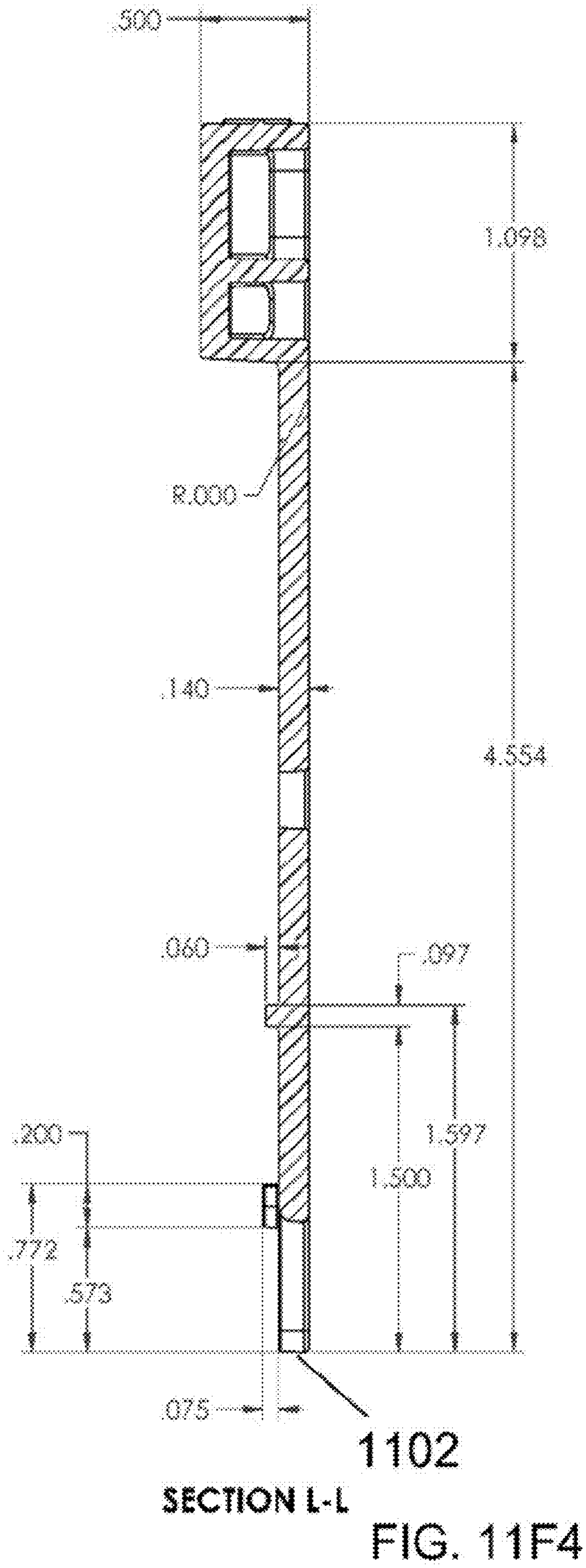
FIG. 11F4

FIG. 11F6
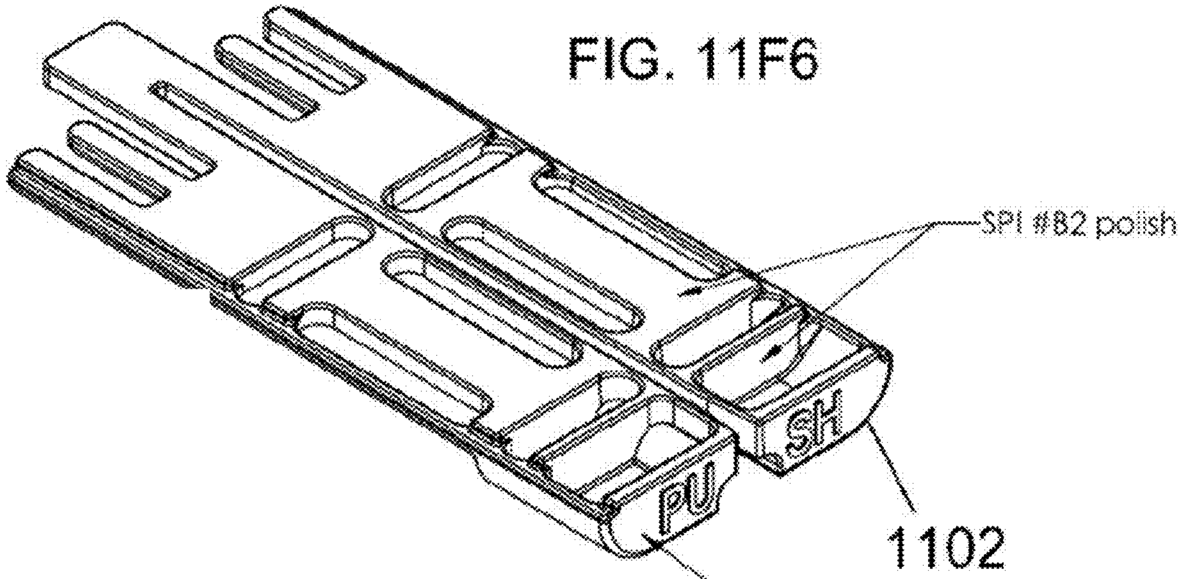
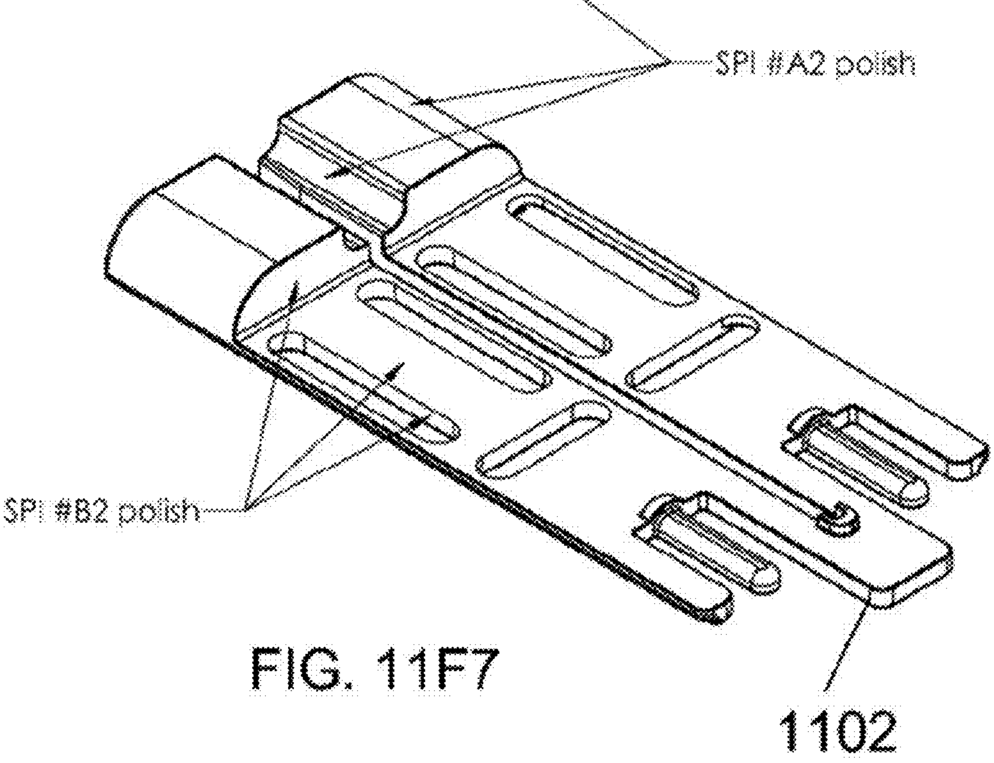
FIG. 11F7

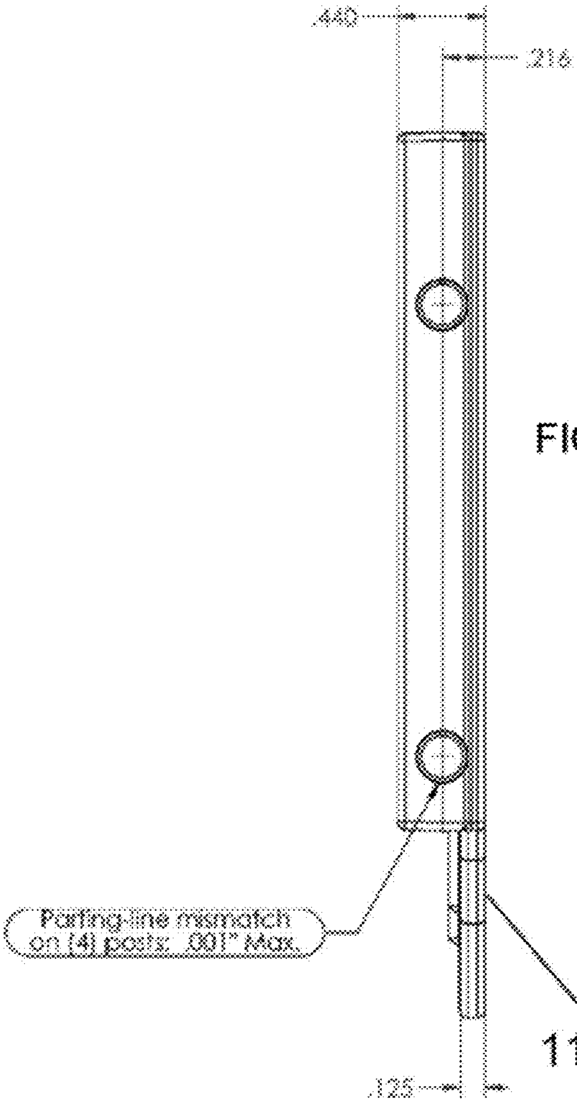
FIG. 11G3
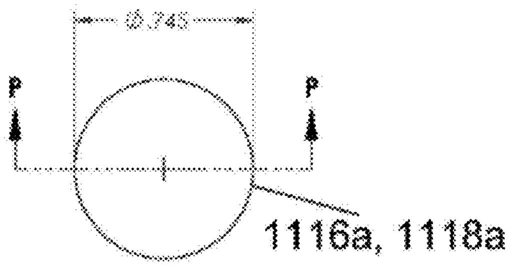
FIG. 11G5
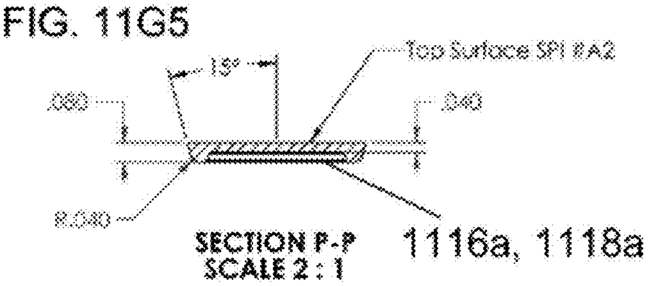
FIG. 11G6
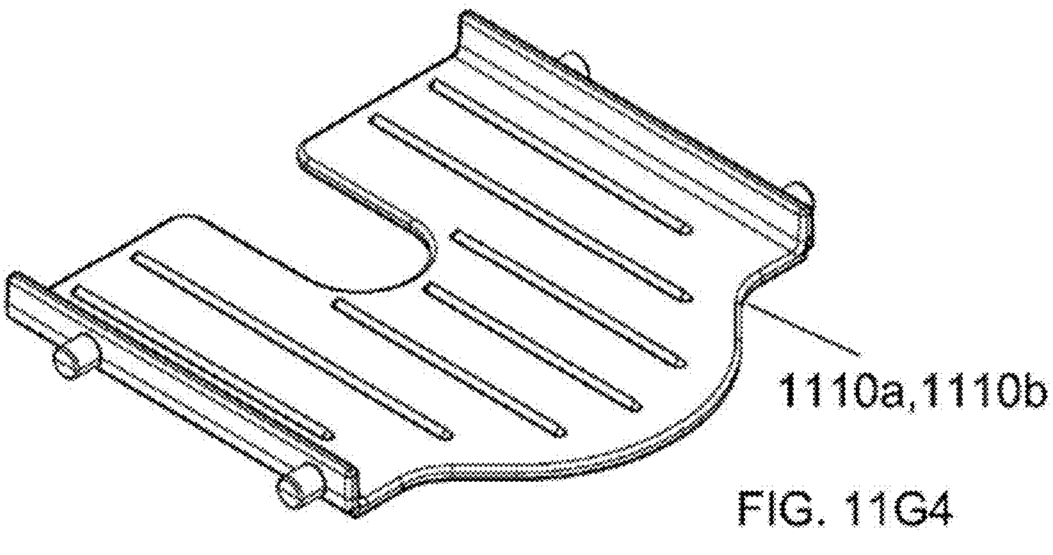
FIG. 11G4

SLICER FOR ITEMS AND METHOD OF MANUFACTURING AND USING THE SAME

CROSS-REFERENCE TO RELATED APPLICATIONS

This nonprovisional application claims the benefit of priority to U.S. Provisional Patent Application No. 63/400,275, titled “BONTEK BAGEL SLICER,” filed Aug. 23, 2022, and U.S. Provisional Patent Application No. 63/532,168, titled “SLICER FOR ITEMS AND METHOD OF MANUFACTURING AND USING THE SAME,” filed Aug. 11, 2023, the disclosures of which are hereby incorporated by reference herein in their entireties.

FIELD OF THE INVENTION

The present disclosure relates to a device for accurately, precisely, safely, adjustably, evenly, conveniently, and easily slicing an item, including a food item, such as a bagel, an English muffin, and the like.

SUMMARY

Devices used for slicing food items (e.g., bagels, English muffins, and the like) exist in a variety of forms that allow a user to bisect a food item to a degree of accuracy and precision. In some approaches, the cutting device may be handheld, in which case the user holds the device in one hand, with the food item in the other hand, and proceeds to insert the cutting device into the food item, while concurrently rotating the food item, to bisect the food item into halves. This approach, however, lacks precision due to the quality of the cut being susceptible to human error and increases the risk of self-inflicted injury by the user.

In some approaches, the cutting device may include a non-dynamic housing the user places the food item in as well as a blade that fits into the housing such that, when forced down by the user, the blade bisects the food item in a guillotine-like fashion. This approach also lacks precision because not every food item placed in the housing fits inside of it perfectly, so the housing’s inability to adjust its width to fit, secure, and center the food item prevents an even cut when the user presses down the blade. In addition, the guillotine-like cutting device may fail to include any safety measures (e.g., a protective plate) that guard the blade from potentially injuring the user. Also, with such approach, the blade may not include a serrated design, which is relatively less effective, and the relatively large size of the guillotine-like cutting device may be inconvenient for the user who wishes to stow away the cutting device in a drawer or cabinet.

In some approaches, a young child may get ahold of the top portion of the cutting device, including the blade, in which case they would be susceptible to cutting themself against the blade.

In some approaches, the cutting device may include a non-dynamic housing the user places the food item in as well as slots on both sides to allow the user to manually bisect the food item with a regular kitchen knife. This approach also lacks precision for the same reasons as the guillotine-like cutting device and some approaches can be cumbersome to use. The large and clunky size of the cutting device may be inconvenient for the user who wishes to stow away the cutting device in a drawer or cabinet. The aesthetics of the cutting device are not appealing to the modern, sophisticated consumer.

Thus, a need has arisen for improvement of devices for slicing items. Slicers are provided that improve accuracy, precision, safety (including child or elder safety and the like), adjustability, evenness, convenience, ease-of-use, aesthetics, and the like. Specifically, slicers are provided that address all of the foregoing in one device: (1) safety against self-inflicted injury, (2) a mechanism with the ability to center different-sized food items for even slicing, (3) the ability to use the included blade to slice through the food item for safety and convenience, (4) the ability to use a regular kitchen knife to slice through the food item if necessary due to the softness of the food item, (5) a form factor that can fit easily into a drawer or cabinet, and (6) an aesthetic that appeals to the modern, sophisticated consumer.

The present invention is not limited to the combination of the elements as listed herein and may be assembled in any combination of the elements as described herein.

These and other capabilities of the disclosed subject matter will be more fully understood after a review of the following figures, detailed description, and claims.

BRIEF DESCRIPTIONS OF THE DRAWINGS

The present disclosure, in accordance with one or more various embodiments, is described in detail with reference to the following figures. The drawings are provided for purposes of illustration only and merely depict non-limiting examples and embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

The embodiments herein may be better understood by referring to the following description in conjunction with the accompanying drawings, in which like reference numerals indicate identical or functionally similar elements, of which:

Figure 1:
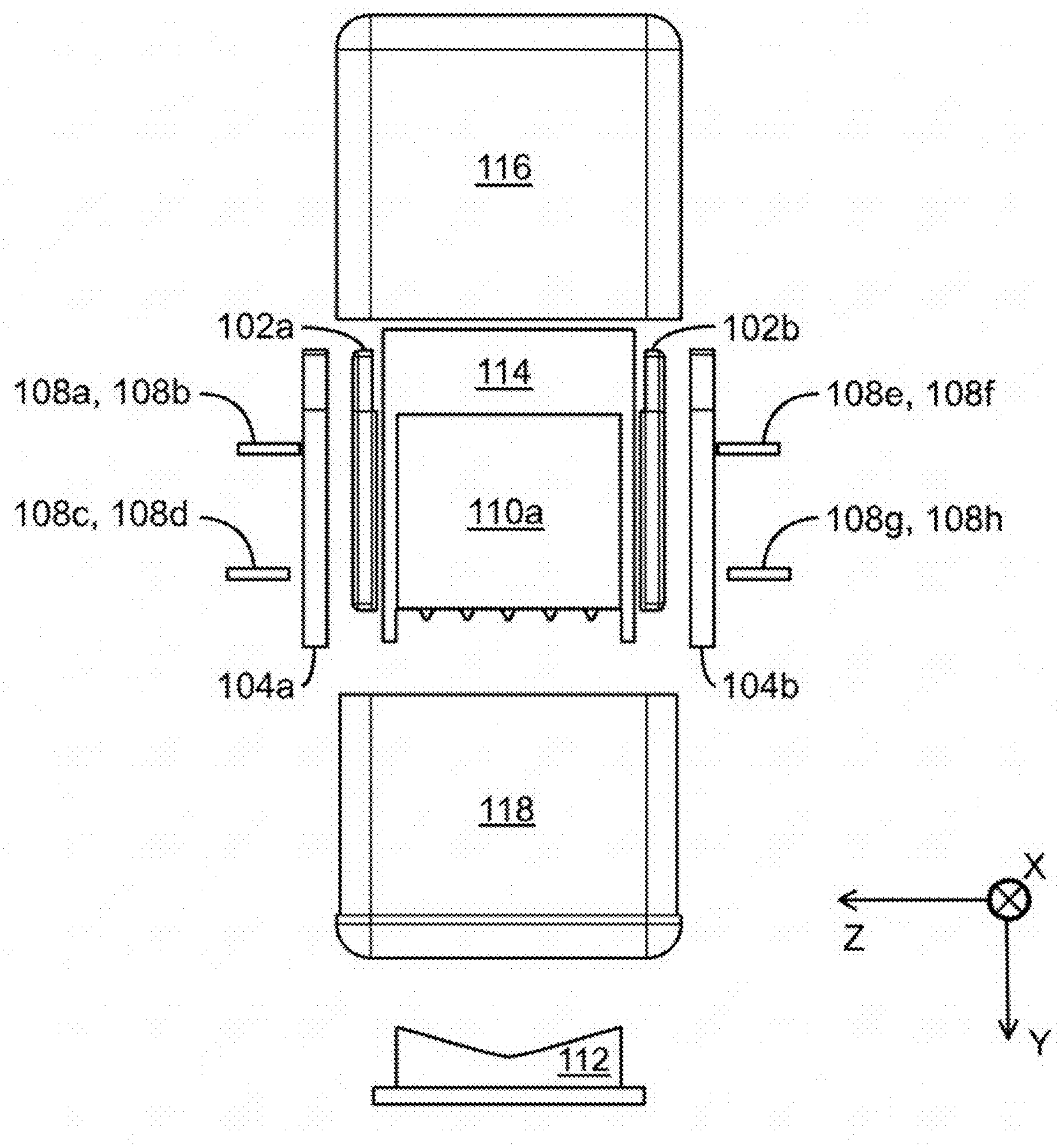
FIG. 1 shows an exploded view of a bagel slicing device, in accordance with some embodiments of the disclosure.
Figure 2A:
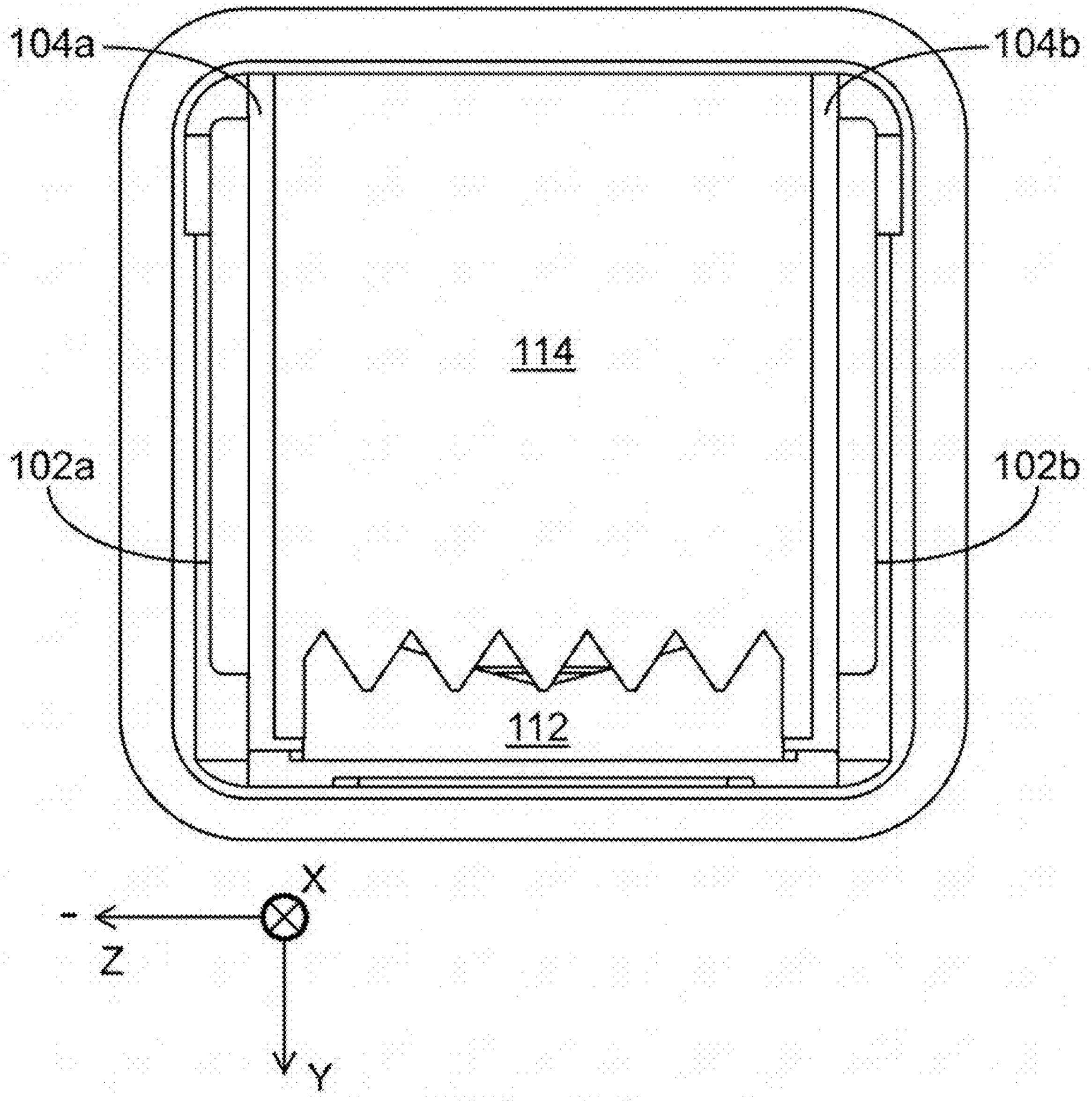
FIG. 2A shows a side section view of an engaged bagel slicing device, in accordance with some embodiments of the disclosure.
Figure 2B:
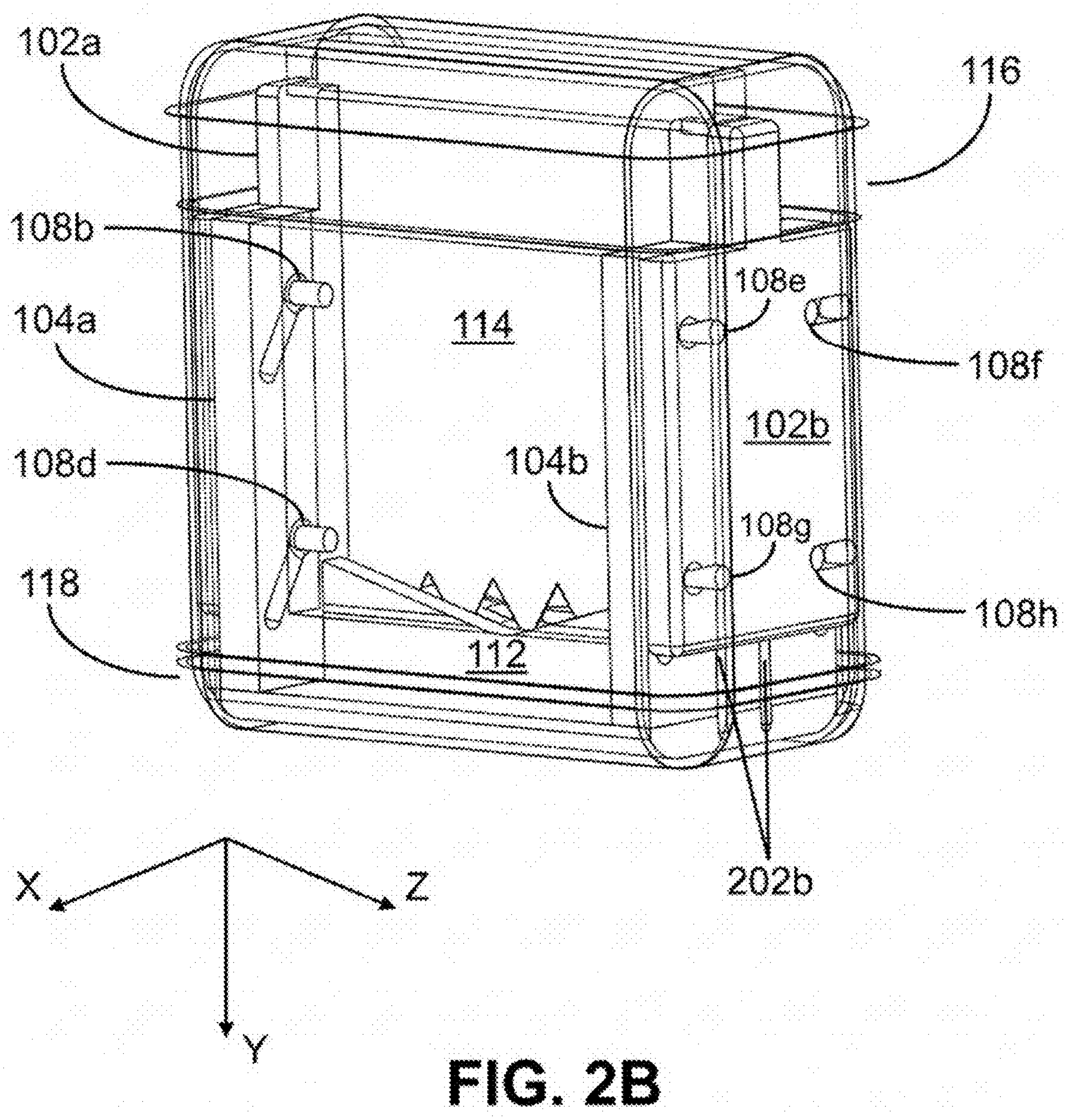
FIG. 2B shows a perspective view of the engaged bagel slicing device, in accordance with some embodiments of the disclosure.
Figure 3:
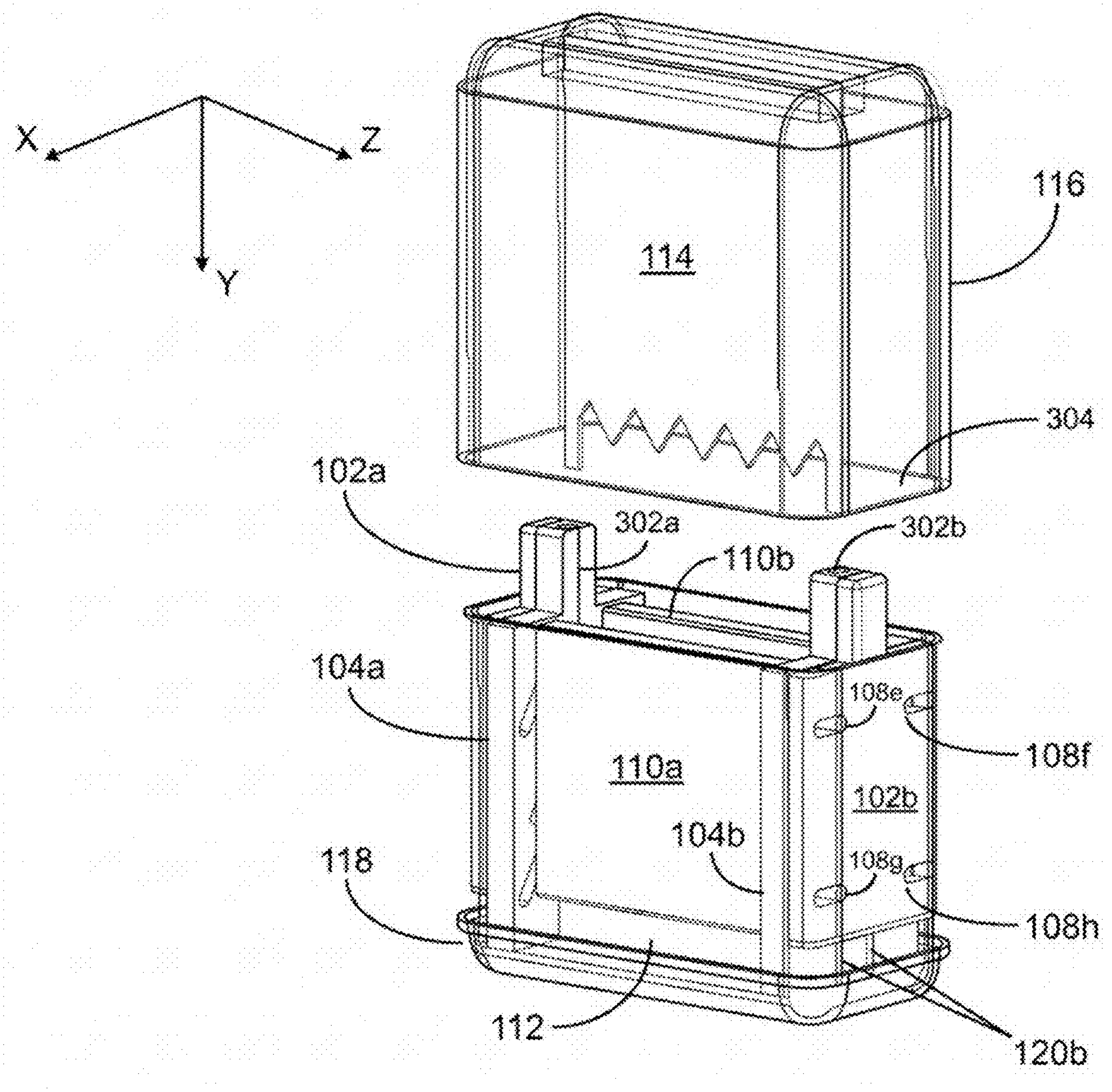
FIG. 3 shows a perspective view of a disengaged bagel slicing device, in accordance with some embodiments of the disclosure.
Figure 4:
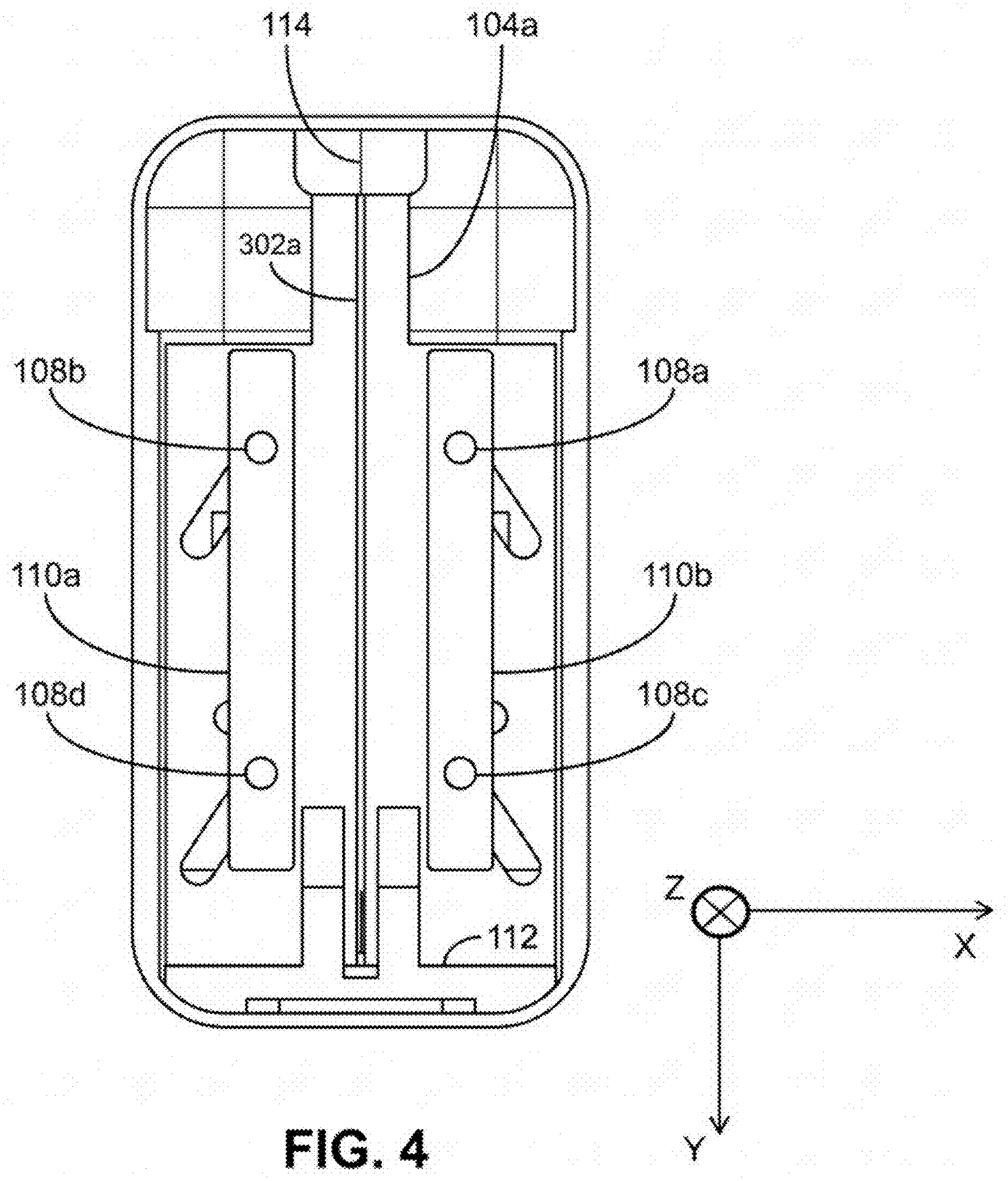
FIG. 4 shows a side section view of an engaged bagel slicing device, in accordance with some embodiments of the disclosure.
Figure 11A:
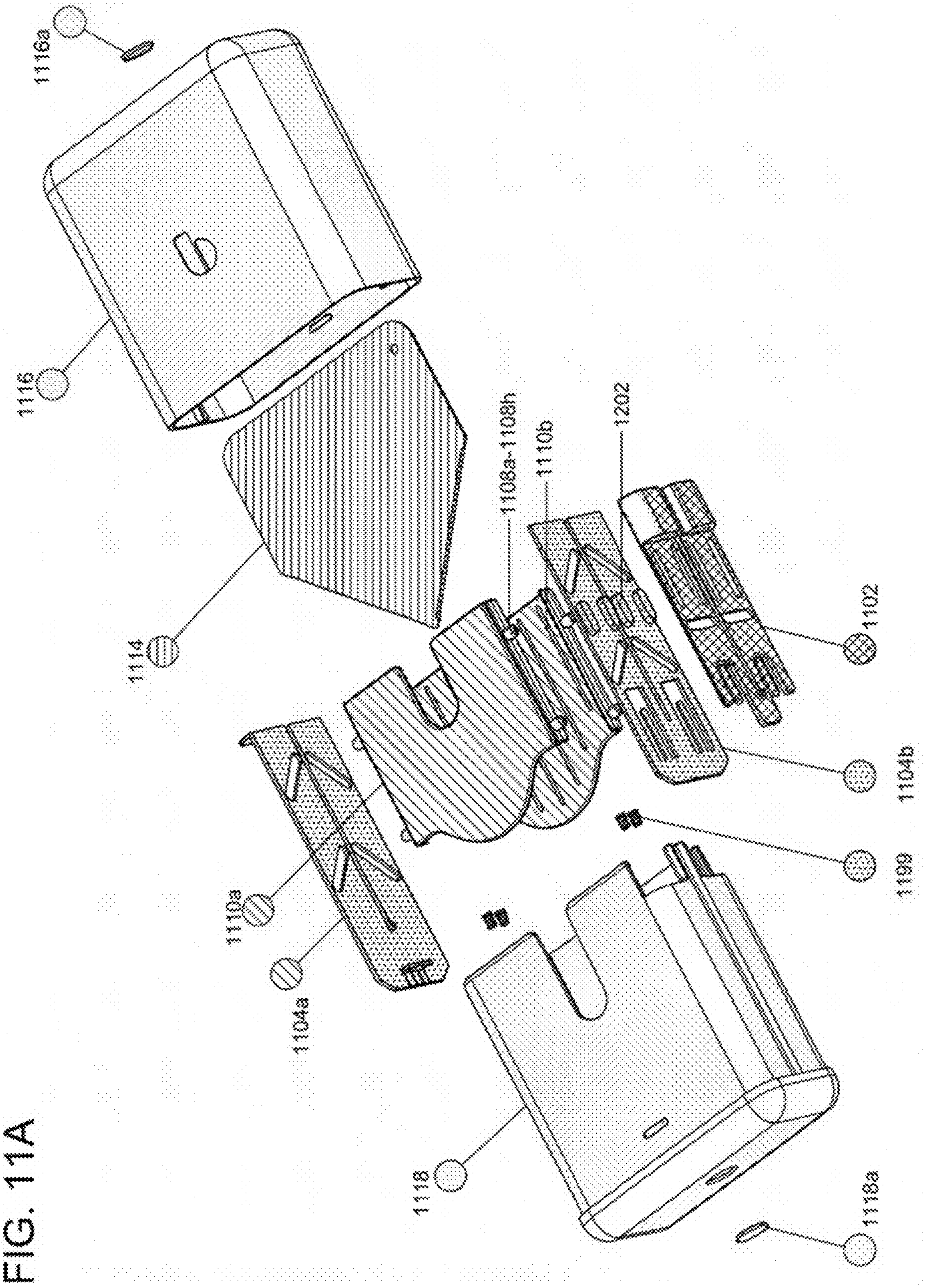
FIG. 11A shows an exploded view of a bagel slicing device, in accordance with some embodiments of the disclosure.
Figure 11B:
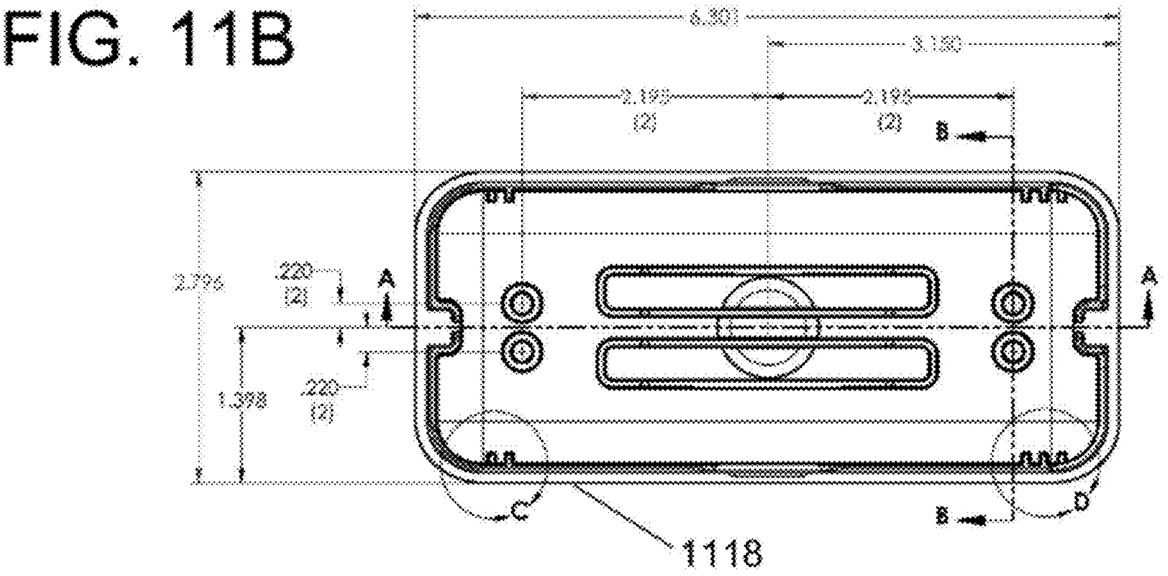
Figure 11B:
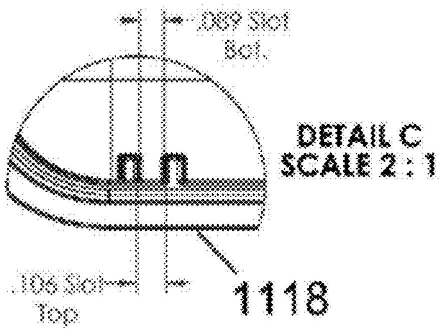
Figure 11B:
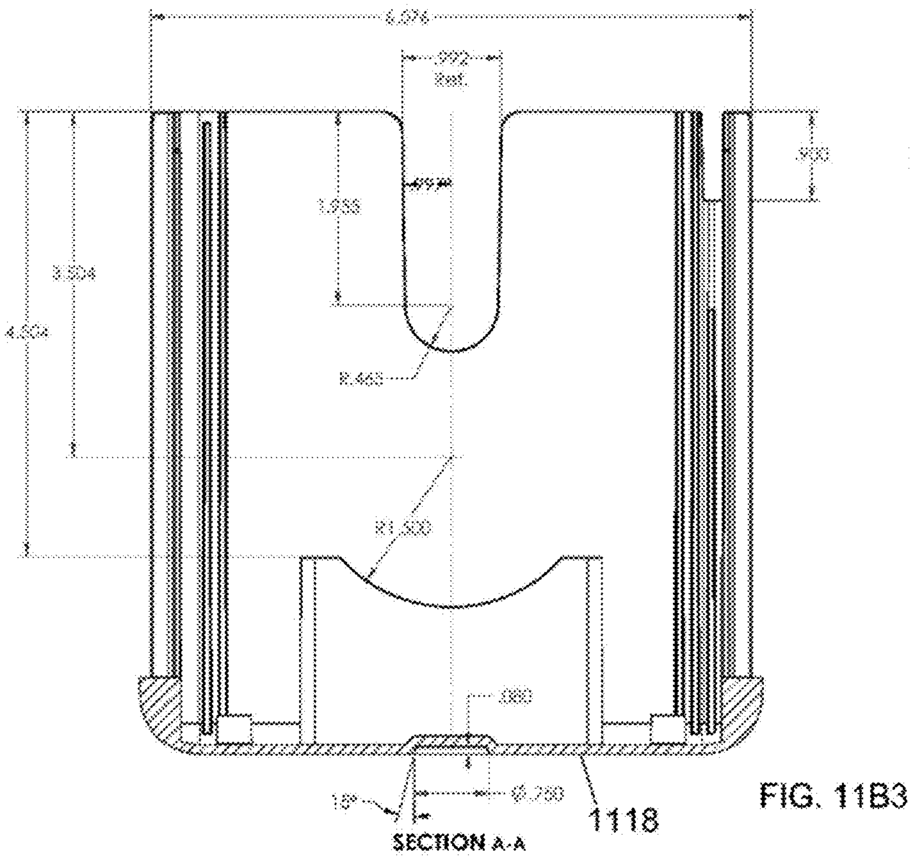
Figure 11C:
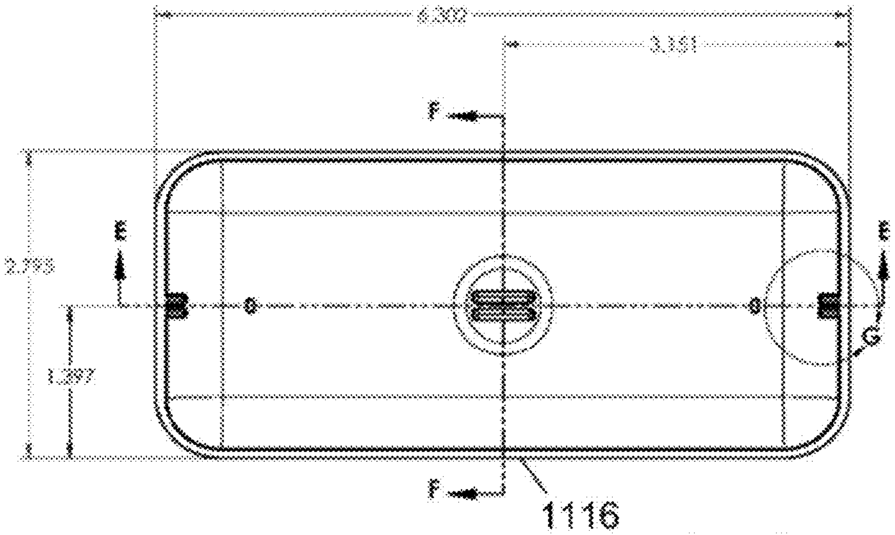
Figure 11C:
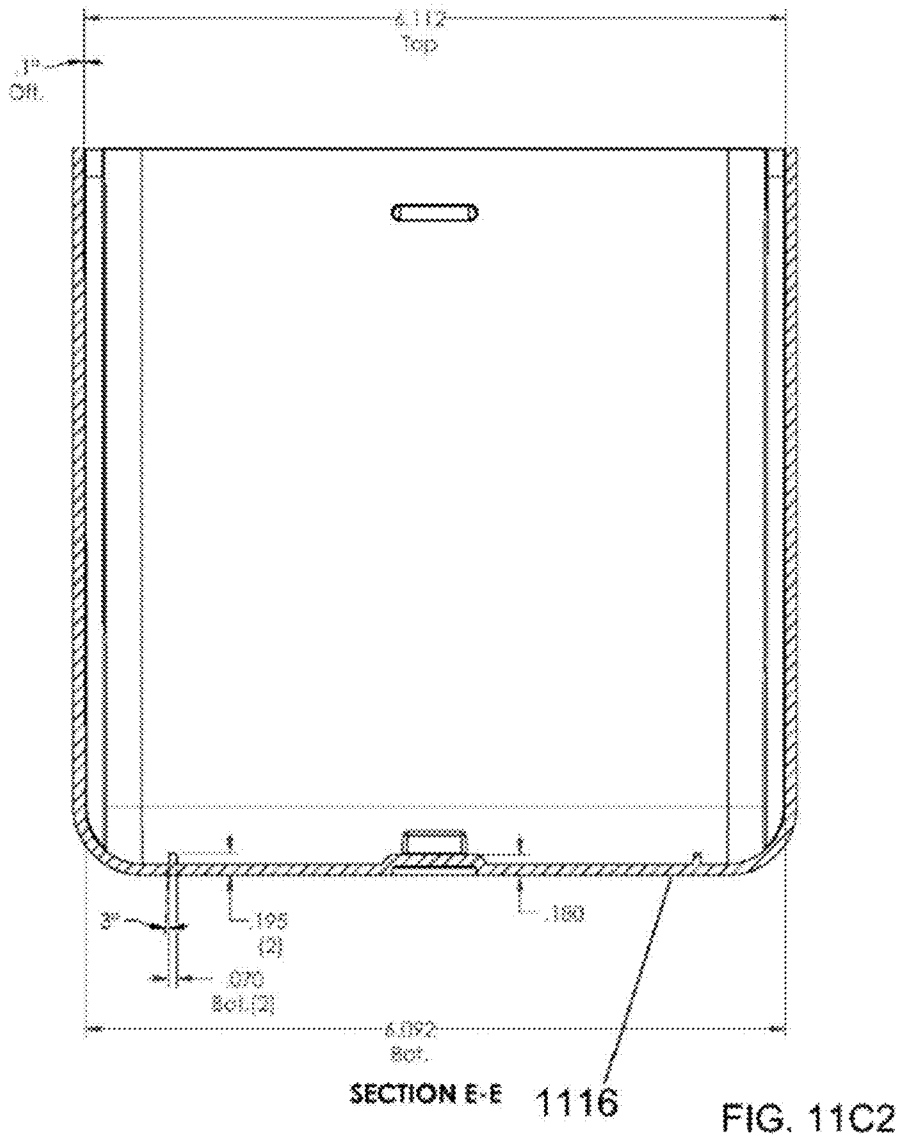
Figure 11G:
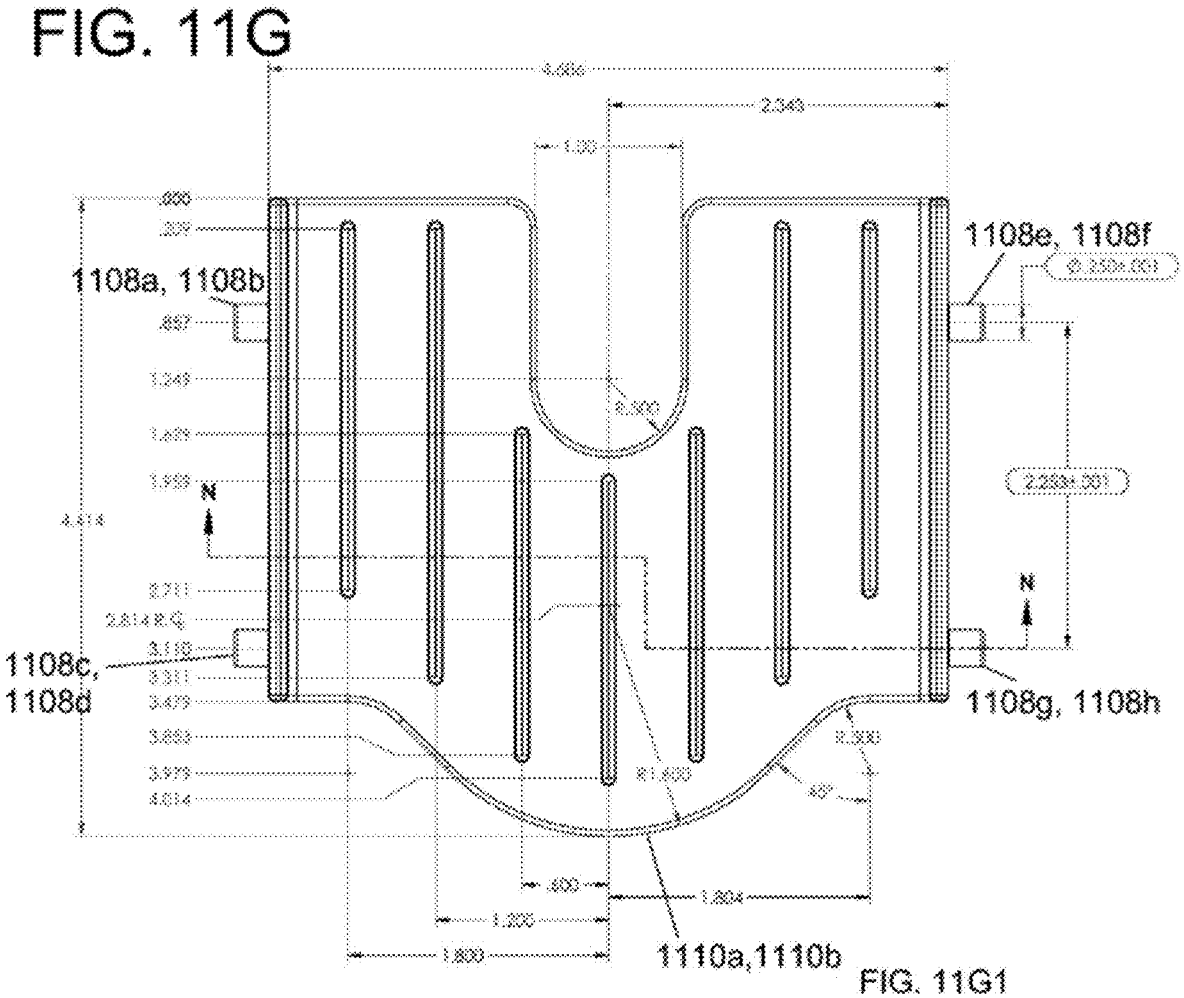
Figure 11G:
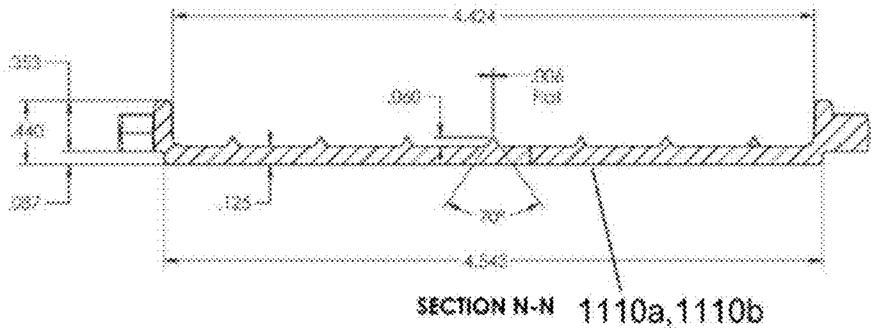
Figure 12A:
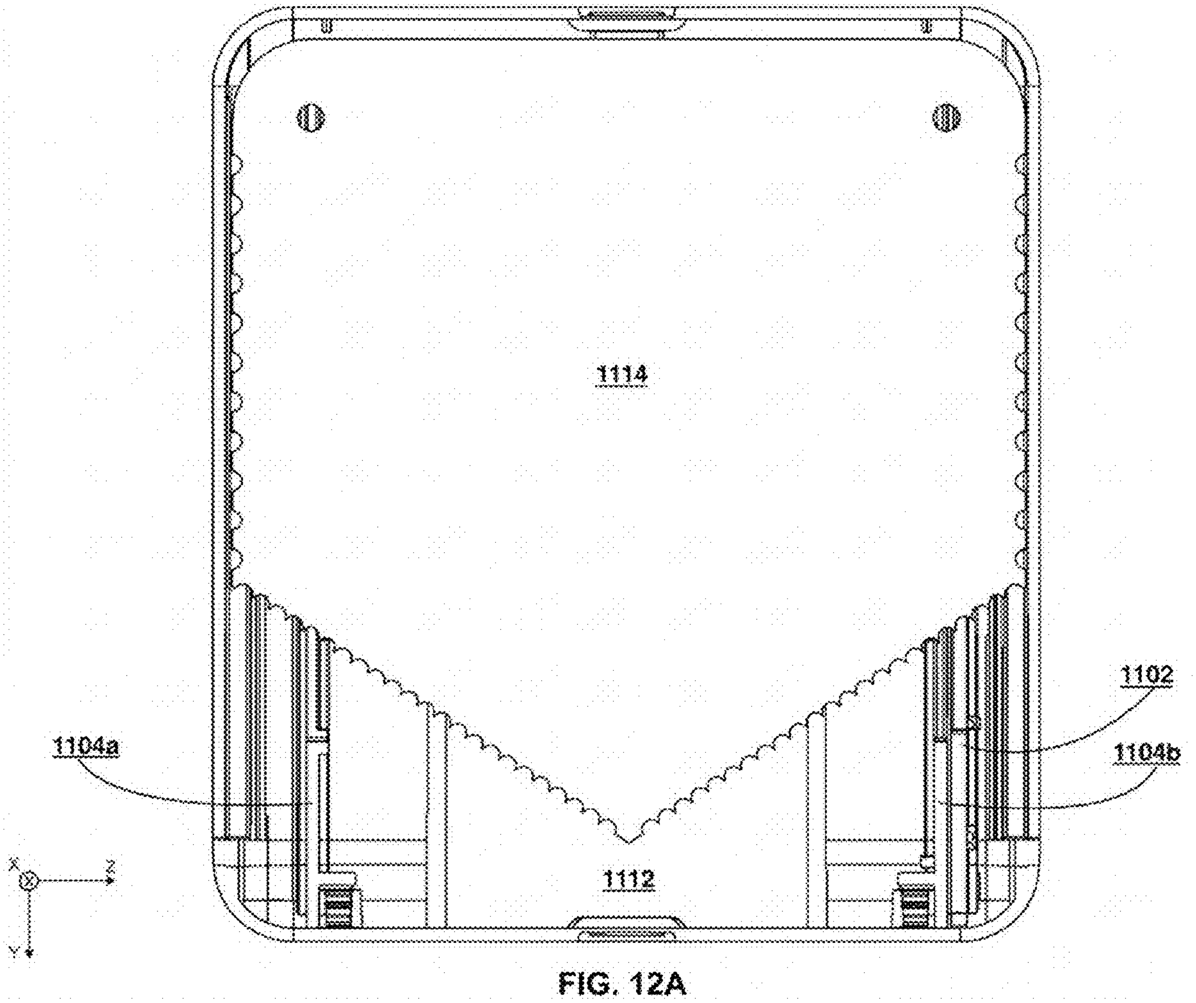
Figure 12B:
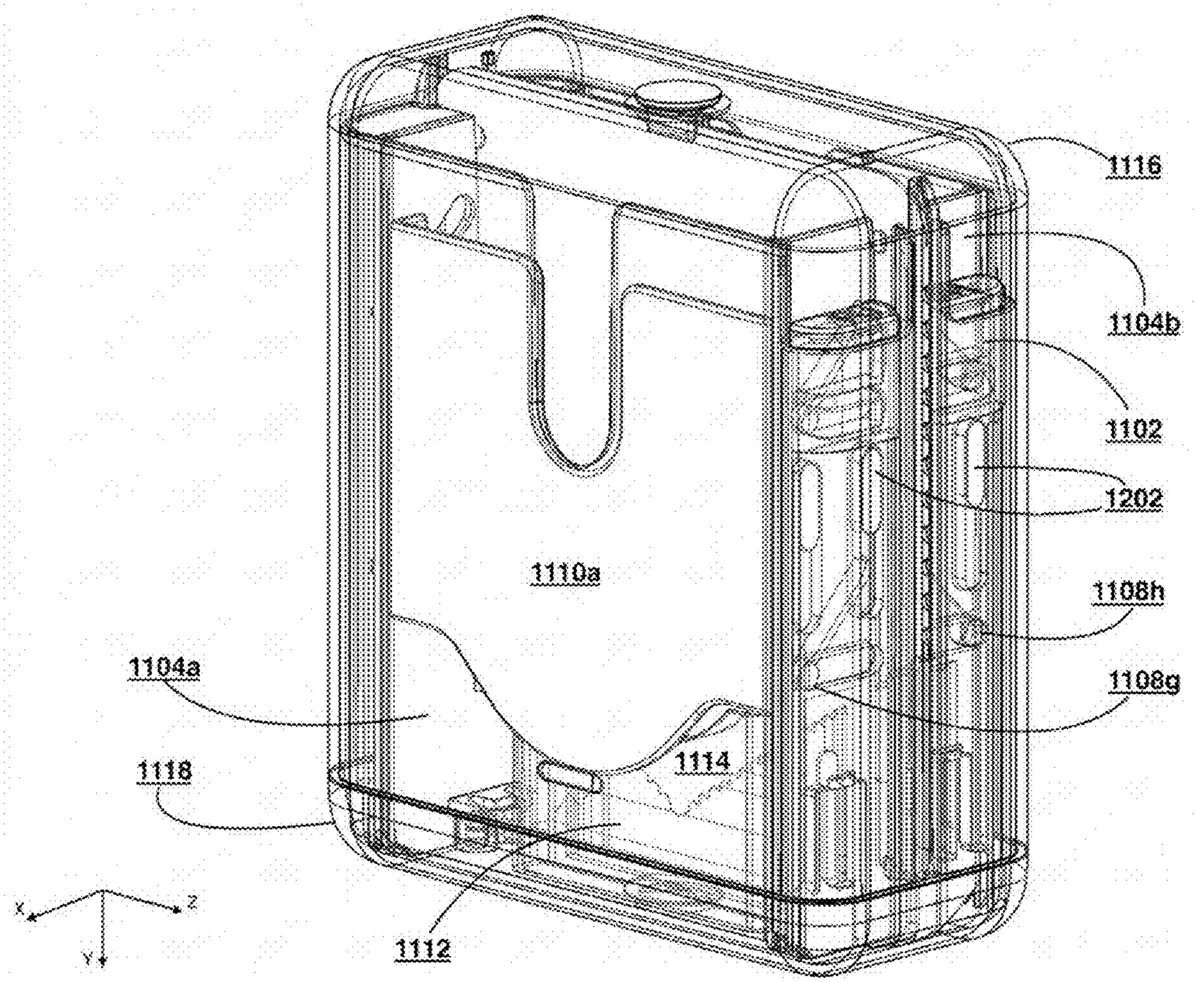
Figure 13:
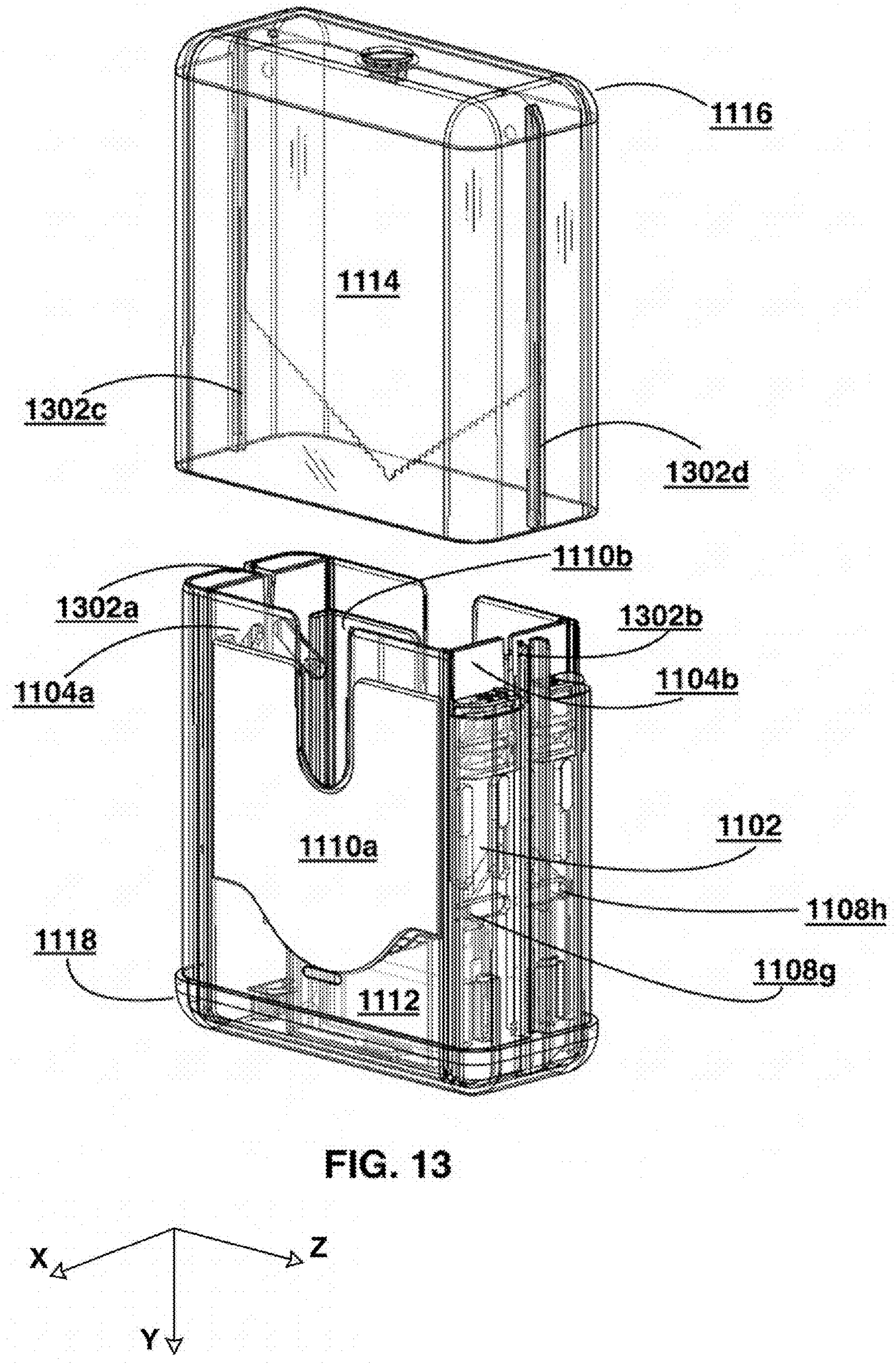
Figure 14:
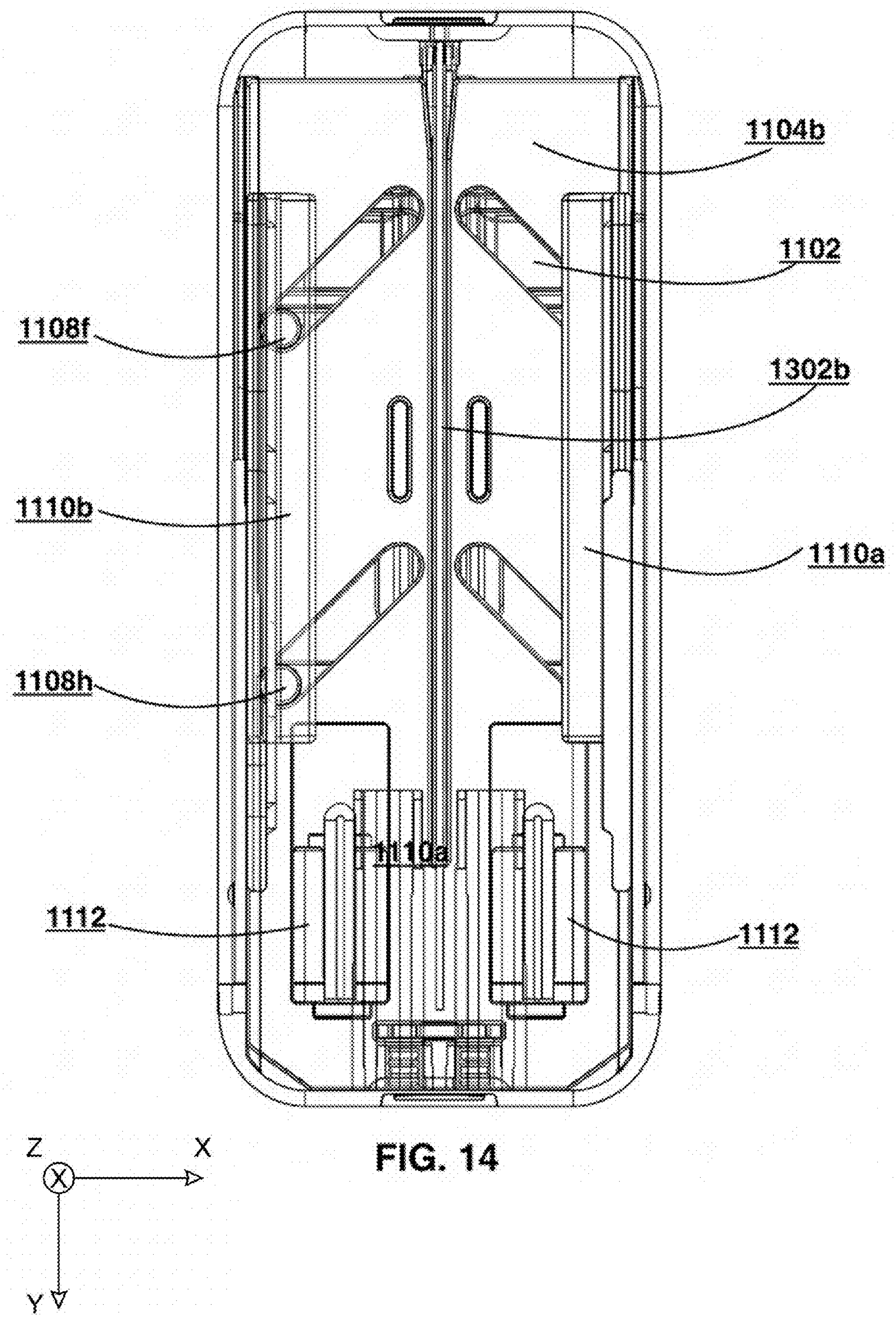
Figure 15A:
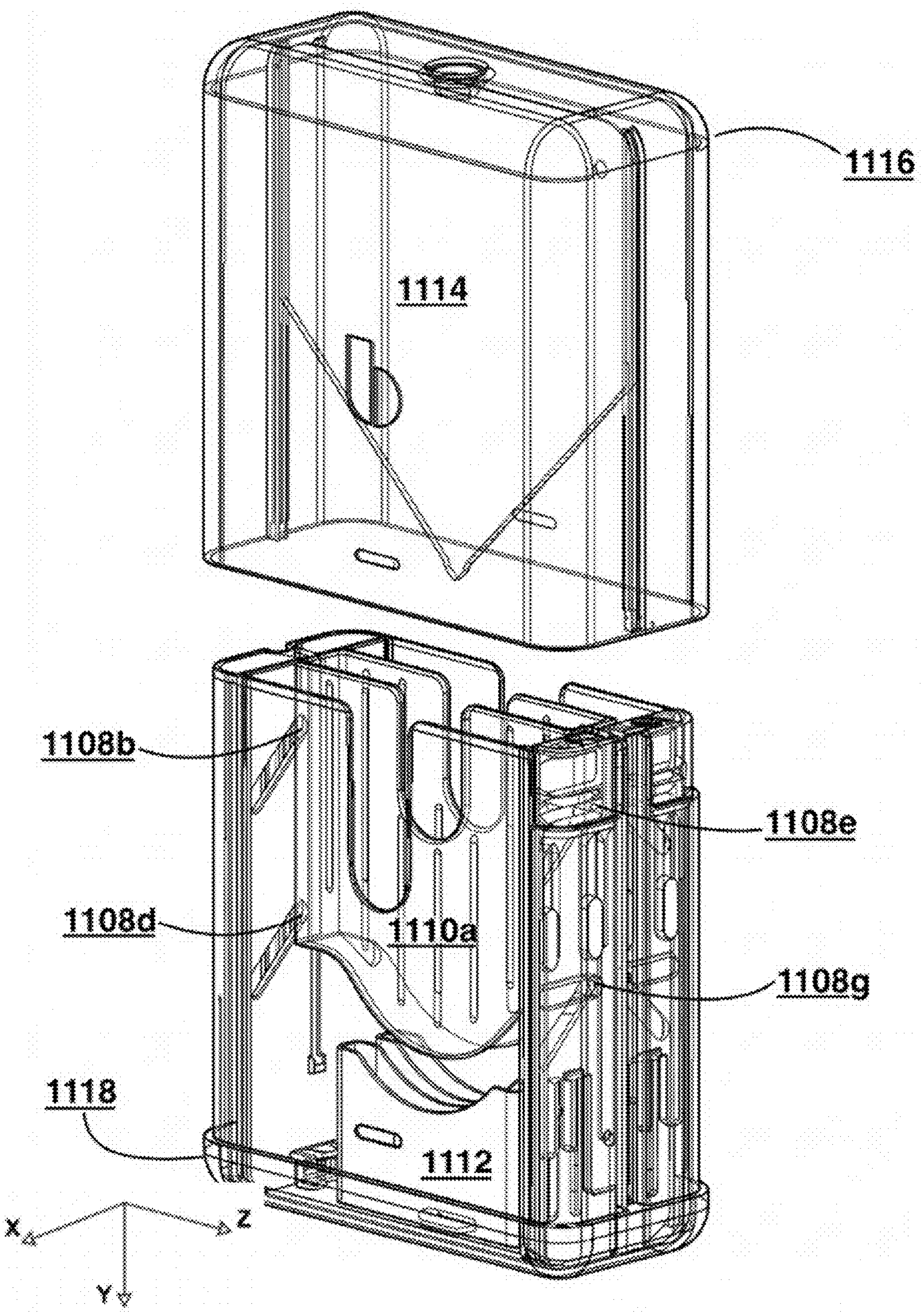
Figure 15B:
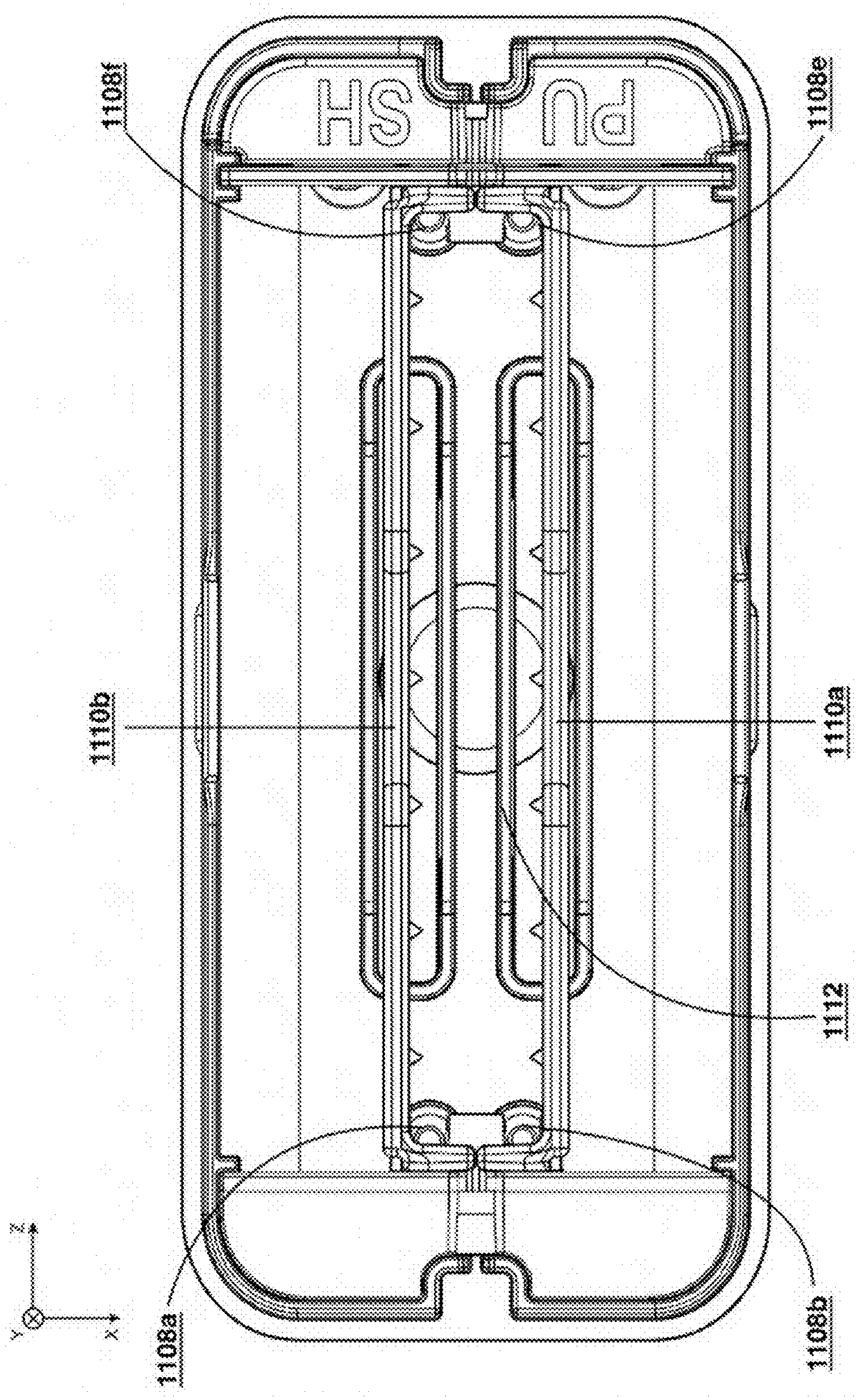
Figure 16A:
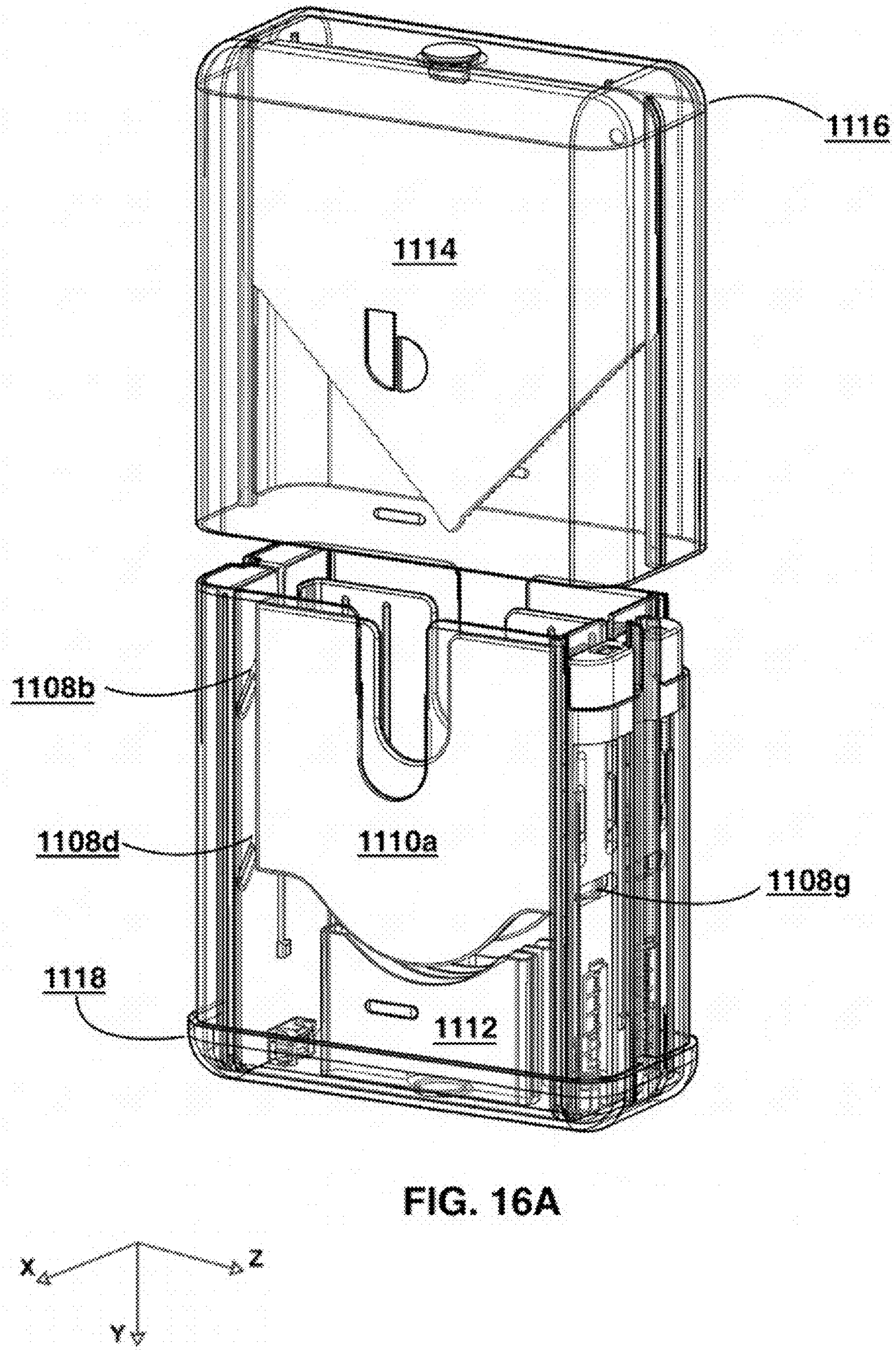
Figure 16B:
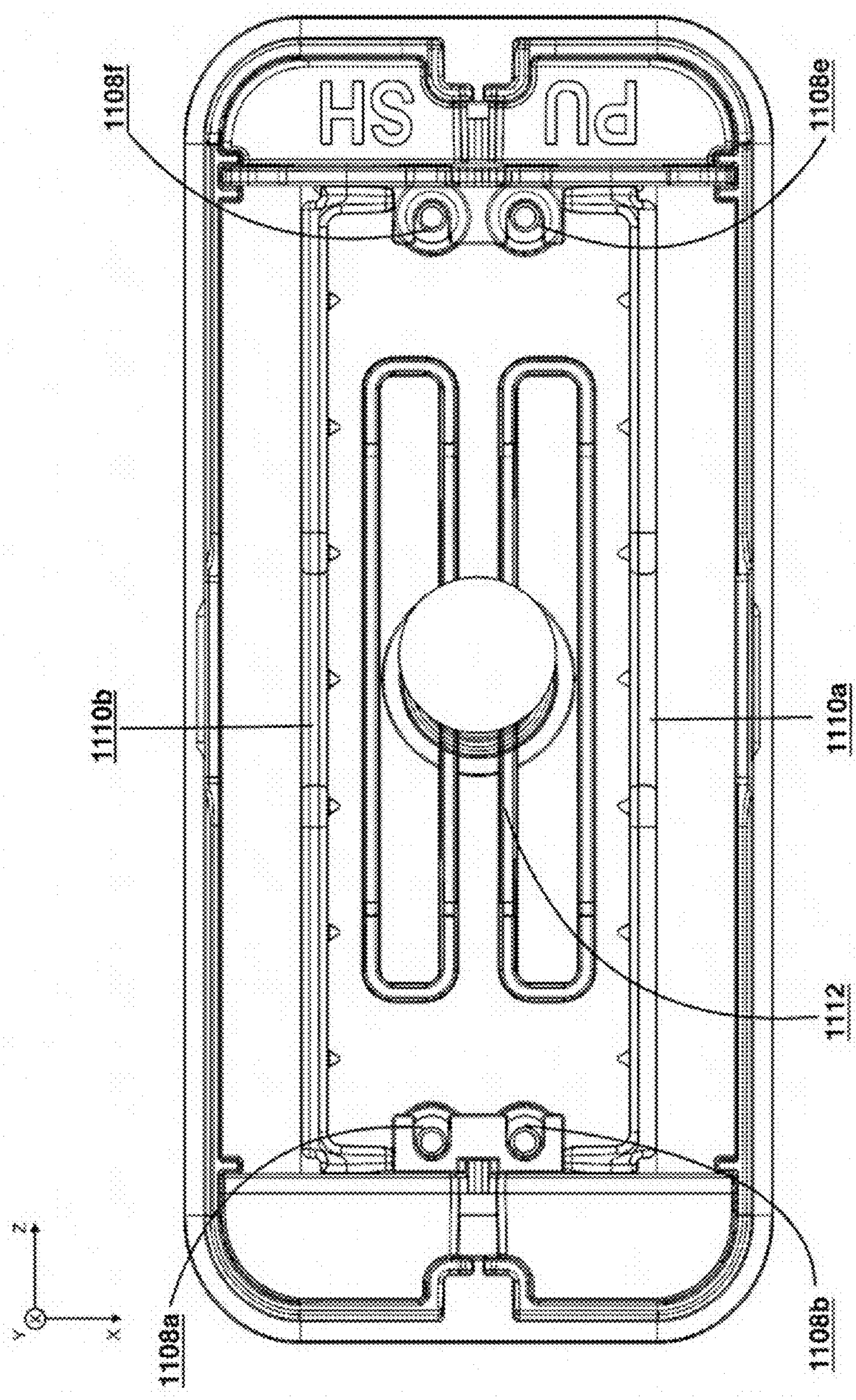
Figure 17A:
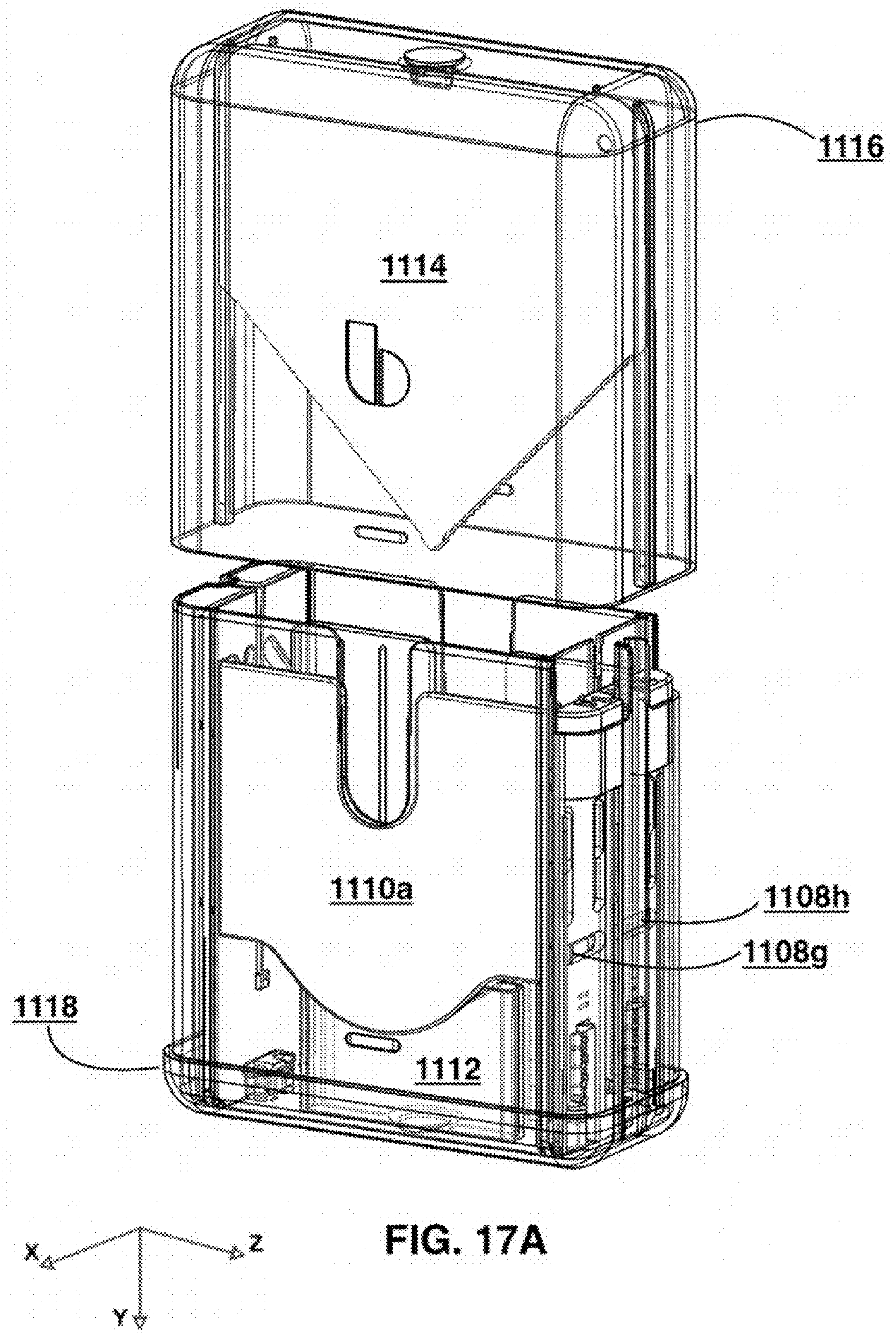
Figure 17B:
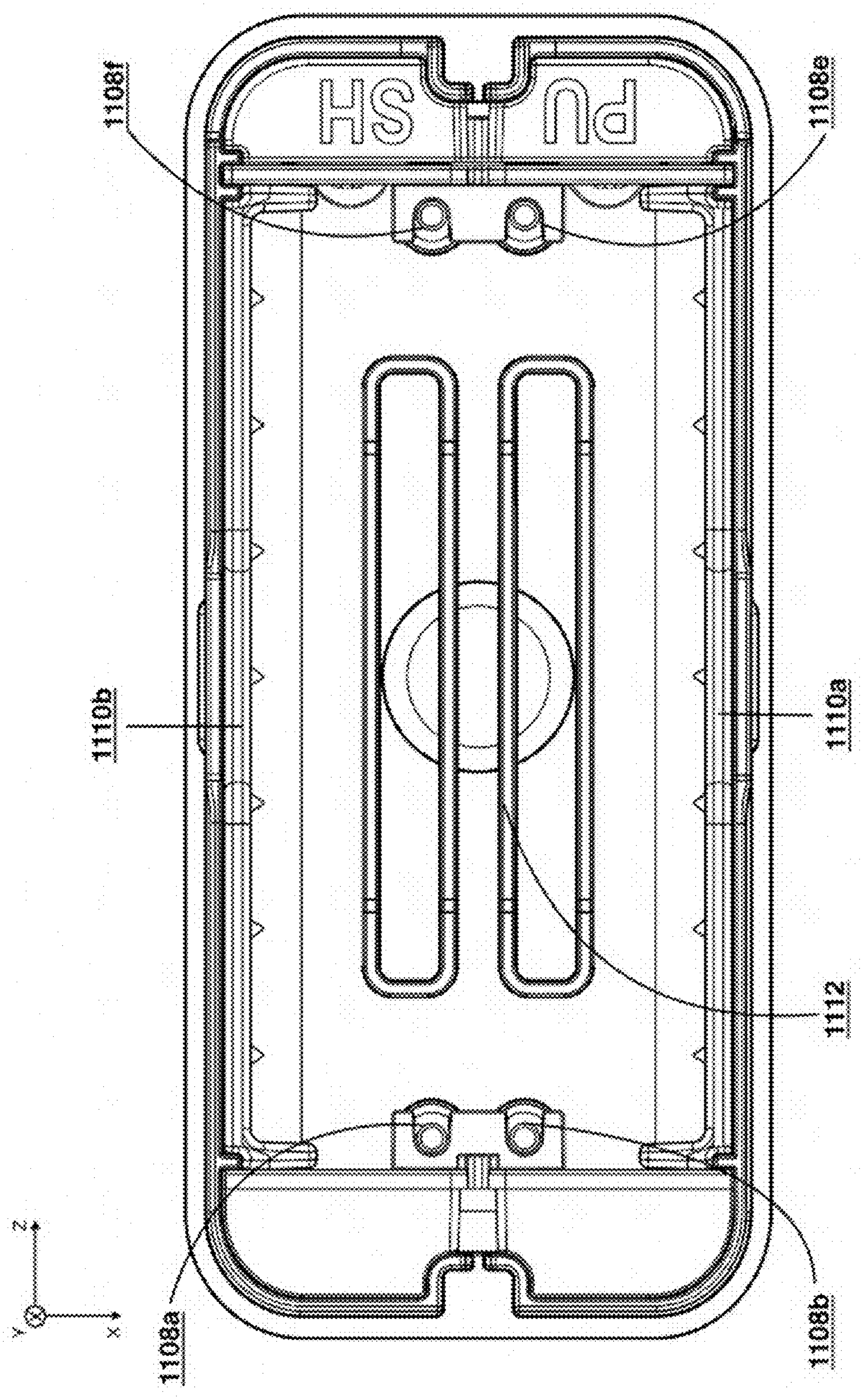
Figure 18A:
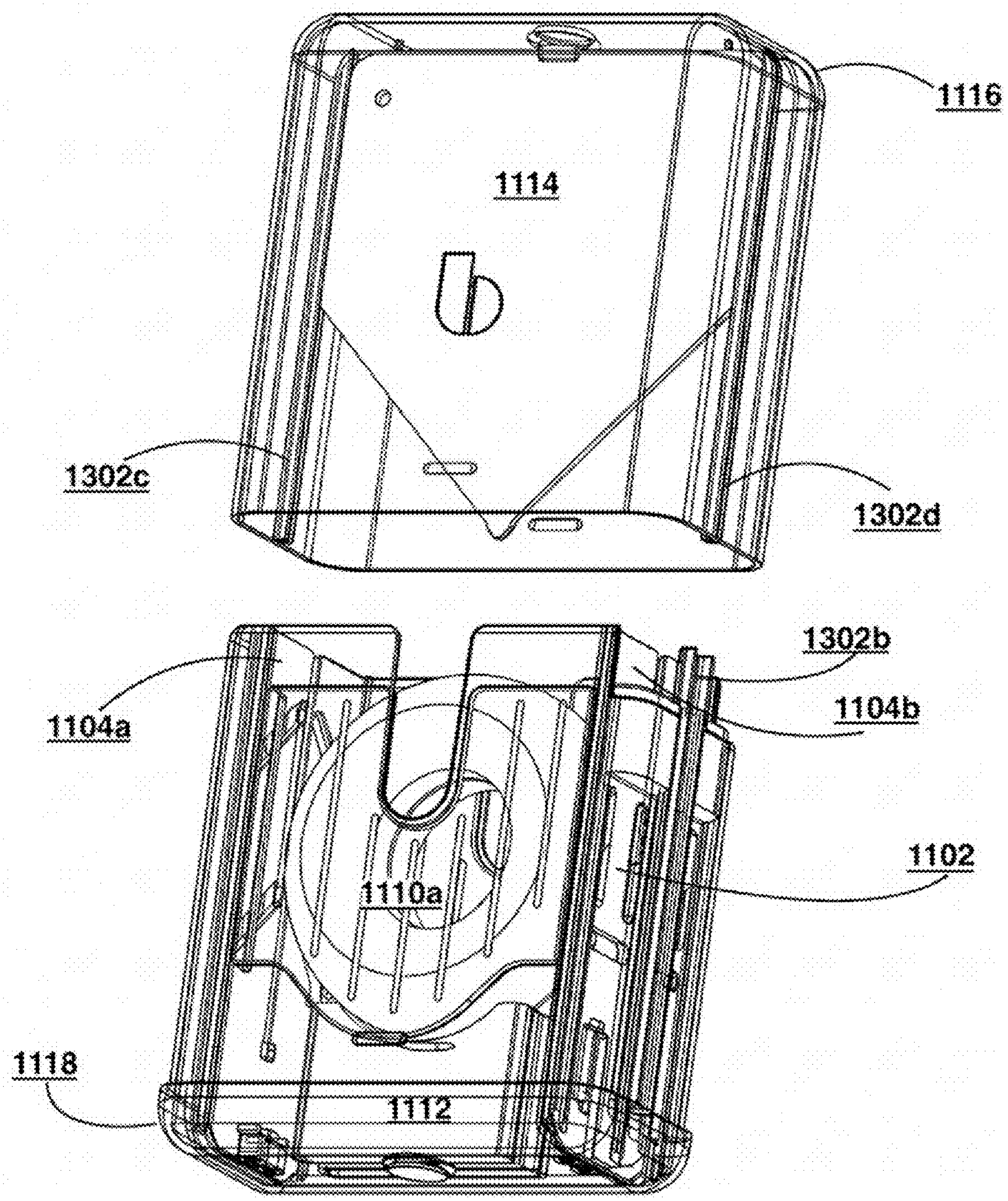
Figure 18B:
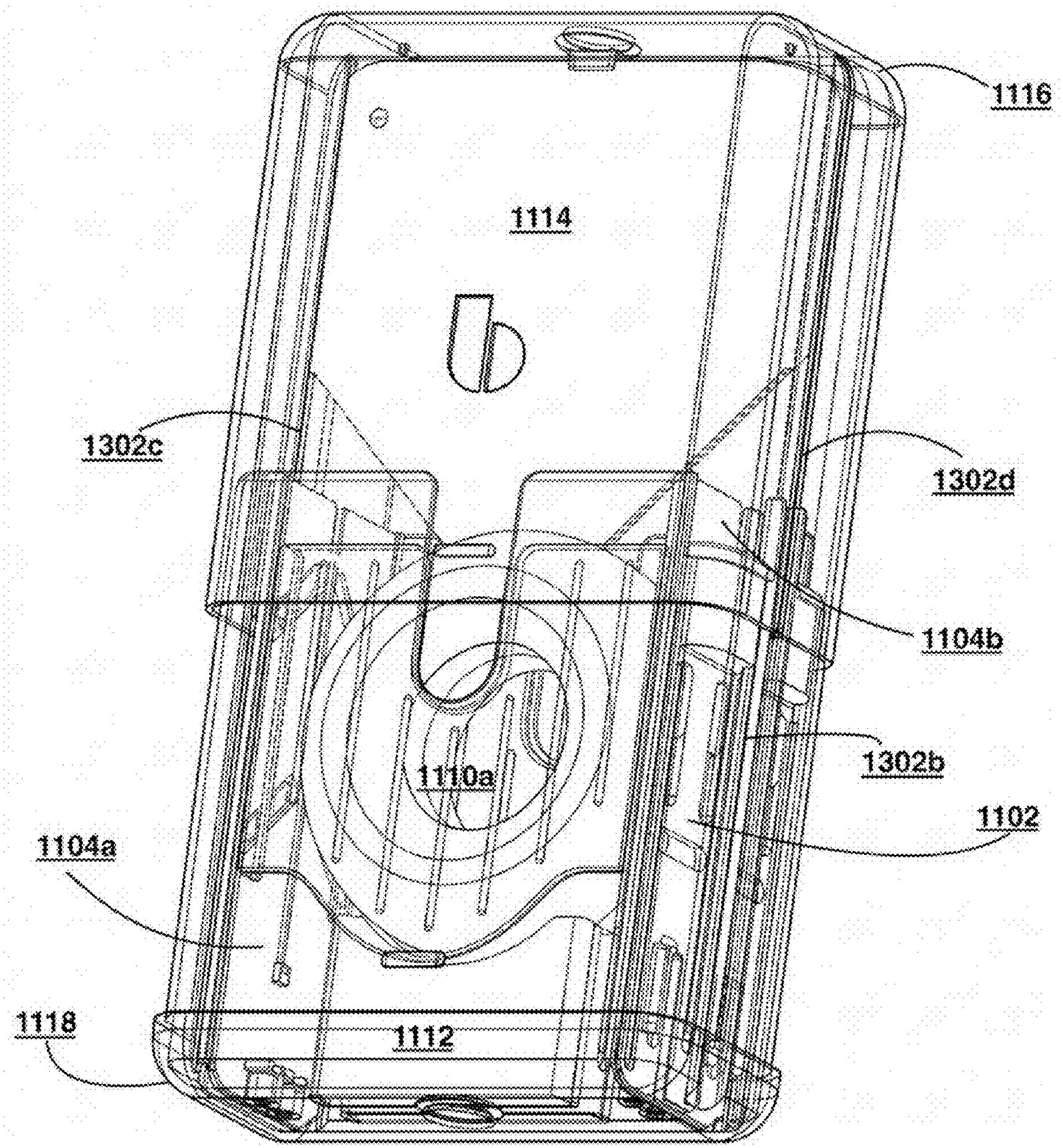
Figure 18C:
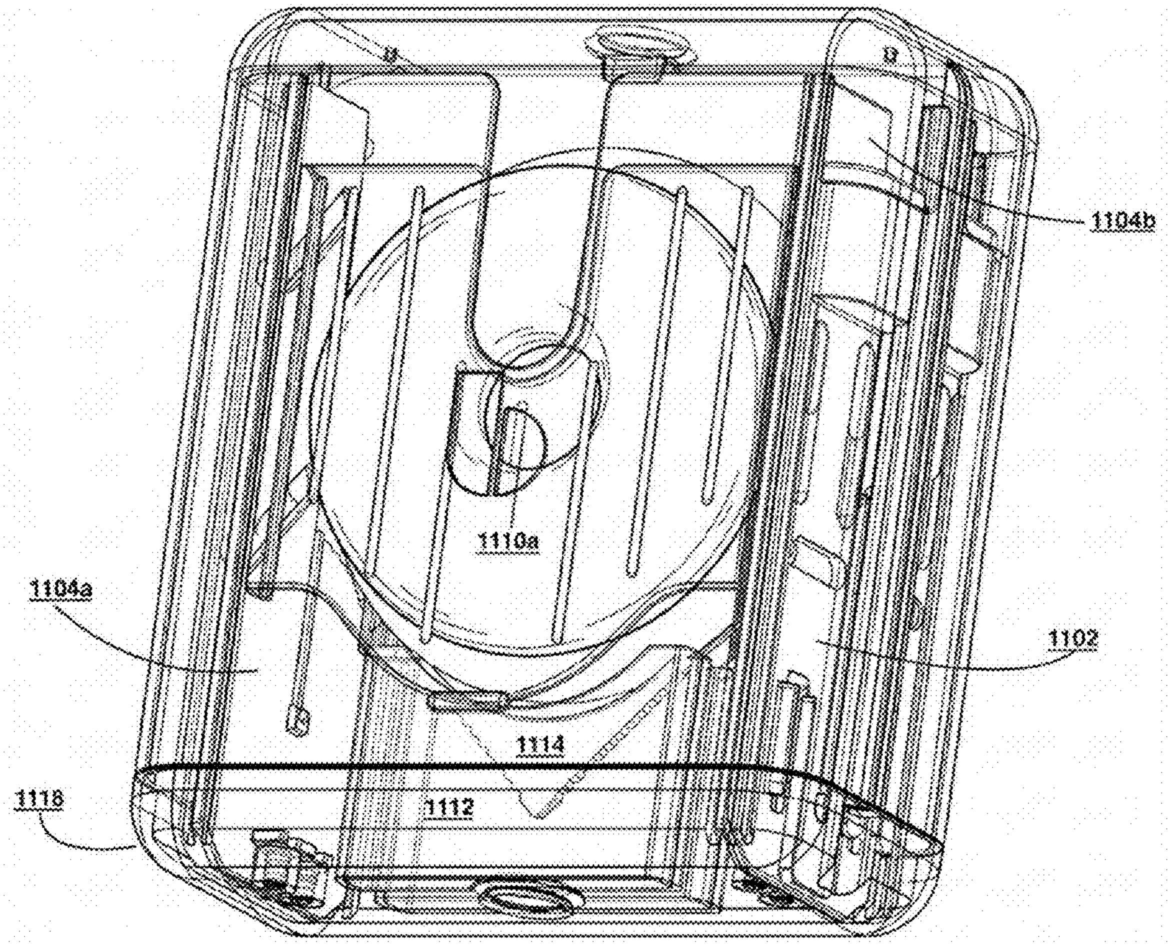
Figure 19:
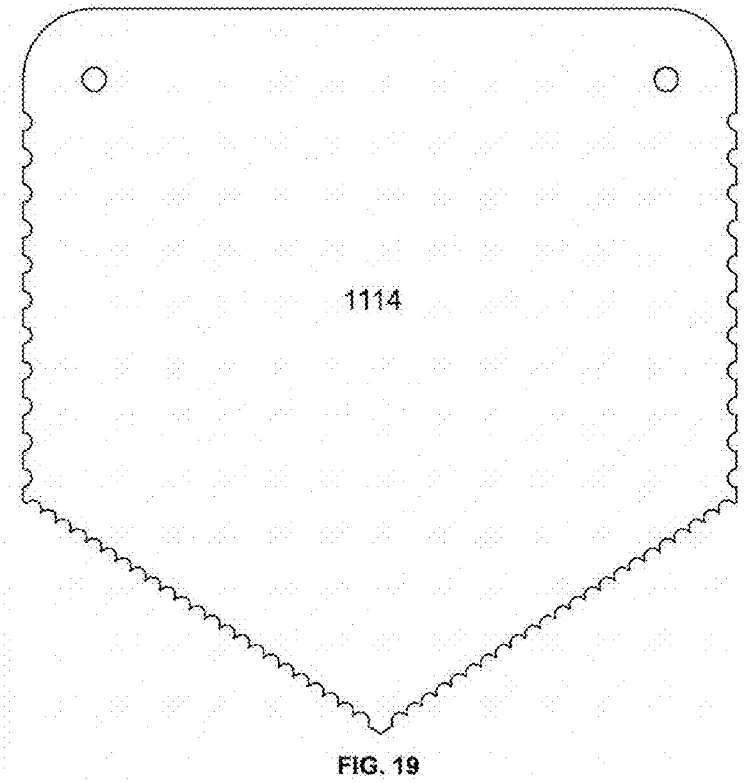
Figure 20:
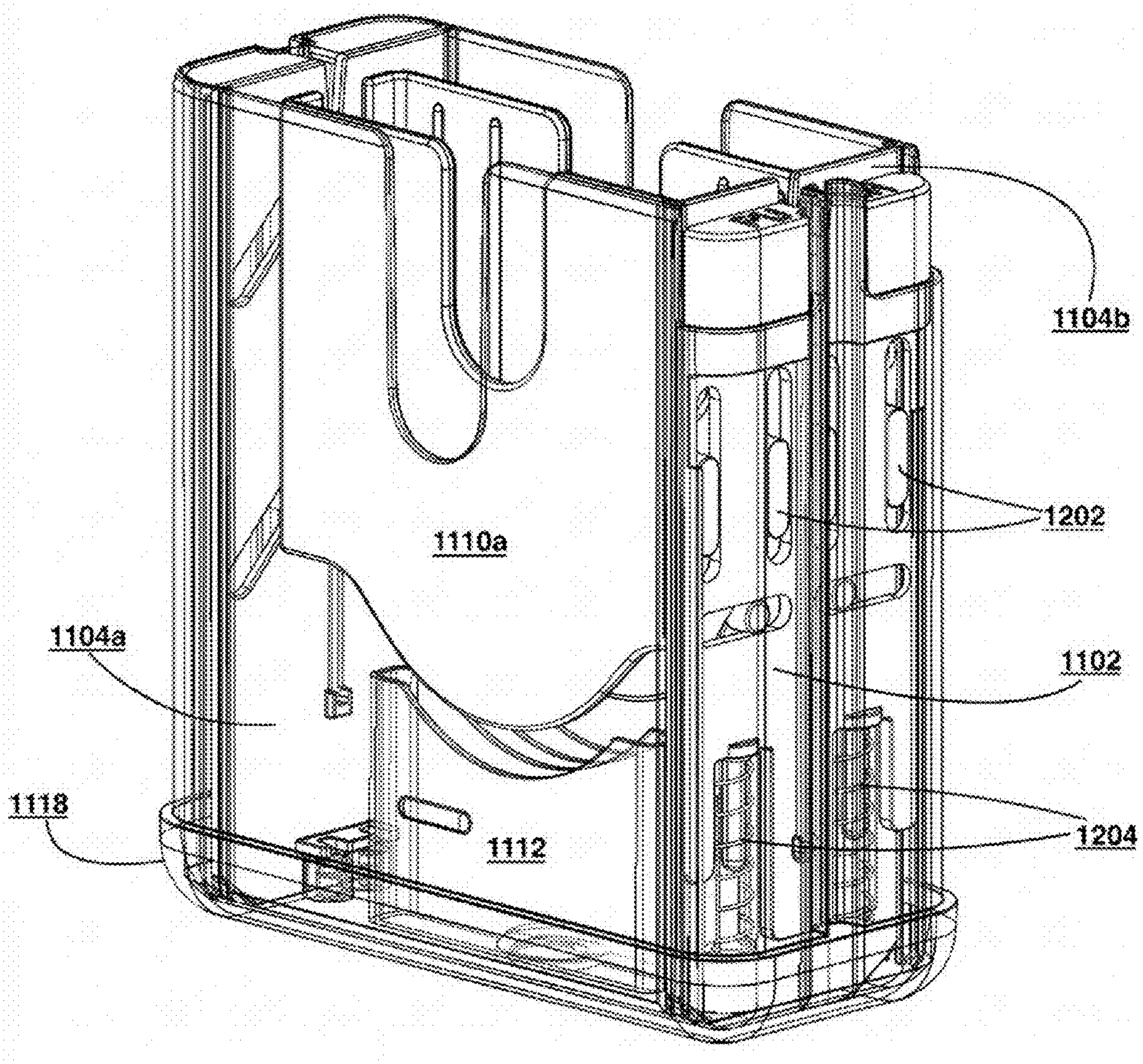
Figure 21:
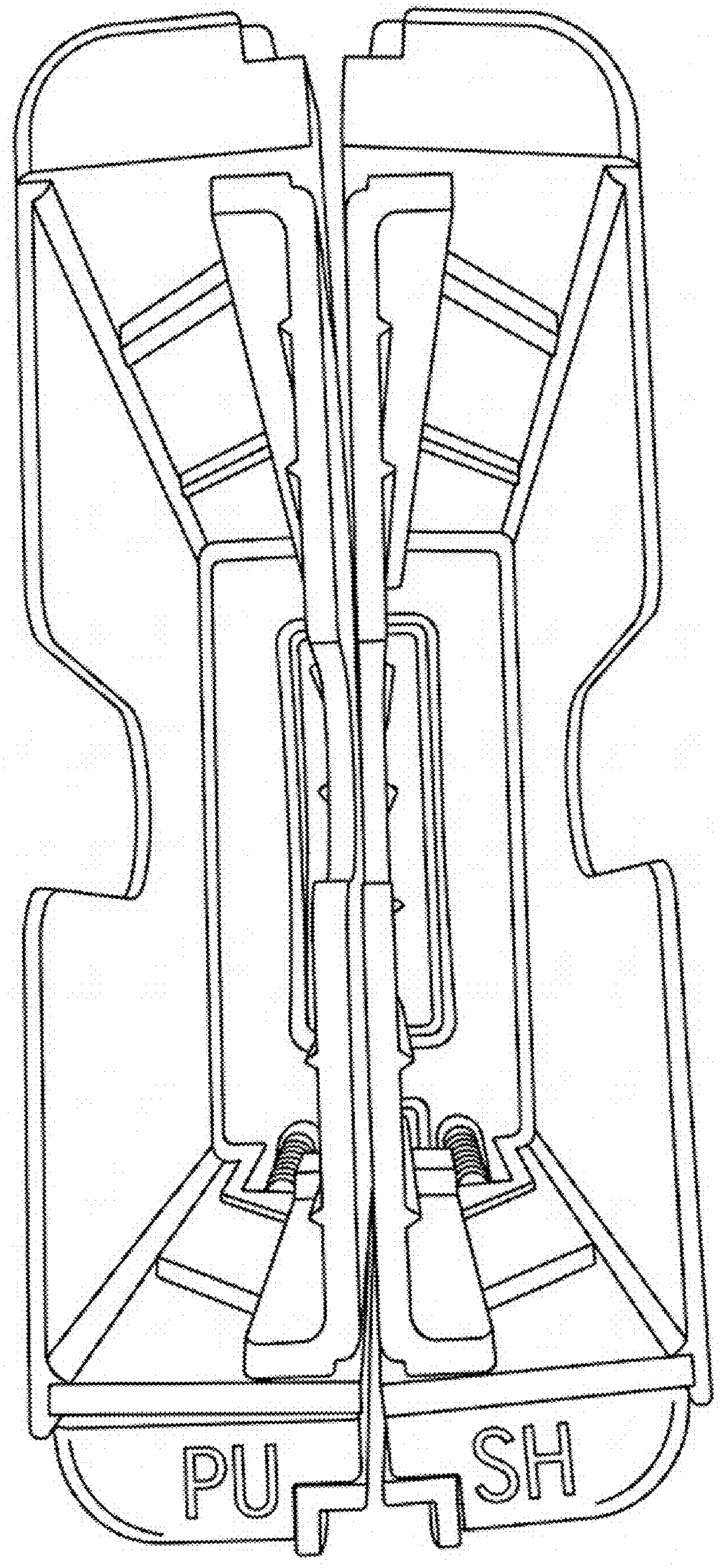

FIG. 11B illustrates various cross-sections, views, and details of the lower assembly of the bagel slicing device, in accordance with some embodiments of the disclosure, including FIG. 11B1, which illustrates a top down sectional view of the lower assembly, FIG. 11B2, which illustrates detail C of FIG. 11B1, FIG. 11B3, which illustrates section A-A of FIG. 11B1, FIG. 11B4, which illustrates section B-B of FIG. 11B1, FIG. 11B5, which illustrates detail D of FIG. 11B1, and FIG. 11B6, which illustrates a perspective view of the lower assembly;

FIG. 11C illustrates various cross-sections, views, and details of the upper assembly of the bagel slicing device, in accordance with some embodiments of the disclosure, including FIG. 11C1, which illustrates a top down sectional view of the upper assembly, FIG. 11C2, which illustrates section E-E of FIG. 11C1, FIG. 11C3, which illustrates section F-F of FIG. 11C1, FIG. 11C4, which illustrates detail G of FIG. 11C1, FIG. 11C5, which illustrates detail H of FIG. 11C3, and FIG. 11C6, which illustrates a perspective view of the upper assembly;

FIG. 11D illustrates various cross-sections, views, and details of the right-hand inner plate of the bagel slicing device, in accordance with some embodiments of the disclosure, including FIG. 11D1, which illustrates an outer facing side of the right-hand inner plate, FIG. 11D2, which illustrates section J-J of FIG. 11D1, FIG. 11D3, which illustrates section K-K of FIG. 11D1, FIG. 11D4, which illustrates an inner facing side of the right-hand inner plate, FIG. 11D5, which illustrates a bottom end view of the right-hand inner plate, FIG. 11D6, which illustrates a perspective view of the inner facing side of the right-hand inner plate, and FIG. 11D7, which illustrates a perspective view of the outer facing side of the right-hand inner plate;

FIG. 11E illustrates various cross-sections, views, and details of the left-hand inner plate of the bagel slicing device, in accordance with some embodiments of the disclosure, including FIG. 11E1, which illustrates an outer facing side of the left-hand inner plate, FIG. 11E2, which illustrates an end view of the left-hand inner plate, FIG. 11E3, which illustrates a side view of the left-hand inner plate, FIG. 11E4, which illustrates an inner facing side of the left-hand inner plate, FIG. 11E5, which illustrates a bottom end view of the left-hand inner plate, FIG. 11E6, which illustrates a perspective view of the inner facing side of the left-hand inner plate, and FIG. 11E7, which illustrates a perspective view of the outer facing side of the left-hand inner plate;

FIG. 11F illustrates various cross-sections, views, and details of the outer plate of the bagel slicing device, in accordance with some embodiments of the disclosure, including FIG. 11F1, which illustrates a top end view of the outer plate, FIG. 11F2, which illustrates a side view of the outer plate, FIG. 11F3, which illustrates a bottom end view of the outer plate, FIG. 11F4, which illustrates section L-L of FIG. 11F2, FIG. 11F5, which illustrates section M-M of FIG. 11F2, FIG. 11F6, which illustrates a perspective view of an inner facing side of the outer plate, and FIG. 11F7, which illustrates a perspective view of an outer facing side of the outer plate;

FIG. 11G illustrates various cross-sections, views, and details of the centering plate and a gate plug of the bagel slicing device, in accordance with some embodiments of the disclosure, including FIG. 11G1, which illustrates a side view of the centering plate, FIG. 11G2, which illustrates section N-N of FIG. 11G1, FIG. 11G3, which illustrates an end view of the centering plate, FIG. 11G4, which illustrates a perspective view of the centering plate, FIG. 11G5, which illustrates an end view of a pin of the gate plug, and FIG. 11G6, which illustrates section P-P of FIG. 11G5;

FIG. 12A shows a side section view of an engaged bagel slicing device, in accordance with some embodiments of the disclosure;

FIG. 12B shows a perspective view of the engaged bagel slicing device, in accordance with some embodiments of the disclosure;

FIG. 13 shows a perspective view of a disengaged bagel slicing device, in accordance with some embodiments of the disclosure;

FIG. 14 shows a side section view of an engaged bagel slicing device, in accordance with some embodiments of the disclosure;

FIG. 15A shows a perspective view of a disengaged bagel slicing device, in accordance with some embodiments of the disclosure;

FIG. 15B shows a top section view of the disengaged bagel slicing device, in accordance with some embodiments of the disclosure;

FIG. 16A shows a perspective view of an engaged bagel slicing device, in accordance with some embodiments of the disclosure;

FIG. 16B shows a top section view of the engaged bagel slicing device, in accordance with some embodiments of the disclosure;

FIG. 17A shows another perspective view of an engaged bagel slicing device, in accordance with some embodiments of the disclosure;

FIG. 17B shows a top section view of the engaged bagel slicing device, in accordance with some embodiments of the disclosure;

FIG. 18A shows a perspective view of a disengaged bagel slicing device, in accordance with some embodiments of the disclosure;

FIG. 18B shows a perspective view of a partially engaged bagel slicing device, in accordance with some embodiments of the disclosure;

FIG. 18C shows a perspective view of a fully engaged bagel slicing device, in accordance with some embodiments of the disclosure;

FIG. 19 shows a blade design with a third type of serrated edge for bisecting a food item within the lower assembly of the bagel slicing device, in accordance with some embodiments of the disclosure;

FIG. 20 shows a perspective view of a disengaged bagel slicing device, in accordance with some embodiments of the disclosure; and FIG. 21 shows an end view of an example of centering plates for a thin version of the device, in accordance with some embodiments of the disclosure.

The drawings are intended to depict only typical aspects of the subject matter disclosed herein, and therefore should not be considered as limiting the scope of the disclosure. Those skilled in the art will understand that the structures, devices, and methods specifically described herein and illustrated in the accompanying drawings are non-limiting embodiments and that the scope of the present invention is defined solely by the claims.

DETAILED DESCRIPTION

An apparatus is described herein, where the apparatus includes an upper assembly, which further includes an upper interior portion and a blade affixed to the upper interior portion. In some embodiments, the apparatus includes a lower assembly, separable from the upper assembly, which further includes a holding plate configured to support a food item when placed within the lower assembly and movable centering plates configured to secure the food item in a position that lies substantially in the center of the lower assembly to facilitate a substantially even bisection of the food item when the upper assembly engages with the lower assembly. It will be understood that a food item "substantially in the center" of the lower assembly, as described herein, means the food item is aligned along a y-z plane of the lower assembly congruent with the center of a V-shaped nest of the holding plate. In some embodiments, the alignment of the food item may include an about +/−one-sixteenth of an inch (about +/−0.16 centimeter) margin of error. Consequently, the "substantially even bisection of the food item" may be susceptible to a +/−one-sixteenth of an inch (about +/−0.16 centimeter) margin of error. In some embodiments, the centering plates may be configured in a default closed position when the upper assembly is disengaged from the lower assembly. It will be understood, however, that the lower assembly may further include one or more actuators that, when depressed, cause the centering plates to separate from each other to make room for (i.e., define a space for) the food item. In some embodiments, in response to the food item being placed on the holding plate between the centering plates, releasing the one or more actuators may cause the centering plates to apply substantially similar amounts of force (e.g., along an x-y plane of the lower assembly) on the food item to substantially center the food item. In some embodiments, a spring mechanism may retain the default closed position of the centering plates at a minimum distance (e.g., about 1 inch (about 2.54 centimeters)) from each other. For example, two vertical springs that load the outer plate, also attached to the inner plate, convert the vertical spring energy to horizontal energy through horizontal channels to slanted channels to compress the centering plates. See, e.g., FIG. 20 that shows an example of the spring mechanism. It will be understood that the centering plates have a range between them from about 1 inch (about 2.54 centimeters) to about 2 inches (about 5.08 centimeters) when the device is in a clamped or engaged position (i.e., when the centering plates are engaged with the held item). In some embodiments, in a "thin" version of the device, the centering plates have a range between them of about 0.125 inch (about 0.32 centimeters) (or any suitable range) in a clamped or engaged position, which is suited for holding and cutting relatively thin items. See, e.g., FIG. 21 that shows an end view of an example of centering plates for the thin version of the device.

In some embodiments, the lower assembly may further include a plurality of pins configured to couple the centering plates to a set of outer plates and a set of inner plates within the lower assembly such that each of the plurality of pins resides within corresponding channels of the set of outer plates and the set of inner plates that facilitates movement of the centering plates when one or more actuators is depressed or released. In some embodiments, the movement of the centering plates may include a movement of the plurality of pins along slanted channels of the set of inner plates, a movement of the set of outer plates along the set of inner plates, via exterior verticals rails, and a movement of the plurality of pins along horizontal channels of the set of outer plates. It will be understood that each of the plurality of pins has a diameter of about ¼-inch (about 0.635 centimeter). In some embodiments, the lower assembly may further include interior vertical rails such that the blade is configured to engage with the interior vertical rails in the lower assembly and follow a slicing path that bisects the food item when the upper assembly engages with the lower assembly. In some embodiments, the apparatus may further include a safety mechanism (e.g., a guard) positioned at the bottom of the upper assembly, where the blade slides through an opening in the safety mechanism when the upper assembly engages with the lower assembly. It will be understood that the blade is mounted solidly to an upper interior portion of the upper assembly, and the safety mechanism (e.g., guard) moves on pins and springs in the z-axis direction as the upper assembly is pushed towards the bottom assembly.

In some embodiments, the holding plate may include a V-shaped nest that contributes to holding and centering the food item within the lower assembly. In some embodiments, the apparatus may further include an opening along the perimeter of the upper assembly to enable cleaning of the blade, and the lower assembly will have a cosmetic cover that will hide the clamping mechanism (e.g., the centering plates) and prevent any pinch points. It will be understood that the upper assembly and the lower assembly may be comprised of any suitable plastic (e.g., polycarbonate, acetal, and the like), metal, or alloy (e.g., stainless steel). It will also be understood that the blade may include a variety of serrated edge designs, one of which may include an about 450 knife edge with about 50 percent cut depth to create the knife edge. It will be understood that the serrated edge design is symmetrical.

A method is disclosed herein, where the method includes depressing one or more actuators such that centering plates separate from each other within a lower assembly to make room for a food item and, in response to the food item being placed on a holding plate between the centering plates, releasing the one or more actuators to apply substantially similar amounts of force on the food item to substantially center the food item. In some embodiments, the lower assembly further includes a plurality of pins configured to couple the centering plates to a set of outer plates and a set of inner plates within the lower assembly such that each of the plurality of pins resides within corresponding channels of the set of outer plates and the set of inner plates that facilitates movement of the centering plates when the one or more actuators is depressed or released. In some embodiments, the movement of the centering plates may include a movement of the plurality of pins along slanted channels of the set of inner plates, a movement of the set of outer plates along the set of inner plates, via exterior vertical rails, and a movement of the plurality of pins along horizontal channels of the set of outer plates. It will be understood that a spring mechanism may retain a default closed position of the centering plates at a minimum distance from each other.

FIGS. 1-10 show a bagel slicing device, in accordance with some embodiments of the present disclosure. FIG. 1 shows an exploded view of a bagel slicing device. Outer plates 102*a*, 102*b* are located on the immediate exterior surface of inner plates 104*a*, 104*b* within lower assembly 118 such that outer plates 102*a*, 102*b* fit and slide along the backs of inner plates 104*a*, 104*b*, via exterior vertical rails (not visible in FIG. 1), resulting in the alignment of horizontal channels of outer plates 102*a*, 102*b* with slanted channels of inner plates 104*a*, 104*b*. Outer plates 102*a*, 102*b*, including horizontal channels, couple to inner plates 104*a*, 104*b*, including slanted channels, via pins 108*a*-108*h* extending through the slanted channels of inner plates 104*a*, 104*b* to the horizontal channels of outer plates 102*a*, 102*b* to securely fasten the respective sets of plates together. In some embodiments, outer plates 102*a*, 102*b* may include any suitable number of horizontal channels that equals the number of slanted channels of inner plates 104*a*, 104*b* and the number of pins 108*a*-108*h* extending therethrough. Inner plates 104*a*, 104*b* are located on the immediate interior surface of outer plates 102*a*, 102*b* within lower assembly 118 such that outer plates 102*a*, 102*b* fit and slide along the backs of inner plates 104*a*, 104*b*, via exterior vertical rails (not visible in FIG. 1). As described above, exterior vertical rails (not visible in FIG. 1) allow slanted channels of inner plates 104*a*, 104*b* to align with horizontal channels of outer plates 102*a*, 102*b*, which enables pins 108*a*-108*h* to extend through inner plates 104*a*, 104*b* and outer plates 102*a*, 102*b* to securely fasten the respective sets of plates together. Inner plates 104*a*, 104*b* respectively sit atop opposite, protruding sides of holding plate 112, where the length of a V-shaped nest of holding plate 112 separates inner plates 104*a*, 104*b*. In addition to exterior vertical rails, inner plates 104*a*, 104*b* also include interior vertical rails (not visible in FIG. 1), which guide blade 114 along a slicing path (e.g., a y-axis) towards the center of holding plate 112 when upper assembly 116 engages with lower assembly 118. In some embodiments, inner plates 104*a*, 104*b* may include any suitable number of slanted channels that equals the number of horizontal channels of outer plates 102*a*, 102*b* and the number of pins 108*a*-108*h* extending therethrough. It will be understood that the slanted channels of inner plates 104*a*, 104*b* may be oriented at any suitable angle with respect to the horizontal channels of outer plates 102*a*, 102*b*. In some embodiments, the bagel slicing device may be used to bisect any suitable food item into equal halves.

Pins 108*a*-108*h* couple centering plates 110*a*, 110*b* (centering plate 110*b* is not visible in FIG. 1) to inner plates 104*a*, 104*b* and outer plates 102*a*, 102*b* by extending from the centering plates 110*a*, 110*b* through slanted channels of inner plates 104*a*, 104*b* and horizontal channels of outer plates 102*a*, 102*b*. A concurrent motion of pins 108*a*-108*h* and outer plates 102*a*, 102*b* determines the distance between centering plates 110*a*, 110*b*, which may be any distance between the range of about 1 inch (about 2.54 centimeters) and about 2 inches (about 5.08 centimeters) to securely fit and center a food item sitting on holding plate 112. In some embodiments, a user may depress or release one or more actuators (e.g., the tops of outer plates 102*a*, 102*b*) to initiate the movement of centering plates 110*a*, 110*b*. Each of the plurality of pins 108*a*-108*h* moves along slanted channels of inner plates 104*a*, 104*b* and horizontal channels of outer plates 102*a*, 102*b*, while outer plates 102*a*, 102*b* shift along inner plates 104*a*, 104*b*, via exterior vertical rails (not visible in FIG. 1), to determine the distance between centering plates 110*a*, 110*b*. In some embodiments, lower assembly 118 may include any suitable number of pins 108*a*-108*h* that equals the number of slanted channels of inner plates 104*a*, 104*b* and the number of horizontal channels of outer plates 102*a*, 102*b*. Centering plates 110*a*, 110*b* are located in lower assembly 118 between inner plates 104*a*, 104*b* and above holding plate 112. As described above, centering plates 110*a*, 110*b* mechanically connect to inner plates 104*a*, 104*b* and outer plates 102*a*, 102*b* via pins 108*a*-108*h*. In some embodiments, centering plates 110*a*, 110*b* may be configured in a default closed position and require a user to depress actuators to separate the centering plates 110*a*, 110*b* and make room for a food item. When a user places a food item (e.g., a bagel, an English muffin, and the like) on holding plate 112 between centering plates 110*a*, 110*b*, the user may release the actuators to initiate a simultaneous movement of the plurality of pins 108*a*-108*h* and outer plates 102*a*, 102*b*, resulting in centering plates 110*a*, 110*b* converging along an x-y plane to secure the food item in a centered position such that blade 114 may evenly bisect the food item when upper assembly 116 engages with lower assembly 118.

Holding plate 112 is located at a lower interior portion of lower assembly 118 and includes a V-shaped nest, which is where the food item rests until being bisected by blade 114. It will be understood that the V-shaped nest of holding plate 112 aligns with interior vertical rails (not visible in FIG. 1) such that blade 114 follows a slicing path along the interior vertical rails to split the V-shaped nest in half. Protruding portions of holding plate 112 also serve as auxiliary components by supporting inner plates 104*a*, 104*b*. Blade 114 couples to an upper interior portion of upper assembly 116 and, when upper assembly 116 engages with lower assembly 118, fits into interior vertical rails (not visible in FIG. 1) of lower assembly 118 to follow a slicing path towards the V-shaped nest of holding plate 112. It will be understood that blade 114 exists along a y-z plane of lower assembly 118 congruent with the center of holding plate 112. In some embodiments, a user may place a food item on the V-shaped nest of holding plate 112, in which case, depending on the width of the food item, the user may release actuators to center the food item with centering plates 110*a*, 110*b* along the y-z plane of lower assembly 118 congruent with the center of holding plate 112. Once the user determines the food item is centered, the user engages upper assembly 116 with lower assembly 118 such that blade 114 evenly bisects the food item. In some embodiments, blade 114 may include any suitable serrated design edge to optimally bisect the food item, one of which may include an about 45° knife edge with about 50 percent cut depth to create the knife edge. It will be understood that the serrated edge design is symmetrical. It will be understood that the portion of blade 114 that fits into the interior vertical rails when the upper assembly 116 engages with the lower assembly 118 has a width of about 0.265 inches (about 0.6731 centimeter). In some embodiments, the dimensions of blade 114 may be dependent on the package configuration of the bagel slicing device, so blade 114 may be any suitable length, width, or height.

The blade 114 is not limited to that illustrated in the drawings. In some embodiments, the blade 114 includes at least one of a serrated cutting edge (e.g., a bread knife edge), a sharp cutting edge (e.g., a steak knife edge), an offset serrated cutting edge, a scalloped edge, a fully serrated edge, a partially serrated edge, a cutting edge with relatively smaller gullets, a cutting edge with relatively larger gullets, a cutting edge with a relatively greater number of points or teeth, a cutting edge with a relatively fewer number of points or teeth, a single bevel cutting edge, a chisel cutting edge, a double bevel cutting edge, combinations of the same, or the like. The cutting edge is disposed, in some embodiments, at any suitable angle, such as a substantially horizontal arrangement as shown for example in FIGS. 2A, 2B, 3, 5A, 6A, and 7A, such as less than about 30 degrees with respect to the horizontal as shown in FIGS. 8A, 8B, 8C, 9 and 10, or so as to create a substantially non-linear cutting edge (not shown).

Upper assembly 116 includes blade 114 and a safety mechanism (e.g., a guard) positioned at the bottom of upper assembly 116 (not visible in FIG. 1) to protect a user from injuring themself with the serrated edge of blade 114. If a user engages upper assembly 116 with lower assembly 118, upper assembly 116 encompasses a significant portion of the height of lower assembly 118 such that blade 114 slices a food item sitting in lower assembly 118 completely. In some embodiments, upper assembly 116 may further include an opening along its perimeter to enable cleaning of blade 114. It will be understood that upper assembly 116 may include additional components besides blade 114 and the safety mechanism. Lower assembly 118 includes outer plates 102*a*, 102*b*, inner plates 104*a*, 104*b*, the plurality of pins 108*a*-108*h*, centering plates 110*a*, 110*b*, interior vertical rails (not visible in FIG. 1), exterior vertical rails (not visible in FIG. 1), and holding plate 112. Lower assembly 118 receives upper assembly 116 such that blade 114 engages with the interior vertical rails of lower assembly 118 and follows a slicing path, along the y-axis of lower assembly 118, towards the center of holding plate 112 to bisect a food item. In some embodiments, lower assembly 118 may include a cosmetic cover that will hide the clamping mechanism (e.g., the centering plates) and prevent any pinch points. In some embodiments, lower assembly 118 may include additional components within its volume. The dimensions of the apparatus depicted in FIG. 1 are about 7.25 inches (about 18.41 centimeters)×about 7.25 inches (about 18.41 centimeters)×about 3.5 inches (about 8.89 centimeters). It will be understood that the dimensions of the bagel slicing device may be altered to any suitable configuration.

FIG. 2A shows a side section view of an engaged bagel slicing device along the device's y-z plane, in accordance with some embodiments of the present disclosure, while FIG. 2B shows a perspective view of the engaged bagel slicing device, in accordance with some embodiments of the present disclosure. FIG. 2A and FIG. 2B depict the configuration of outer plates 102*a*, 102*b* fitted on the exterior faces of inner plates 104*a*, 104*b*. FIG. 2B includes exterior vertical rails 202*b*, which allow outer plate 102*b*, in response to a user depressing or releasing one or more actuators, to maneuver up and down the back of inner plate 104*b*. It will be understood that another set of exterior verticals rails are embedded on the back of inner plate 104*a* to allow outer plate 102*a* to maneuver in a similar fashion. FIG. 2A and FIG. 2B also show the protruding portions of holding plate 112 supporting inner plates 104*a*, 104*b* within lower assembly 118. The depth at which blade 114 reaches within lower assembly 118 to ensure a complete, even bisection of a food item is portrayed by FIG. 2A and FIG. 2B as well. The perspective view in FIG. 2B shows how blade 114 couples to an upper interior portion of upper assembly 116 and fits into interior vertical rails of inner plates 104*a*, 104*b* to follow a slicing path towards the center of the V-shaped nest of holding plate 112. In FIG. 2B, a portion of the slanted channels of inner plate 104*a* are displayed, which show pins 108*b*, 108*d* respectively extending through them. Centering plate 110*a* is not included in FIG. 2B, but under normal conditions each of pins 108*b*, 108*d* connect to centering plate 110*a*, allowing centering plate 110*a*, in response to a user depressing or releasing one or more actuators, to move along the x-y plane of lower assembly 118 to either separate or converge with respect to centering plate 110*b*. The perspective view in FIG. 2B also shows the horizontal channels of outer plate 102*b*, which align with slanted channels of inner plate 104*b* (not visible in FIG. 2B) due to the movability of outer plate 102*b* along the exterior face of inner plate 104*b*, via exterior vertical rails 202*b*.

FIG. 3 shows a perspective view of a disengaged bagel slicing device, in accordance with some embodiments of the present disclosure. FIG. 3 includes safety mechanism 304 (e.g., a guard), positioned at the bottom of upper assembly 116, which significantly reduces the risk of a user injuring themself with the blade 114. Safety mechanism 304, which moves on pins and springs in the z-axis direction, includes an opening (not visible in FIG. 3, refer to FIGS. 8A-8C to see opening) that allows blade 114 to slide through when the upper assembly 116 is engaged with the lower assembly 118. Contrarily, when the upper assembly is disengaged from the lower assembly 118, as depicted below in FIG. 3, blade 114 is concealed behind the safety mechanism 304 and does not pose a threat to the user. FIG. 3 also depicts interior vertical rails 302*a*, 302*b*, which are embedded in inner plates 104*a*, 104*b*. Interior vertical rails 302*a*, 302*b* extend along the y-axis of the lower assembly 118 separated by the length of the V-shaped nest of holding plate 112. As described above, when upper assembly 116 engages with lower assembly 118, portions of blade 114 fit into interior vertical rails 302*a*, 302*b*, which guide blade 114 down a slicing path (e.g., along the y-axis of lower assembly 118) towards the center of holding plate 112.

FIG. 4 shows a side section view of an engaged bagel slicing device along the device's x-y plane, in accordance with some embodiments of the present disclosure. In FIG. 4, pins 108*a*-108*d* extend from centering plates 110*a*, 110*b* through the slanted channels of inner plate 104*a* and the horizontal channels of outer plate 102*a* (not visible in FIG. 4). It will be understood that pins 108*e*-108*h* extend from centering plates 110*a*, 110*b* out of the page through slanted channels of inner plate 104*b* and horizontal channels of outer plate 102*b*. In response to a user either depressing or releasing one or more actuators, pins 108*a*-108*d*, and accordingly centering plates 110*a*, 110*b*, move along the x-y plane of lower assembly 118 to either separate to make room for a food item or to converge to center a food item along the y-z plane of lower assembly 118 congruent with the center of holding plate 112. In some embodiments, when centering the food item within lower assembly 118, centering plates 110*a*, 110*b* may have a +/−one-sixteenth of an inch (about +/−0.16 centimeter) margin of error with respect to the center of holding plate 112. Blade 114, which extends along the y-z plane of lower assembly 118, evenly bisects the V-shaped nest of holding plate 112 nearly to its base, ensuring a complete cut of a food item sitting on the holding plate 112. In addition to blade 114, centering plates 110*a*, 110*b* also extend along the y-z plane of the lower assembly.

Figure 5A:
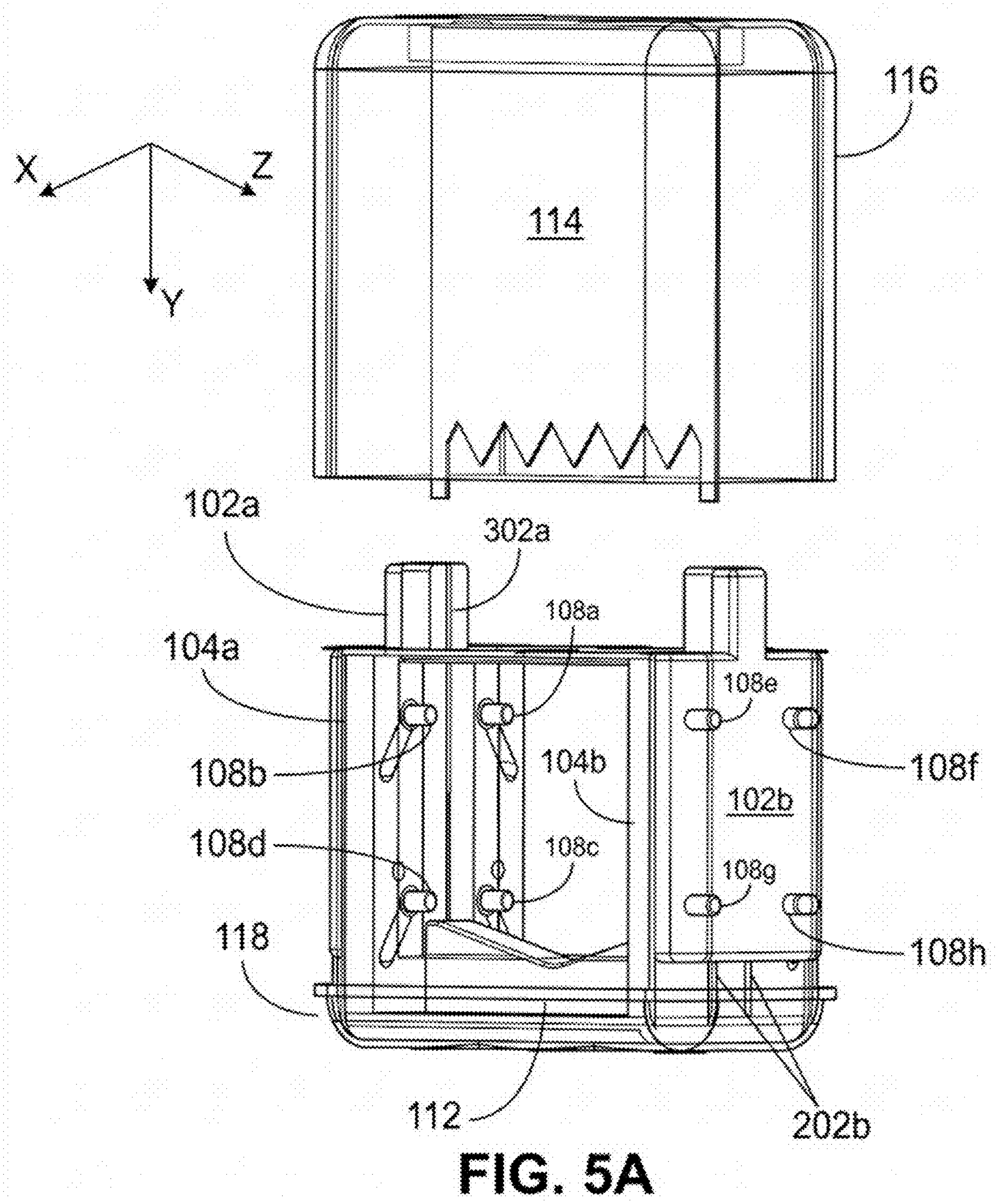
FIG. 5A shows a perspective view of a disengaged bagel slicing device, in accordance with some embodiments of the disclosure.
Figure 5B:
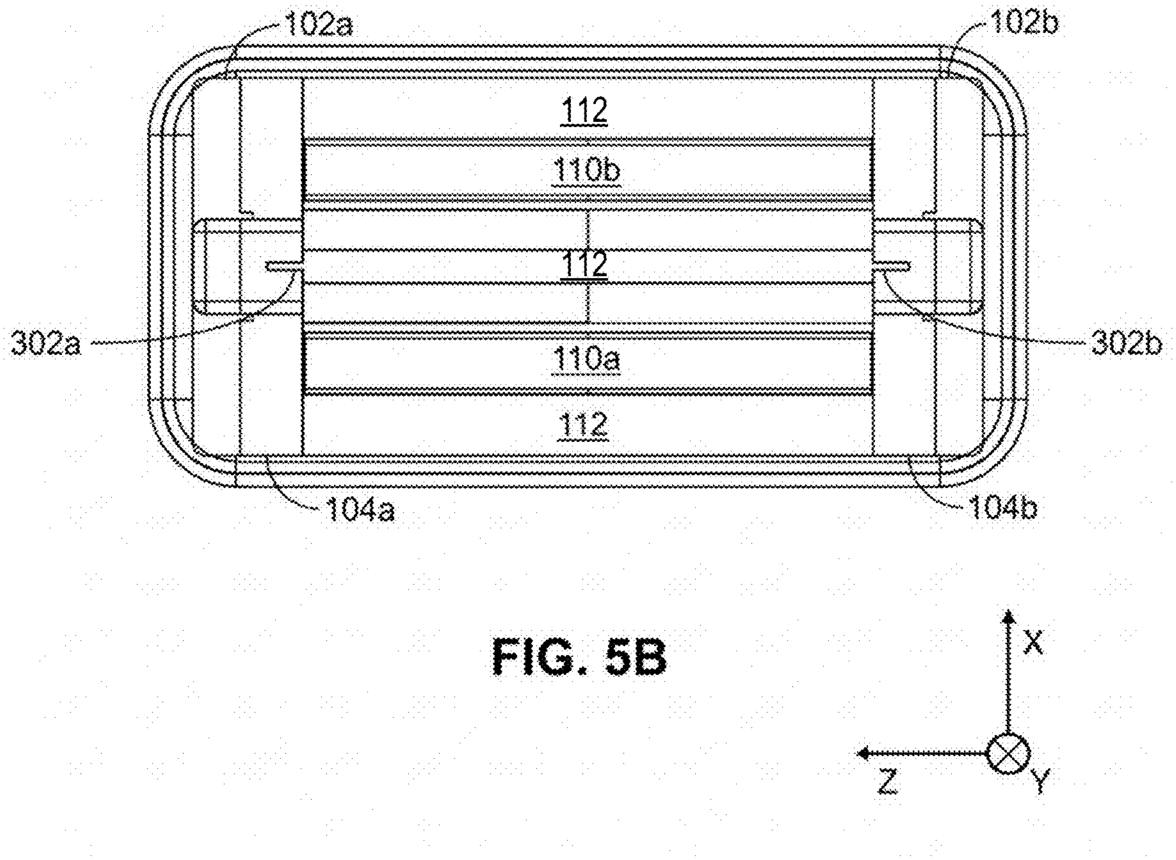
FIG. 5B shows a top section view of the disengaged bagel slicing device, in accordance with some embodiments of the disclosure.

FIG. 5A shows a perspective view of a disengaged bagel slicing device, in accordance with some embodiments of the present disclosure, while FIG. 5B shows a top section view of the disengaged bagel slicing device along the device's x-z plane, in accordance with some embodiments of the present disclosure. In FIG. 5A, the plurality of pins 108a-108h are positioned in a default closed position, which, in some embodiments, is maintained by a spring mechanism within lower assembly 118. The default closed position occurs when there is no food item in the lower assembly and/or the upper assembly 116 is disengaged from the lower assembly 118. FIG. 5B provides an aerial view of the corresponding position of the centering plates 110a, 110b when the plurality of pins 108a-108h are configured in the default closed position. It will be understood that in the default closed position the centering plates 110a, 110b are separated by a minimum distance of about 1 inch (about 2.54 centimeters).

Figure 6B:
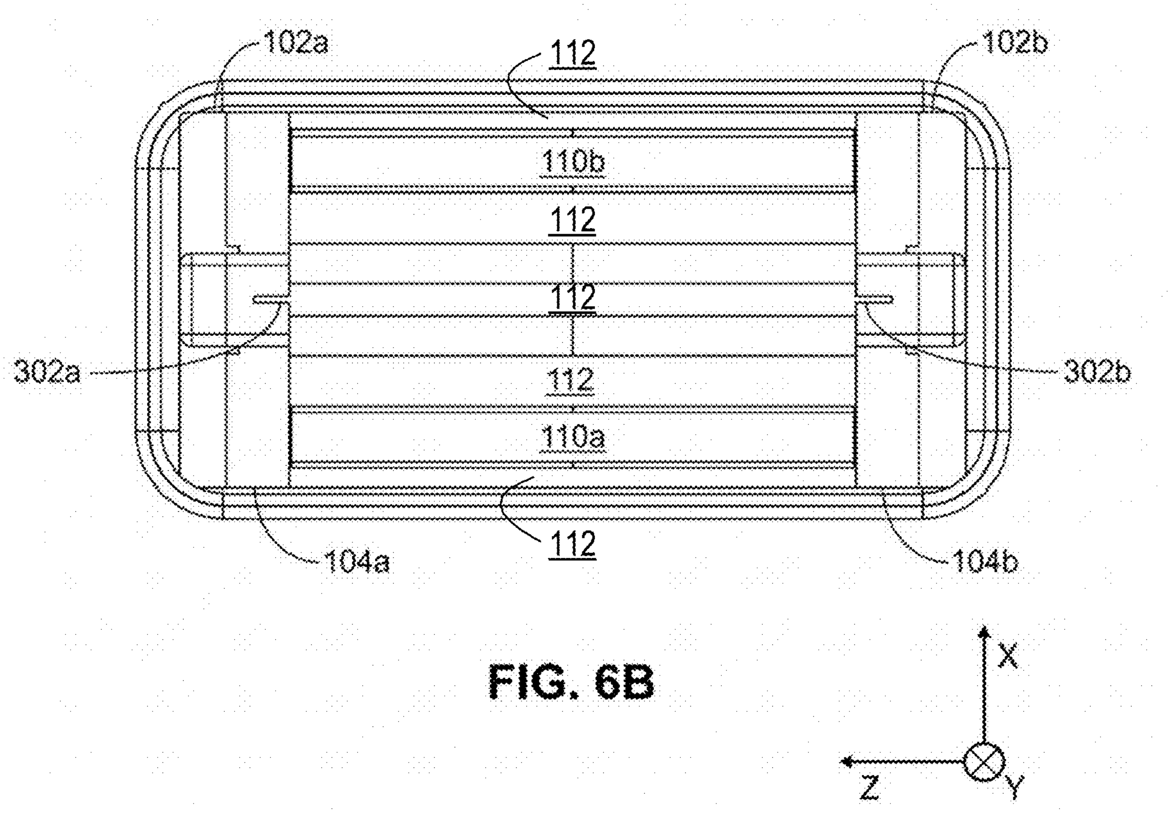
FIG. 6B shows a top section view of the disengaged bagel slicing device, in accordance with some embodiments of the disclosure.
Figure 6A:
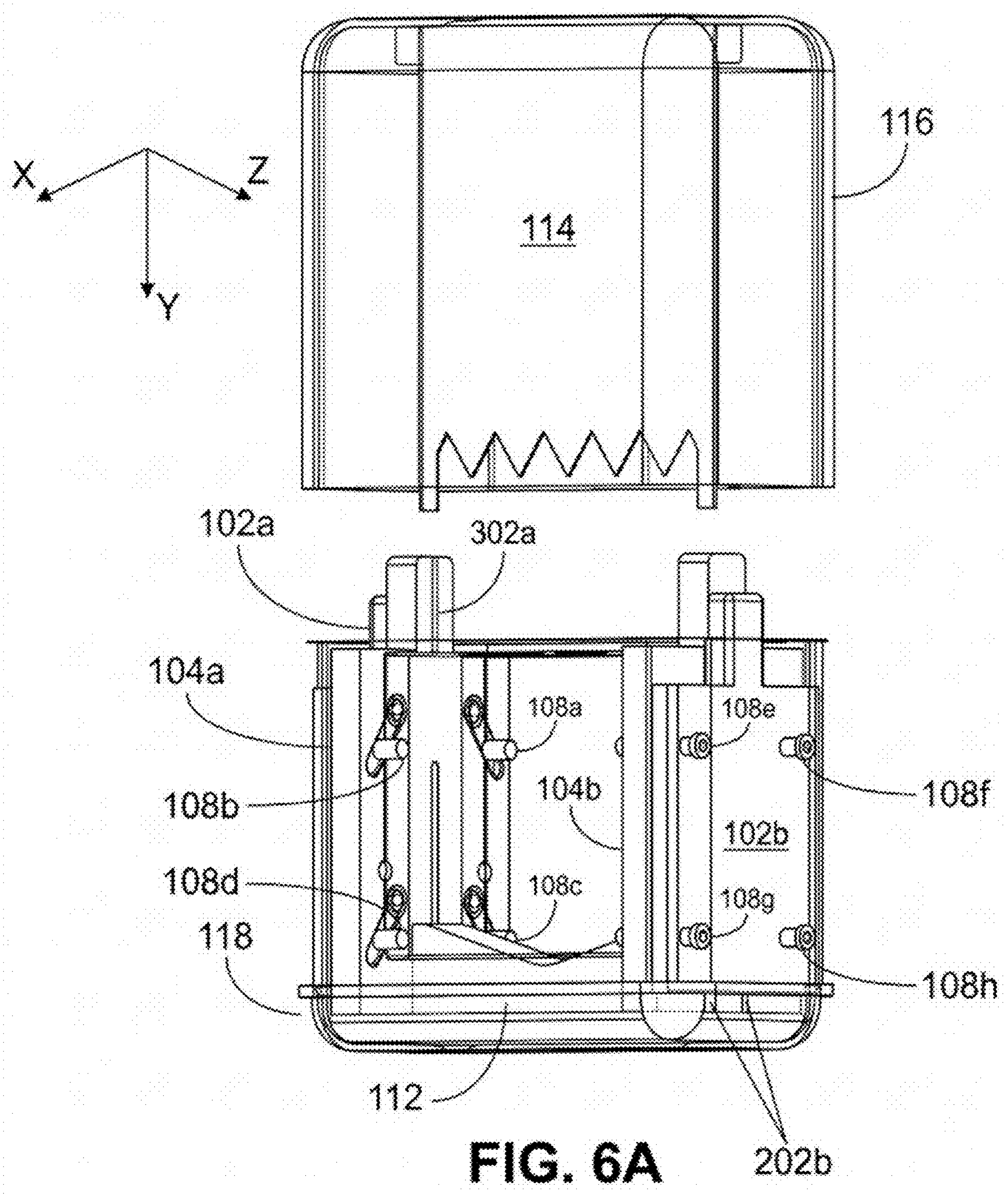
FIG. 6A shows a perspective view of a disengaged bagel slicing device, in accordance with some embodiments of the disclosure.

FIG. 6A shows a perspective view of a disengaged bagel slicing device, in accordance with some embodiments of the present disclosure, while FIG. 6B shows a top section view of the disengaged bagel slicing device along the device's x-z plane, in accordance with some embodiments of the present disclosure. In FIG. 6A, the plurality of pins 108a-108h are positioned in an intermediary position, which happens in response to a user depressing or releasing one or more actuators within the lower assembly 118. FIG. 6B provides an aerial view of the corresponding position of the centering plates 110a, 110b when the plurality of pins 108a-108h are configured in the intermediary position. It will be understood that in the intermediary position the centering plates 110a, 110b are separated by a distance between about 1 inch (about 2.54 centimeters) and about 2 inches (about 5.08 centimeters).

Figure 7A:
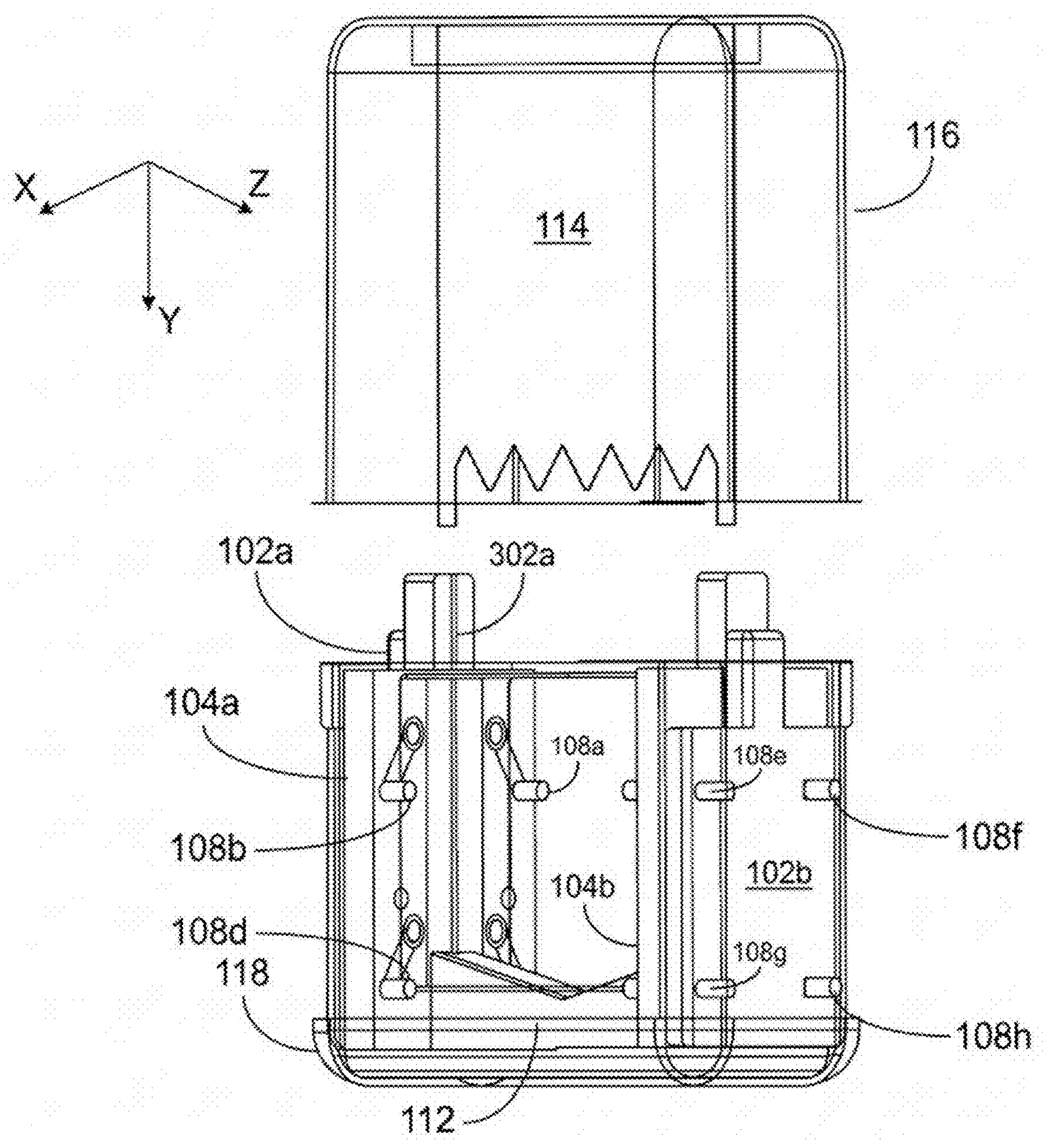
FIG. 7A shows a perspective view of a disengaged bagel slicing device, in accordance with some embodiments of the disclosure.
Figure 7B:
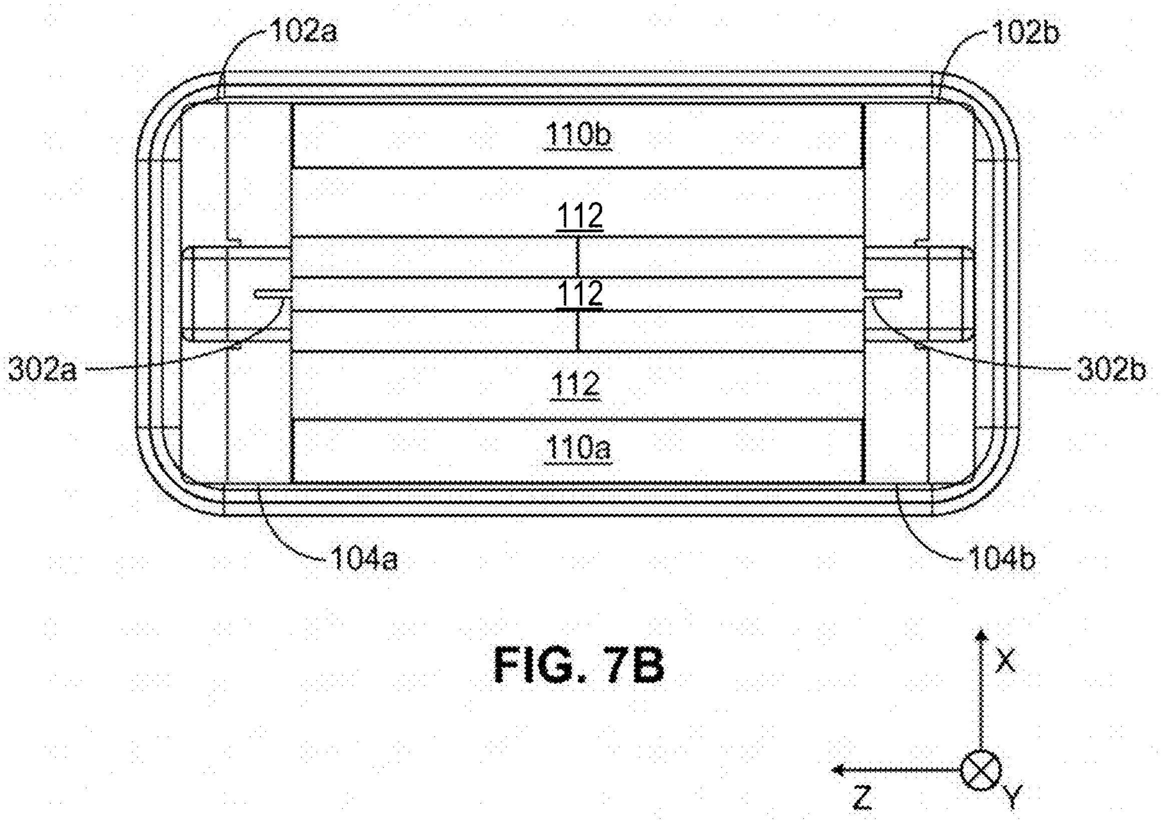
FIG. 7B shows a top section view of the disengaged bagel slicing device, in accordance with some embodiments of the disclosure.

FIG. 7A shows a perspective view of a disengaged bagel slicing device, in accordance with some embodiments of the present disclosure, while FIG. 7B shows a top section view of the disengaged bagel slicing device along the device's x-z plane, in accordance with some embodiments of the present disclosure. In FIG. 7A, the plurality of pins 108a-108h are positioned in an end position, which happens in response to a user depressing one or more actuators within lower assembly 118 to their limit. In some embodiments, a larger food item may be placed within lower assembly 118, in which case the plurality of pins 108a-108h, and accordingly centering plates 110a, 110b, may retain the position depicted in each of FIG. 7A and FIG. 7B to fit and center the larger food item. FIG. 7B provides an aerial view of the corresponding position of the centering plates 110a, 110b when the plurality of pins 108a-108h are configured in the end position. It will be understood that in the end position the centering plates 110a, 110b are separated by a maximum distance of about 2 inches (about 5.08 centimeters).

Figure 8A:
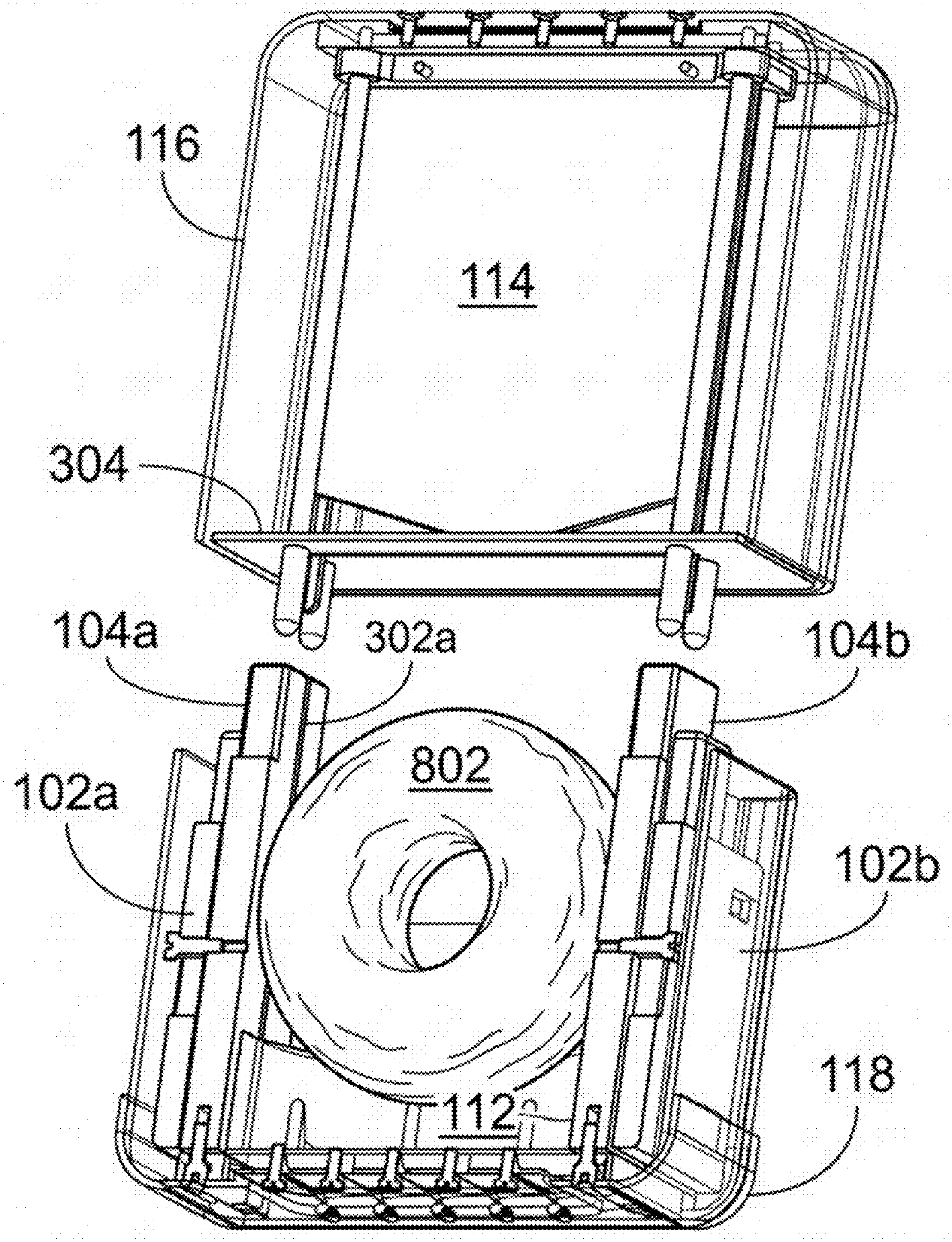
FIG. 8A shows a perspective view of a disengaged bagel slicing device, in accordance with some embodiments of the disclosure.
Figure 8B:
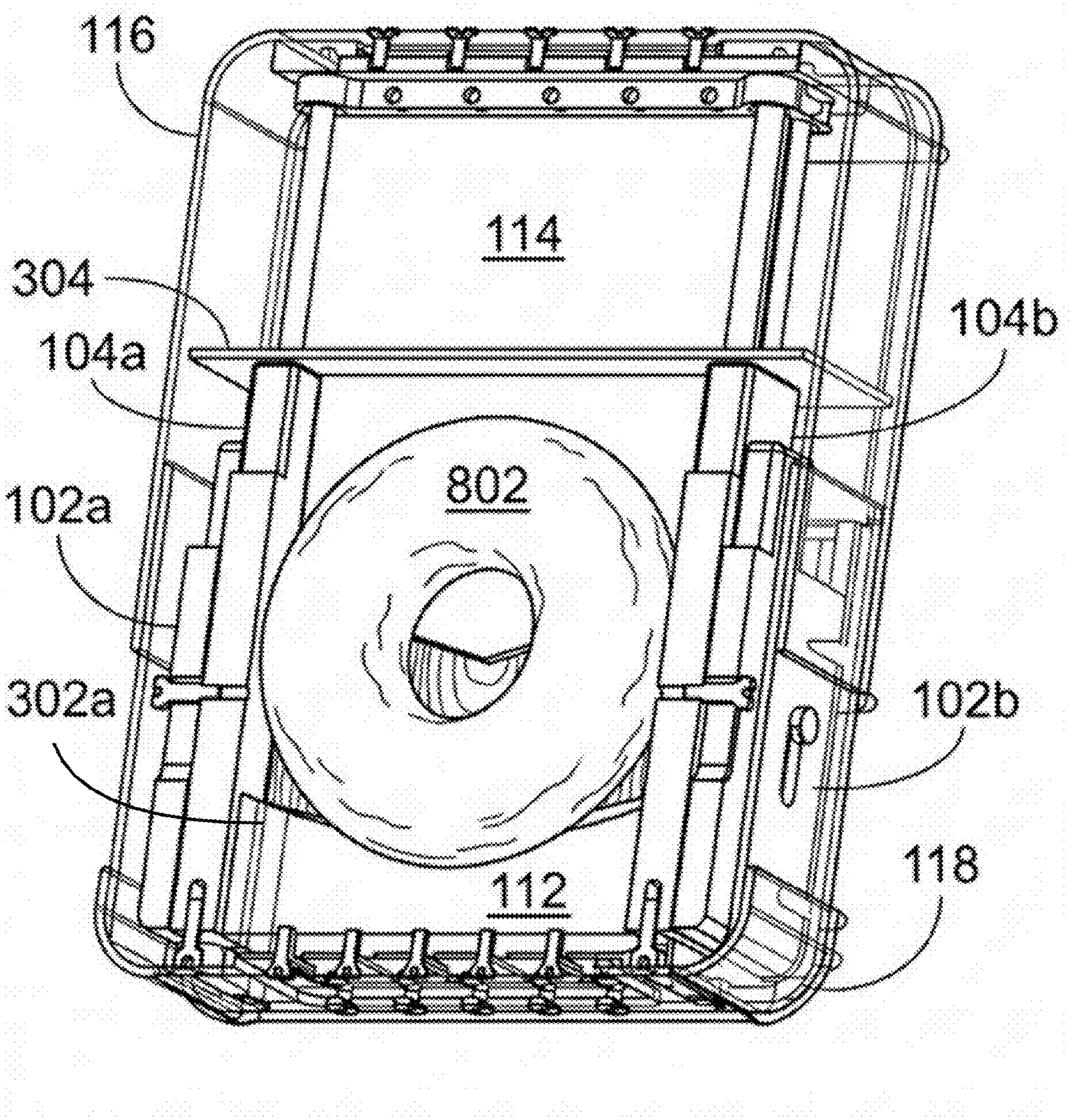
FIG. 8B shows a perspective view of a partially engaged bagel slicing device, in accordance with some embodiments of the disclosure.
Figure 8C:
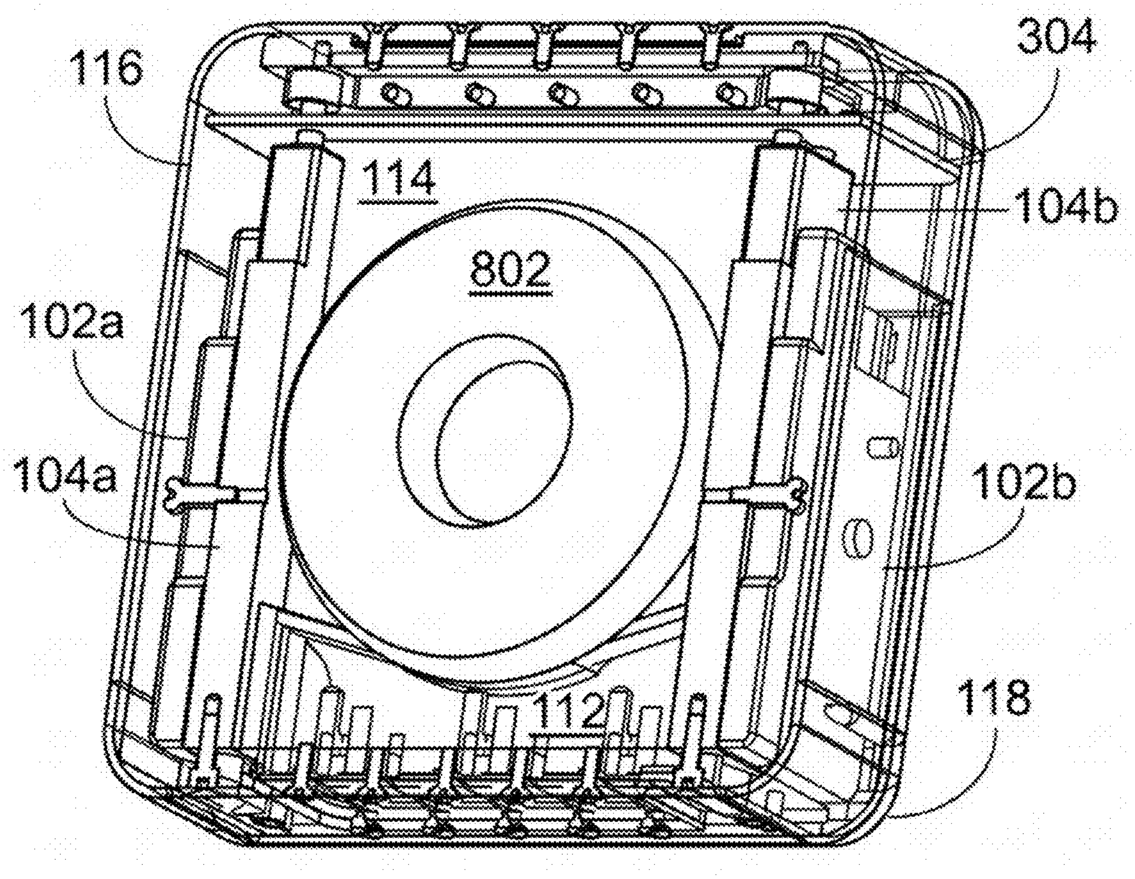
FIG. 8C shows a perspective view of a fully engaged bagel slicing device, in accordance with some embodiments of the disclosure.

FIG. 8A shows a perspective view of a disengaged bagel slicing device, in accordance with some embodiments of the present disclosure, FIG. 8B shows a perspective view of a partially engaged bagel slicing device, in accordance with some embodiments of the present disclosure, and FIG. 8C shows a perspective view of a fully engaged bagel slicing device, in accordance with some embodiments of the present disclosure. In FIG. 8A, blade 114 is fully concealed behind safety mechanism 304 due to upper assembly 116 being disengaged from lower assembly 118. Food item 802 sits atop the V-shaped nest of holding plate 112 within lower assembly 118, and centering plates 110a, 110b (not visible in FIG. 8A) adjust to ensure food item 802 is centered along the y-z plane of lower assembly 118 congruent with the center of holding plate 112. In FIG. 8B, as upper assembly 116 partially engages with lower assembly 118, blade 114 slides through an opening in safety mechanism 304 to fit into interior vertical rails 302a, 302b and follow a slicing path down the y-axis of lower assembly 118 towards the food item 802 sitting atop holding plate 112. It will be understood that safety mechanism 304 moves on pins and springs in the z-axis direction as upper assembly 116 engages with lower assembly 118. Blade 114 has begun to bisect food item 802 in this intermediary stage of the bagel slicing device. FIG. 8C depicts the full engagement between upper assembly 116 and lower assembly 118, as blade 114 has completed the slicing path along interior vertical rails 302a, 302b and, as a result, fully bisected food item 802.

Figure 9:
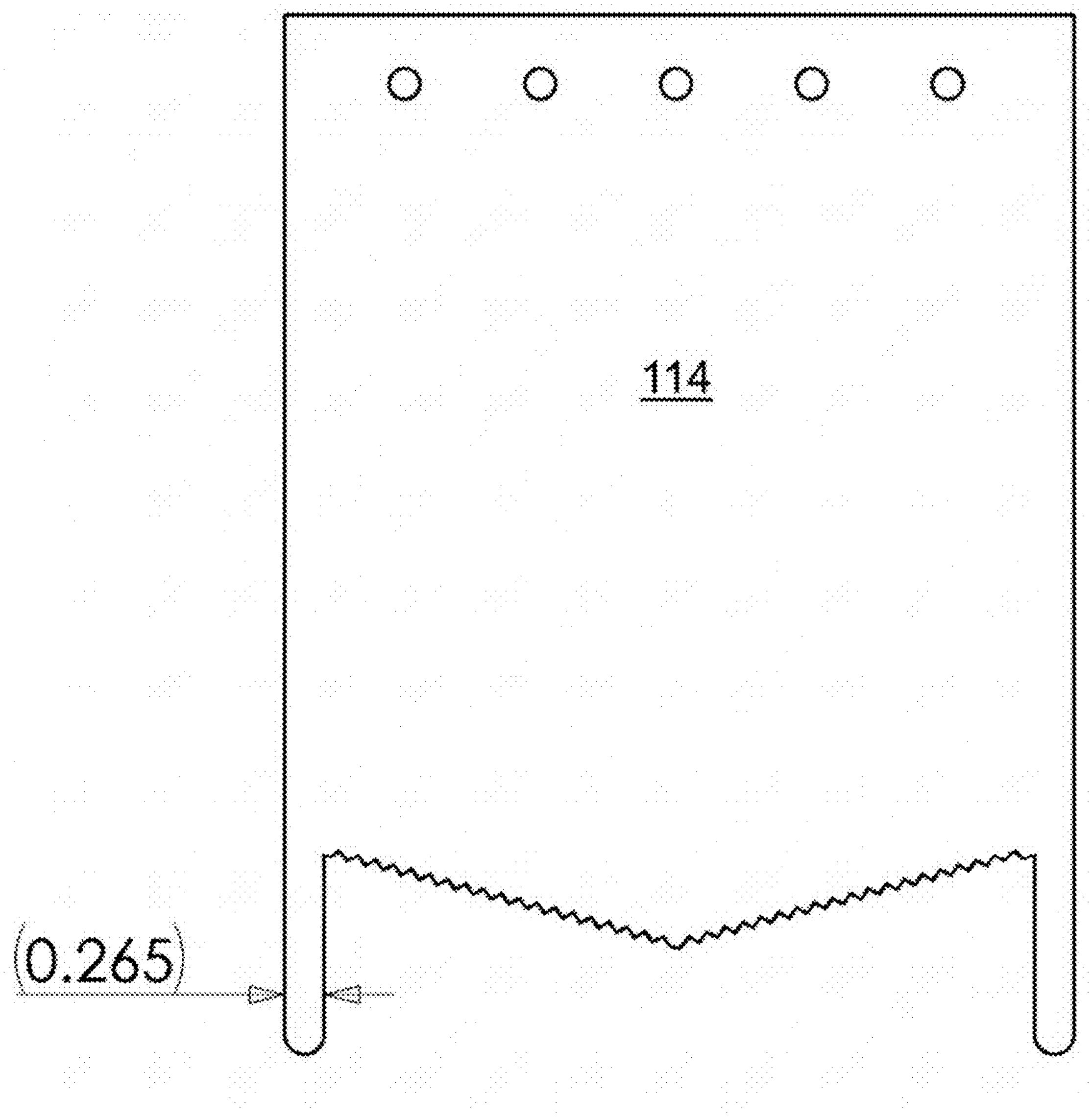
FIG. 9 shows a blade design with a first type of serrated edge for bisecting a food item within the lower assembly of the bagel slicing device, in accordance with some embodiments of the disclosure.
Figure 10:
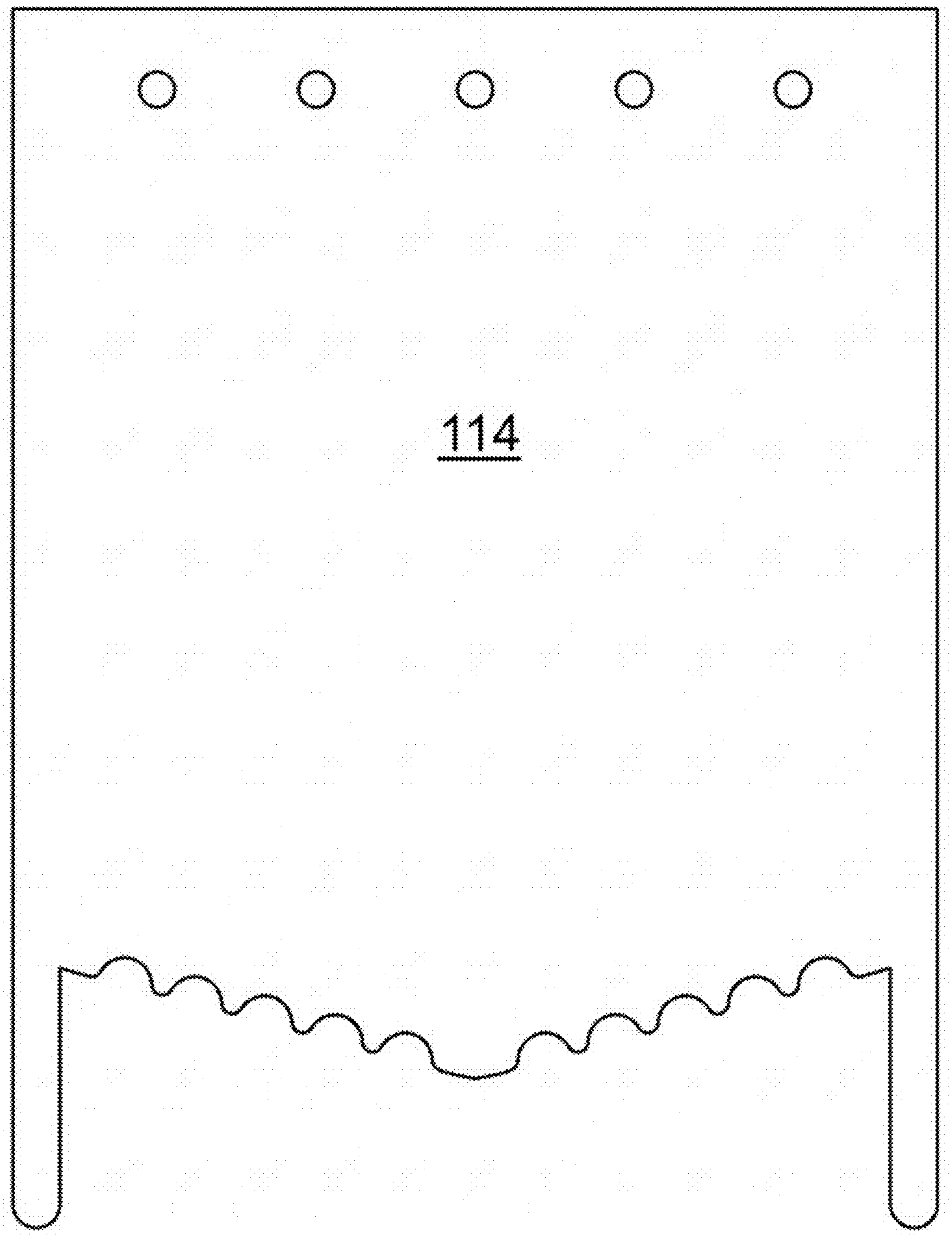
FIG. 10 shows a blade design with a second type of serrated edge for bisecting a food item within the lower assembly of the bagel slicing device, in accordance with some embodiments of the disclosure.

FIG. 9 and FIG. 10 each show a blade design with different serrated edges for bisecting a food item within the lower assembly of the bagel slicing device. FIG. 9 conveys that the portion of blade 114 that fits into the interior vertical rails of each inner plate has a width of approximately about 0.265 inches (about approximately 0.6731 centimeter). In some embodiments, the portion of blade 114 that engages with interior vertical rails of each inner plate may have any suitable width to allow blade 114 to follow a slicing path towards the center of the holding plate. As depicted by FIGS. 9 and 10, the serrated blade design disclosed herein may include multiple patterns and different blade serration shapes. In some embodiments, the blade may include an about 450 knife edge with 50 percent cut depth to create the knife edge. It will be understood that the serrated edge design is symmetrical. It will be understood that the dimensions of blade 114 may be dependent on the package configuration of the bagel slicing device, so blade 114 may be any suitable length, width, or height.

FIGS. 11A-19 show another bagel slicing device, in accordance with some embodiments of the present disclosure. An apparatus is described herein, where the apparatus includes an upper assembly, which further includes interior vertical rails and a blade affixed to the upper assembly within the interior vertical rails. In some embodiments, the apparatus includes a lower assembly, separable from the upper assembly, which further includes a holding plate configured to support a food item when placed within the lower assembly and movable centering plates configured to secure the food item in a position that lies substantially in the center of the lower assembly to facilitate a substantially even bisection of the food item when the upper assembly engages with the lower assembly. It will be understood that a food item "substantially in the center" of the lower assembly, as described herein, means the food item is aligned along a y-z plane of the lower assembly congruent with the center of a curved nest of the holding plate. In some embodiments, the alignment of the food item may include a +/−one-sixteenth of an inch (about +/−0.16 centimeter) margin of error. Consequently, the "substantially even bisection of the food item" may be susceptible to a +/−one-sixteenth of an inch (about +/−0.16 centimeter) margin of error. In some embodiments, the centering plates may be configured in a default closed position when the upper assembly is disengaged from the lower assembly. It will be understood, however, that the lower assembly may further include one or more actuators that, when depressed, cause the centering plates to separate from each other to make room for the food item. In some embodiments, in response to the food item being placed on the holding plate between the centering plates, releasing the one or more actuators may cause the centering plates to apply substantially similar amounts of force (e.g., along an x-y plane of the lower assembly) on the food item to substantially center the food item. In some embodiments, a spring mechanism may retain the default closed position of the centering plates at a minimum distance (e.g., about 0.7 inch (about 1.778 centimeters)) from each other. It will be understood that the centering plates have a range between them from about 0.7 inch (about 1.778 centimeters) to about 2.3 inches (about 5.842 centimeters).

In some embodiments, the lower assembly may further include a plurality of pins configured to couple the centering plates to a set of inner plates and one outer plate within the lower assembly such that each of the plurality of pins resides within corresponding channels of the set of inner plates and the outer plate that facilitates movement of the centering plates when one or more actuators is depressed or released. In some embodiments, the movement of the centering plates may include a movement of the plurality of pins along slanted channels of the set of inner plates, a movement of the outer plate along the corresponding inner plate, via vertical slide alignments, and a movement of the corresponding plurality of pins along horizontal channels of the outer plate. It will be understood that each of the plurality of pins has a diameter of about ¼-inch (about 0.635 centimeter). In some embodiments, the lower assembly may further include interior vertical rails such that the interior vertical rails of the upper assembly are configured to engage with the interior vertical rails of the lower assembly and the blade in the upper assembly will follow a slicing path that bisects the food item when the upper assembly engages with the lower assembly. In some embodiments, the lower assembly may further include a vertical slot down the center of the interior vertical rails configured to receive a regular kitchen knife for slicing food items without the use of the upper assembly.

In some embodiments, the holding plate may include a curved nest that contributes to holding and centering the food item within the lower assembly. It will be understood that the upper assembly and the lower assembly may be comprised of any suitable plastic (e.g., polycarbonate, acetal, and the like), metal, or alloy (e.g., stainless steel). It will also be understood that the blade may include a variety of serrated edge designs, one of which may include an about 33° to about 45° knife edge with about 100 percent cut depth to create the knife edge. It will be understood that the serrated edge design is symmetrical.

A method is disclosed herein, where the method includes depressing one or more actuators such that centering plates separate from each other within a lower assembly to make room for a food item and, in response to the food item being placed on a holding plate between the centering plates, releasing the one or more actuators to apply substantially similar amounts of force on the food item to substantially center the food item. In some embodiments, the lower assembly further includes a plurality of pins configured to couple the centering plates to a set of inner plates and one outer plate within the lower assembly such that each of the plurality of pins resides within corresponding channels of the set of inner plates and the outer plate that facilitates movement of the centering plates when the one or more actuators is depressed or released. In some embodiments, the movement of the centering plates may include a movement of the plurality of pins along slanted channels of the set of inner plates, a movement of the outer plate along the corresponding inner plate, via vertical slide alignments, and a movement of the corresponding plurality of pins along horizontal channels of the outer plate. It will be understood that a spring mechanism may retain a default closed position of the centering plates at a minimum distance from each other.

FIG. 11A shows an exploded view of a bagel slicing device, in accordance with some embodiments of the present disclosure. FIG. 11A illustrates a lower assembly 1118, a gate plug 1118*a*, an upper assembly 1116, a gate plug 1116*a*, an outer plate 1102, a left-hand inner plate 1104*a*, a right-hand inner plate 1104*b*, a centering plate 1110*a*, a centering plate 1110*b*, a blade 1114, and thread inserts 1199. The terms left-hand and right-hand are exemplary and somewhat arbitrary depending on viewpoint, and the device can be assembled in any suitable orientation for achieving the disclosed functionality. FIGS. 11B-11G illustrate various cross-sections, views, and details of the lower assembly 1118, the upper assembly 1116, the inner plate 1104*b*, the inner plate 1104*a*, the outer plate 1102, the centering plate 1110*a* (or the centering plate 1110*b*), respectively. FIGS. 12A-18C illustrate various cross-sections and views of the assembled device. FIG. 19 illustrates the blade 1114.

Outer plate 1102 is located on the immediate exterior surface of inner plate 1104*b* within lower assembly 1118 such that outer plate 1102 fits and slides along the back of inner plate 1104*b*, via vertical slide alignments 1202, resulting in the alignment of horizontal channels of outer plate 1102 with slanted channels of inner plate 1104*b*. Outer plate 1102, including horizontal channels, couples to inner plate 1104*b*, including slanted channels, via pins 1108*e*-1108*h* extending through the slanted channels of inner plate 1104*b* to the horizontal channels of outer plate 1102 to securely fasten the plates together. In some embodiments, outer plate 1102 may include any suitable number of horizontal channels that equals the number of slanted channels of inner plate 1104*b* and the number of pins 1108*e*-1108*h* extending therethrough. Inner plate 1104*b* is located on the immediate interior surface of outer plate 1102 within lower assembly 1118 such that outer plate 1102 fits and slides along the back of inner plate 1104*b*, via vertical slide alignments 1202. As described above, vertical slide alignments 1202 allow slanted channels of inner plate 1104*b* to align with horizontal channels of outer plate 1102, which enables pins 1108*e*-1108*h* to extend through inner plate 1104*b* and outer plate 1102 to securely fasten the plates together. That is, in some embodiments, the inner plate 1104*b* is not statically coupled with the outer plate 1102. Lower assembly 1118 includes interior vertical rails (not visible in FIG. 11A), which guide upper assembly 1116, including blade 1114, along a slicing path (e.g., a y-axis) towards the center of holding plate 1112 (see, FIG. 11B) when upper assembly 1116 engages with lower assembly 1118. In some embodiments, inner plates 1104*a*, 1104*b* may include any suitable number of slanted channels that equals the number of horizontal channels of outer plate 1102 and the number of pins 1108*a*-1108*h* extending therethrough. It will be understood that the slanted channels of inner plates 1104*a*, 1104*b* may be oriented at any suitable angle with respect to the horizontal channels of outer plate 1102. In some embodiments, the bagel slicing device may be used to bisect any suitable food item into equal halves. The upper assembly 1116 includes a gate plug 1116*a*, and the lower assembly 1118 includes a gate plug 1118*a*, in some embodiments.

Pins 1108*a*-1108*h* couple centering plates 1110*a*, 1110*b* (centering plate 1110*b* is not entirely visible in FIG. 11A) to inner plates 1104*a*, 1104*b* and outer plate 1102 by extending from the centering plates 1110*a*, 1110*b* through slanted channels of inner plates 1104*a*, 1104*b* and horizontal channels of outer plate 1102. A concurrent motion of pins 1108*a*-1108*h* and outer plate 1102 determines the distance between centering plates 1110*a*, 1110*b*, which may be any distance between the range of about 0.7 inch (about 1.778 centimeters) and about 2.3 inches (about 5.842 centimeters) to securely fit and center a food item sitting on holding plate 1112. In some embodiments, a user may depress or release one or more actuators (e.g., the top of outer plate 1102) to initiate the movement of centering plates 1110*a*, 1110*b*. Each of the plurality of pins 1108*a*-1108*h* moves along slanted channels of inner plates 1104*a*, 1104*b* and horizontal channels of outer plate 1102, while outer plate 1102 shifts along inner plate 1104*b*, via vertical slide alignments 1202, to determine the distance between centering plates 1110*a*, 1110*b*. In some embodiments, lower assembly 1118 may include any suitable number of pins 1108*a*-1108*h* that equals the number of slanted channels of inner plates 1104*a*, 1104*b* and the number of horizontal channels of outer plate 1102. Centering plates 1110*a*, 1110*b* are located in lower assembly 1118 between inner plates 1104*a*, 1104*b* and above holding plate 1112. As described above, centering plates 1110*a*, 1110*b* mechanically connect to inner plates 1104*a*, 1104*b* and outer plate 1102 via pins 1108*a*-1108*h*. In some embodiments, centering plates 1110*a*, 1110*b* may be configured in a default closed position and require a user to depress actuators to separate the centering plates 1110*a*, 1110*b* and make room for a food item. When a user places a food item (e.g., a bagel, an English muffin, and the like) on holding plate 1112 between centering plates 1110*a*, 1110*b*, the user may release the actuators to initiate a simultaneous movement of the plurality of pins 1108*a*-1108*h* and outer plate 1102, resulting in centering plates 1110*a*, 1110*b* converging along an x-y plane to secure the food item in a centered position such that blade 1114 may evenly bisect the food item when upper assembly 1116 engages with lower assembly 1118.

Holding plate 1112 is located at a lower interior portion of lower assembly 1118 and includes a curved nest, which is where the food item rests until being bisected by blade 1114 or a kitchen knife. The device is configured in some embodiments, to include features that accommodate insertion of a kitchen knife. Alternatively, the device is configured in other embodiments, to exclude features that accommodate insertion of a kitchen knife so that the cutting is solely performed by the blade 1114. It will be understood that the curved nest of holding plate 1112 aligns with interior vertical rails of lower assembly 1118 (not visible in FIG. 11A) such that upper assembly 1116, including blade 1114, follows a slicing path along the interior vertical rails of lower assembly 1118 to split the curved nest in half Blade 1114 is affixed to upper assembly 1116 within the interior vertical rails of upper assembly 1116 (not visible in FIG. 11A) and, when upper assembly 1116 engages with lower assembly 1118, follows a slicing path towards the curved nest of holding plate 1112. It will be understood that blade 1114 exists along a y-z plane of lower assembly 1118 congruent with the center of holding plate 1112. In some embodiments, a user may place a food item on the curved nest of holding plate 1112, in which case, depending on the width of the food item, the user may release actuators to center the food item with centering plates 1110*a*, 1110*b* along the y-z plane of lower assembly 1118 congruent with the center of holding plate 1112. Once the user determines the food item is centered, the user engages upper assembly 1116 with lower assembly 1118 such that blade 1114 evenly bisects the food item. In some embodiments, blade 1114 may include any suitable serrated design edge to optimally bisect the food item, one of which may include an about 33° to about 450 knife edge with about 100 percent cut depth to create the knife edge. It will be understood that the serrated edge design is symmetrical. In some embodiments, the dimensions of blade 1114 may be dependent on the package configuration of the bagel slicing device, so blade 1114 may be any suitable length, width, or height.

The blade 1114 is not limited to that illustrated in the drawings. In some embodiments, the blade 1114 includes at least one of a serrated cutting edge (e.g., a bread knife edge), a sharp cutting edge (e.g., a steak knife edge), an offset serrated cutting edge, a scalloped edge, a fully serrated edge, a partially serrated edge, a cutting edge with relatively smaller gullets, a cutting edge with relatively larger gullets, a cutting edge with a relatively greater number of points or teeth, a cutting edge with a relatively fewer number of points or teeth, a single bevel cutting edge, a chisel cutting edge, a double bevel cutting edge, combinations of the same, or the like. The cutting edge is disposed, in some embodiments, at any suitable angle, such as a substantially horizontal arrangement (not shown), such as between about 30 to 60 degrees with respect to the horizontal as shown in FIGS. 11A, 12A, 12B, 13, 15A, 16A, 17A, 18A, 18B, 18C, and 19, or so as to create a substantially non-linear cutting edge (not shown).

Upper assembly 1116 includes blade 1114 and interior vertical rails (not visible in FIG. 11A). If a user engages upper assembly 1116 with lower assembly 1118, upper assembly 1116 encompasses a significant portion of the height of lower assembly 1118 such that blade 1114 slices a food item sitting in lower assembly 1118 completely. It will be understood that upper assembly 1116 may include additional components besides blade 1114 and interior vertical rails. Lower assembly 1118 includes outer plate 1102, inner plates 1104*a*, 1104*b*, the plurality of pins 1108*a*-1108*h*, centering plates 1110*a*, 1110*b*, interior vertical rails (not visible in FIG. 11A), a vertical slot down the center of the interior vertical rails, vertical slide alignments 1202, and holding plate 1112. Lower assembly 1118 receives upper assembly 1116, including blade 1114, such that the interior vertical rails of upper assembly 1116 engage with the interior vertical rails of lower assembly 1118, and blade 1114 follows a slicing path, along the y-axis of lower assembly 1118, towards the center of holding plate 1112 to bisect a food item. In some embodiments, lower assembly 1118 may include additional components within its volume. The dimensions of the apparatus depicted in FIG. 11A are about 7.00 inches (about 17.78 centimeters)×about 6.25 inches (about 15.88 centimeters)×about 2.75 inches (about 6.985 centimeters). It will be understood that the dimensions of the bagel slicing device may be altered to any suitable configuration. Fasteners may be provided to join features of the device. For example, as shown in FIG. 11A, thread inserts 1199 (e.g., SPRIOL No. 150526, made of brass) are provided to join the lower assembly 1118 with one or more other structures of the device.

FIG. 12A shows a side section view of an engaged bagel slicing device along the device's y-z plane, in accordance with some embodiments of the present disclosure, while FIG. 12B shows a perspective view of the engaged bagel slicing device, in accordance with some embodiments of the present disclosure. FIG. 12A and FIG. 12B depict the configuration of outer plate 1102 fitted on the exterior face of inner plate 1104*b*. FIG. 12B includes vertical slide alignments 1202, which allow outer plate 1102, in response to a user depressing or releasing one or more actuators, to maneuver up and down the back of inner plate 1104*b*. The depth at which blade 1114 reaches within lower assembly 1118 to ensure a complete, even bisection of a food item is portrayed by FIG. 12A and FIG. 12B as well. The perspective view in FIG. 12B shows how blade 1114 is affixed to upper assembly 1116, and how the interior vertical rails of upper assembly 1116 fit into the interior vertical rails of lower assembly 1118 such that blade 1114 follows a slicing path towards the center of the curved nest of holding plate 1112. In FIG. 12B, a portion of the slanted channels of inner plate 1104*b* are displayed, which show pins 1108*g*, 1108*h* respectively extending through them. Each of pins 1108*g*, 1108*h* connect to centering plates 1110*a*, 1110*b* (not visible in FIG. 12B), allowing centering plates 1110*a*, 1110*b*, in response to a user depressing or releasing one or more actuators, to move along the x-y plane of lower assembly 1118 to either separate or converge. The perspective view in FIG. 12B also shows the horizontal channels of outer plate 1102, which align with slanted channels of inner plate 1104*b* due to the movability of outer plate 1102 along the exterior face of inner plate 1104*b*, via vertical slide alignments 1202.

FIG. 13 shows a perspective view of a disengaged bagel slicing device, in accordance with some embodiments of the present disclosure. FIG. 13 depicts interior vertical rails 1302*a*, 1302*b*, which are embedded in, and extend along the y-axis of, lower assembly 1118. As described above, when upper assembly 1116 engages with lower assembly 1118, interior vertical rails 1302*c*, 1302*d* of upper assembly 1116 fit into interior vertical rails 1302*a*, 1302*b* of lower assembly 1118, which guides blade 1114 down a slicing path (e.g., along the y-axis of lower assembly 1118) towards the center of holding plate 1112.

FIG. 14 shows a side section view of an engaged bagel slicing device along the device's x-y plane, in accordance with some embodiments of the present disclosure. In FIG. 14, pins 1108*e*-1108*h* extend from centering plates 1110*a*, 1110*b* through the slanted channels of inner plate 1104*b* and the horizontal channels of outer plate 1102. It will be understood that pins 1108*a*-1108*d* extend from centering plates 1110*a*, 1110*b* out of the page through slanted channels of inner plate 1104*a*. In response to a user either depressing or releasing one or more actuators, pins 1108*a*-1108*h*, and accordingly centering plates 1110*a*, 1110*b*, move along the x-y plane of lower assembly 1118 to either separate to make room for a food item or to converge to center a food item along the y-z plane of lower assembly 1118 congruent with the center of holding plate 1112. In some embodiments, when centering the food item within lower assembly 1118, centering plates 1110*a*, 1110*b* may have a +/−one-sixteenth of an inch (about +/−0.16 centimeter) margin of error with respect to the center of holding plate 1112. Blade 1114 (not visible in FIG. 14), which extends along the y-z plane of lower assembly 1118, evenly bisects the curved nest of holding plate 1112 nearly to its base, ensuring a complete cut of a food item sitting on the holding plate 1112. In addition to blade 1114, centering plates 1110*a*, 1110*b* also extend along the y-z plane of the lower assembly.

FIG. 15A shows a perspective view of a disengaged bagel slicing device, in accordance with some embodiments of the present disclosure, while FIG. 15B shows a top section view of the disengaged bagel slicing device along the device's x-z plane, in accordance with some embodiments of the present disclosure. In FIG. 15A, the plurality of pins 1108*a*-1108*h* (not all visible in FIG. 15A, FIG. 15B) are positioned in a default closed position, which, in some embodiments, is maintained by a spring mechanism within lower assembly 1118. The default closed position occurs when there is no food item in the lower assembly. FIG. 15B provides an aerial view of the corresponding position of the centering plates 1110*a*, 1110*b* when the plurality of pins 1108*a*-1108*h* are configured in the default closed position. It will be understood that in the default closed position the centering plates 1110*a*, 1110*b* are separated by a minimum distance of about 0.7 inch (about 1.778 centimeters).

FIG. 16A shows a perspective view of an engaged bagel slicing device, in accordance with some embodiments of the present disclosure, while FIG. 16B shows a top section view of the engaged bagel slicing device along the device's x-z plane, in accordance with some embodiments of the present disclosure. In FIG. 16A, the plurality of pins 1108*a*-1108*h* (not all visible in FIG. 16A, FIG. 16B) are positioned in an intermediary position, which happens in response to a user depressing or releasing one or more actuators within lower assembly 1118. FIG. 16B provides an aerial view of the corresponding position of the centering plates 1110*a*, 1110*b* when the plurality of pins 1108*a*-1108*h* are configured in the intermediary position. It will be understood that in the intermediary position the centering plates 1110*a*, 1110*b* are separated by a distance between about 0.7 inch (about 1.778 centimeters) and about 2.3 inches (about 5.842 centimeters).

FIG. 17A shows another perspective view of an engaged bagel slicing device, in accordance with some embodiments of the present disclosure, while FIG. 17B shows a top section view of the engaged bagel slicing device along the device's x-z plane, in accordance with some embodiments of the present disclosure. In FIG. 17A, the plurality of pins 1108*a*-1108*h* (not all visible in FIG. 17A, FIG. 17B) are positioned in an end position, which happens in response to a user depressing one or more actuators within lower assembly 1118 to their limit. In some embodiments, a larger food item may be placed within lower assembly 1118, in which case the plurality of pins 1108*a*-1108*h*, and accordingly centering plates 1110*a*, 1110*b*, may retain the position depicted in each of FIG. 17A and FIG. 17B to fit and center the larger food item. FIG. 17B provides an aerial view of the corresponding position of the centering plates 1110*a*, 1110*b* when the plurality of pins 1108*a*-1108*h* are configured in the end position. It will be understood that in the end position the centering plates 1110*a*, 1110*b* are separated by a maximum distance of about 2.3 inches (about 5.842 centimeters).

FIG. 18A shows a perspective view of a disengaged bagel slicing device, in accordance with some embodiments of the present disclosure, FIG. 18B shows a perspective view of a partially engaged bagel slicing device, in accordance with some embodiments of the present disclosure, and FIG. 18C shows a perspective view of a fully engaged bagel slicing device, in accordance with some embodiments of the present disclosure. In FIG. 18A, food item sits atop the curved nest of holding plate 1112 within lower assembly 1118, and centering plates 1110*a*, 1110*b* (not visible in FIG. 18A) adjust to ensure food item is centered along the y-z plane of lower assembly 1118 congruent with the center of holding plate 1112. In FIG. 18B, as interior vertical rails of upper assembly 1116 partially engage with interior vertical rails of lower assembly 1118, blade 1114 follows a slicing path down the y-axis of lower assembly 1118 towards the food item sitting atop holding plate 1112. Blade 1114 has begun to bisect food item in this intermediary stage of the bagel slicing device. FIG. 18C depicts the full engagement between upper assembly 1116 and lower assembly 1118, as blade 1114 has completed the slicing path along interior vertical rails 302*a*, 302*b* and, as a result, fully bisected food item.

FIG. 19 shows a blade design for bisecting a food item within the lower assembly of the bagel slicing device. The serrated blade design disclosed herein may include multiple patterns and different blade serration shapes. In some embodiments, the blade may include an about 330 to about 450 knife edge with about 100 percent cut depth to create the knife edge. It will be understood that the serrated edge design is symmetrical. It will be understood that the dimensions of blade 1114 may be dependent on the package configuration of the bagel slicing device, so blade 1114 may be any suitable length, width, or height.

FIG. 20 shows a perspective view of a disengaged bagel slicing device, in accordance with some embodiments of the disclosure. FIG. 20 shows two vertical springs 1204 that load outer plate 1102, also attached to inner plate 1104*b*, to convert the vertical spring energy to horizontal energy thru the horizontal channels to the slanted channels to compress centering plates 1110*a*, 1110*b*.

Terminology

The terminology used herein is for the purpose of describing particular embodiments only and is not intended to be limiting of the disclosure.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The structures, devices, and methods discussed herein are intended to be illustrative and not limiting. One skilled in the art would appreciate that the actions of the processes discussed herein may be omitted, modified, combined, and/or rearranged, and any additional actions may be performed without departing from the scope of the invention. More generally, the disclosure herein is meant to provide examples and is not limiting. Only the claims that follow are meant to set bounds as to what the present disclosure includes. Furthermore, it should be noted that the features and limitations described in any some embodiments may be applied to any other embodiment herein, and examples relating to some embodiments may be combined with any other embodiment in a suitable manner, done in different orders, or done in parallel. It should also be noted that the structures, devices, and methods described herein may be applied to, or used in accordance with, other structures, devices, and methods.

This specification discloses embodiments, which include, but are not limited to, the following items:

Item 1. An apparatus, comprising:

an upper assembly, comprising:

an upper interior portion; and a blade affixed to the upper interior portion; and a lower assembly, separable from the upper assembly, comprising:

a holding plate configured to support a food item when placed within the lower assembly; and movable centering plates configured to secure the food item in a position that lies substantially in the center of the lower assembly to facilitate a substantially even bisection of the food item when the upper assembly engages with the lower assembly.

Item 2. The apparatus of item 1, wherein the centering plates are configured in a default closed position when the upper assembly is disengaged from the lower assembly, and wherein the lower assembly further comprises one or more actuators that, when depressed, cause the centering plates to separate from each other to define a space for the food item.

Item 3. The apparatus of item 2, wherein, in response to the food item being placed on the holding plate between the centering plates, releasing the one or more actuators causes the centering plates to apply substantially similar amounts of force on the food item to substantially center the food item.

Item 4. The apparatus of item 2, wherein a spring mechanism retains the default closed position of the centering plates at a minimum distance from each other.

Item 5. The apparatus of item 1, wherein the lower assembly further comprises a plurality of pins configured to couple the centering plates to a set of outer plates and a set of inner plates within the lower assembly, and wherein each of the plurality of pins resides within corresponding channels of the set of outer plates and the set of inner plates that facilitates movement of the centering plates when one or more actuators is depressed or released.

Item 6. The apparatus of item 5, wherein the movement of the centering plates comprises:

a movement of the plurality of pins along slanted channels of the set of inner plates;

a movement of the set of outer plates along the set of inner plates, via exterior vertical rails; and a movement of the plurality of pins along horizontal channels of the set of outer plates.

Item 7. The apparatus of item 5, wherein each of the plurality of pins has a diameter of about ¼-inch (about 0.635 centimeter).

Item 8. The apparatus of item 1, wherein the lower assembly further comprises interior vertical rails, and wherein the blade is configured to engage with the interior vertical rails in the lower assembly and follow a slicing path that bisects the food item when the upper assembly engages with the lower assembly.

Item 9. The apparatus of item 1, further comprising a safety mechanism positioned at the bottom of the upper assembly, wherein the blade slides through an opening in the safety mechanism when the upper assembly engages with the lower assembly.

Item 10. The apparatus of item 9, wherein the blade is concealed behind the safety mechanism when the upper assembly is disengaged from the lower assembly.

Item 11. The apparatus of item 9, wherein the safety mechanism includes a guard.

Item 12. The apparatus of item 1, wherein the holding plate comprises a V-shaped nest.

Item 13. The apparatus of item 1, wherein a distance between the centering plates has a range from about 1 inch (about 2.54 centimeters) to about 2 inches (about 5.08 centimeters).

Item 14. The apparatus of item 1, further comprising an opening along the perimeter of the upper assembly to enable cleaning of the blade and a cosmetic cover along the perimeter of the lower assembly to hide the movable centering plates and prevent pinch points.

Item 15. The apparatus of item 1, wherein the upper assembly and the lower assembly are comprised of at least one of a plastic, a metal, or an alloy.

Item 16. The apparatus of item 1, wherein the blade includes a serrated edge design with an about 45-degree knife edge and an about 50 percent cut depth, and wherein the serrated edge design is symmetrical.

Item 17. The apparatus of item 1, wherein the lower assembly includes at least one slot configured to receive insertion of an external cutting tool and configured to guide a cutting motion of the external cutting tool.

Item 18. The apparatus of item 1, wherein the movable centering plates configured to secure the food item in the position that lies substantially in the center of the lower assembly to facilitate the substantially even bisection of the food item when the upper assembly engages with the lower assembly are configured to align the food item within a margin of error of about +/−one-sixteenth of an inch (about +/−0.16 centimeter).

Item 19. A method, comprising:

depressing one or more actuators such that centering plates separate from each other within a lower assembly to define a space for a food item; and in response to the food item being placed on a holding plate between the centering plates, releasing the one or more actuators to apply substantially similar amounts of force on the food item to substantially center the food item.

Item 20. The method of item 19, wherein the lower assembly further comprises a plurality of pins configured to couple the centering plates to a set of outer plates and a set of inner plates within the lower assembly, and wherein each of the plurality of pins resides within corresponding channels of the set of outer plates and the set of inner plates that facilitates movement of the centering plates when the one or more actuators is depressed or released.

Item 21. The method of item 20, wherein the movement of the centering plates comprises:

a movement of the plurality of pins along slanted channels of the set of inner plates;

a movement of the set of outer plates along the set of inner plates, via exterior vertical rails; and a movement of the plurality of pins along horizontal channels of the set of outer plates.

Item 22. The method of item 21, wherein a spring mechanism retains a default closed position of the centering plates at a minimum distance from each other.

Item 23. The method of item 19, wherein the lower assembly includes at least one slot configured to receive insertion of an external cutting tool and configured to guide a cutting motion of the external cutting tool, the method comprising:

receiving insertion of the external cutting tool; and guiding the cutting motion of the external cutting tool.

Item 24. The method of item 19, wherein the movable centering plates configured to secure the food item in the position that lies substantially in the center of the lower assembly to facilitate the substantially even bisection of the food item when the upper assembly engages with the lower assembly are configured to align the food item within a margin of error of about +/−one-sixteenth of an inch (about +/−0.16 centimeter).

Item 25. An apparatus, comprising:

an upper assembly, comprising:

interior vertical rails; and a blade affixed to the upper assembly within the interior vertical rails; and a lower assembly, separable from the upper assembly, comprising:

a holding plate configured to support a food item when placed within the lower assembly;

movable centering plates configured to secure the food item in a position that lies substantially in the center of the lower assembly to facilitate a substantially even bisection of the food item when the upper assembly engages with the lower assembly; and interior vertical rails containing a vertical slot down the center configured to receive an external cutting device for slicing food items.

Item 26. The apparatus of item 25, wherein the centering plates are configured in a default closed position when there is no food item in the lower assembly, and wherein the lower assembly further comprises one or more actuators that, when depressed, cause the centering plates to separate from each other to define a space for the food item.

Item 27. The apparatus of item 26, wherein, in response to the food item being placed on the holding plate between the centering plates, releasing the one or more actuators causes the centering plates to apply substantially similar amounts of force on the food item to substantially center the food item.

Item 28. The apparatus of item 26, wherein a spring mechanism retains the default closed position of the centering plates at a minimum distance from each other.

Item 29. The apparatus of item 25, wherein the lower assembly further comprises a plurality of pins configured to couple the centering plates to a set of inner plates and one outer plate within the lower assembly, and wherein each of the plurality of pins resides within corresponding channels of the set of inner plates and the outer plate that facilitates movement of the centering plates when one or more actuators is depressed or released.

Item 30. The apparatus of item 29, wherein the movement of the centering plates comprises:

a movement of the plurality of pins along slanted channels of the set of inner plates;

a movement of the outer plate along the corresponding inner plate, via vertical slide alignments; and a movement of the plurality of pins along horizontal channels of the outer plate.

Item 31. The apparatus of item 29, wherein each of the plurality of pins has a diameter of about ¼-inch (about 0.635 centimeter).

Item 32. The apparatus of item 25, wherein the lower assembly further comprises interior vertical rails, and wherein the interior vertical rails of the upper assembly are configured to engage with the interior vertical rails of the lower assembly such that the blade in the upper assembly follows a slicing path that bisects the food item when the upper assembly engages with the lower assembly.

Item 33. The apparatus of item 25, wherein the holding plate comprises a curved nest.

Item 34. The apparatus of item 25, wherein a distance between the centering plates has a range from about 0.125 inch (about 0.32 centimeters) to about 2.3 inches (about 5.842 centimeters).

Item 35. The apparatus of item 25, wherein the upper assembly and the lower assembly are comprised of at least one of a plastic, a metal, or an alloy.

Item 36. The apparatus of item 25, wherein the blade includes a serrated edge design with an about 33 degree to about 45 degree knife edge and an about 100 percent cut depth, and wherein the serrated edge design is symmetrical.

Item 37. The apparatus of item 25, wherein the lower assembly includes at least one slot configured to receive insertion of an external cutting tool and configured to guide a cutting motion of the external cutting tool.

Item 38. The apparatus of item 25, wherein the movable centering plates configured to secure the food item in the position that lies substantially in the center of the lower assembly to facilitate the substantially even bisection of the food item when the upper assembly engages with the lower assembly are configured to align the food item within a margin of error of about +/−one-sixteenth of an inch (about +/−0.16 centimeter).

Item 39. A method for an apparatus comprising an upper assembly having interior vertical rails, and a blade; and a lower assembly having a holding plate, movable centering plates, and interior vertical rails containing a vertical slot down the center configured to receive an external cutting device, the method comprising:

depressing one or more actuators such that the centering plates separate from each other within the lower assembly to define a space for a food item; and in response to the food item being placed on a holding plate between the centering plates, releasing the one or more actuators to apply substantially similar amounts of force on the food item to substantially center the food item.

Item 40. The method of item 39, wherein the lower assembly further comprises a plurality of pins configured to couple the centering plates to a set of inner plates and one outer plate within the lower assembly, and wherein each of the plurality of pins resides within corresponding channels of the set of inner plates and the outer plate that facilitates movement of the centering plates when the one or more actuators is depressed or released.

Item 41. The method of item 40, wherein the movement of the centering plates comprises:

a movement of the plurality of pins along slanted channels of the set of inner plates;

a movement of the outer plate along the corresponding inner plate, via vertical slide alignments; and a movement of the plurality of pins along horizontal channels of the outer plate.

Item 42. The method of item 39, wherein a spring mechanism retains a default closed position of the centering plates at a minimum distance from each other.

Item 43. The method of item 39, wherein the lower assembly includes at least one slot configured to receive insertion of an external cutting tool and configured to guide a cutting motion of the external cutting tool, the method comprising:

receiving insertion of the external cutting tool; and guiding the cutting motion of the external cutting tool.

Item 44. The method of item 39, wherein the movable centering plates configured to secure the food item in the position that lies substantially in the center of the lower assembly to facilitate the substantially even bisection of the food item when the upper assembly engages with the lower assembly are configured to align the food item within a margin of error of about +/−one-sixteenth of an inch (about +/−0.16 centimeter).

Item 45. A device for an upper assembly and a lower assembly for an item, the device comprising:

a blade movable via the upper assembly;

a holding plate movable via the lower assembly, wherein the holding plate is configured to hold the item;

a centering device engageable via movement of the upper assembly relative to the lower assembly, wherein the centering device is configured to hold and secure the item; and an actuator configured to receive a force and engage the centering device to receive the item, wherein the actuator is configured, upon release of the force, to engage and hold the item in a cutting position for cutting by the blade.

Item 46. The device of item 45 comprising a spring mechanism configured to hold the centering plates at a minimum distance apart.

Item 47. The device of item 45 comprising a plurality of pins configured to connect the centering plates to at least one of the upper assembly or the lower assembly and configured to permit movement of the centering plates.

Item 48. The device of item 45 comprising a guidance mechanism operatively coupled to the lower assembly, wherein the guidance mechanism is configured to permit the blade to cut the item.

Item 49. The device of item 45, wherein the centering device is configured to secure the item in a position that lies substantially in a center of the device to facilitate a substantially even bisection of the item, and wherein the centering device is configured to align the item within a margin of error of about +/−one-sixteenth of an inch (about +/−0.16 centimeter).

Item 50. A method of cutting an item with a device having an upper assembly and a lower assembly, the method comprising:

providing a blade movable via the upper assembly;

providing a holding plate movable via the lower assembly, wherein the holding plate is configured to hold the item;

providing a centering device engageable via movement of the upper assembly relative to the lower assembly, wherein the centering device is configured to hold and secure the item; and providing an actuator configured to receive a force and engage the centering device to receive the item, wherein the actuator is configured, upon release of the force, to engage and hold the item in a cutting position for cutting by the blade.

Item 51. The method of item 50 comprising providing a spring mechanism configured to hold the centering plates at a minimum distance apart.

Item 52. The method of item 50 comprising providing a plurality of pins configured to connect the centering plates to at least one of the upper assembly or the lower assembly and configured to permit movement of the centering plates.

Item 53. The method of item 50 comprising providing a guidance mechanism operatively coupled to the lower assembly, wherein the guidance mechanism is configured to permit the blade to cut the item.

Item 54. The method of item 50, wherein the centering device is configured to secure the item in a position that lies substantially in a center of the device to facilitate a substantially even bisection of the item, and wherein the centering device is configured to align the item within a margin of error of about +/−one-sixteenth of an inch (about +/−0.16 centimeter).

This description is to be taken only by way of example and not to otherwise limit the scope of the embodiments herein. Therefore, it is the object of the appended claims to cover all such variations and modifications as come within the true spirit and scope of the embodiments herein.

What is claimed is:

1. An apparatus for cutting a food item, comprising:

an upper assembly, comprising:

interior vertical rails; and a blade affixed to the upper assembly within the interior vertical rails; and a lower assembly, separable from the upper assembly, comprising:

a holding plate configured to support the food item when placed within the lower assembly;

movable centering plates configured to secure the food item in a position that lies substantially in a center of the lower assembly to facilitate a substantially even bisection of the food item when the upper assembly engages with the lower assembly; and a plurality of pins configured to couple the movable centering plates to at least two inner plates and an outer plate within the lower assembly, wherein:

each of the plurality of pins resides within at least one of corresponding channels of the at least two inner plates and the outer plate, the movable centering plates are configured to move when actuated, at least one pin of the plurality of pins is configured to move along a slanted channel of the channels of one of the at least two inner plates, the outer plate is configured to move along the at least two inner plates, via vertical slide alignments, and the at least one pin of the plurality of pins is configured to move along a horizontal channel of the channels of the outer plate.

2. The apparatus of claim 1, wherein the movable centering plates are configured in a default closed position when there is no food item in the lower assembly, and wherein the lower assembly further comprises one or more actuators that, when depressed, cause the movable centering plates to separate from each other to define a space for the food item.

3. The apparatus of claim 2, wherein, in response to the food item being placed on the holding plate between the movable centering plates, the apparatus is configured to release the one or more actuators, wherein the release causes the movable centering plates to apply substantially equal amounts of force on the food item to substantially center the food item.

4. The apparatus of claim 2, wherein a pair of springs retains the default closed position of the movable centering plates at a minimum distance from each other.

5. The apparatus of claim 1, wherein the lower assembly further comprises interior vertical rails, and wherein the interior vertical rails of the upper assembly are configured to engage with the interior vertical rails of the lower assembly such that the blade in the upper assembly follows a slicing path that bisects the food item when the upper assembly engages with the lower assembly.

6. The apparatus of claim 1, wherein the lower assembly includes at least one slot configured to receive insertion of an external cutting device and configured to guide a cutting motion of the external cutting device.

7. The apparatus of claim 1, wherein the movable centering plates configured to secure the food item in the position that lies substantially in the center of the lower assembly to facilitate the substantially even bisection of the food item when the upper assembly engages with the lower assembly are configured to center the food item with respect to a center of the holding plate within a margin of error of about +/−one-sixteenth of an inch.

8. The apparatus of claim 1, further comprising a safety guard that covers the blade when the upper and lower assemblies are disengaged.

9. A method for cutting a food item, the method using an apparatus, the apparatus comprising an upper assembly having interior vertical rails, and a blade; and a lower assembly having a holding plate, movable centering plates, and a plurality of pins configured to couple the movable centering plates to at least two inner plates and an outer plate within the lower assembly, the method comprising:

depressing one or more actuators such that the movable centering plates separate from each other within the lower assembly to define a space for the food item; and in response to the food item being placed on the holding plate between the movable centering plates, releasing the one or more actuators to apply substantially equal amounts of force on the food item to substantially center the food item, wherein:

each of the plurality of pins resides within at least one of corresponding channels of the at least two inner plates and the outer plate that facilitates movement of the movable centering plates when the one or more actuators is depressed or released, and the movement of the movable centering plates comprises:

a movement of at least one pin of the plurality of pins along a slanted channel of the channels of one of the at least two inner plates, a movement of the outer plate along the at least two inner plates, via vertical slide alignments, and the movement of the at least one pin of the plurality of pins along a horizontal channel of the channels of the outer plate.

10. The method of claim 9, wherein a pair of springs retains a default closed position of the movable centering plates at a minimum distance from each other.

11. The method of claim 9, wherein the lower assembly includes at least one slot configured to receive insertion of an external cutting device and configured to guide a cutting motion of the external cutting device, the method further comprising:

receiving insertion of the external cutting device; and guiding the cutting motion of the external cutting device.

12. The method of claim 9, wherein the movable centering plates configured to secure the food item in a position that lies substantially in a center of the lower assembly to facilitate the substantially even bisection of the food item when the upper assembly engages with the lower assembly are configured to center the food item with respect to a center of the holding plate within a margin of error of about +/−one-sixteenth of an inch.

13. The method of claim 9, further comprising positioning the food item in a V-shaped or curved nest of the holding plate before centering.

14. A device for an upper assembly and a lower assembly for cutting an item, the device comprising:

a blade movable via the upper assembly;

a holding plate movable via the lower assembly, wherein the holding plate is configured to hold the item;

a centering assembly configured to be engageable via movement of the upper assembly relative to the lower assembly, wherein the centering assembly is configured to hold and secure the item;

an actuator configured to receive a force and engage the centering assembly to receive the item, wherein the actuator is configured, upon release of the force, to engage and hold the item in a cutting position for cutting by the blade; and a plurality of connectors configured to couple the centering assembly to an inner plate and an outer plate within the lower assembly, wherein:

each of the plurality of connectors resides within at least one of corresponding receivers of the inner plate and the outer plate, the centering assembly is configured to move when the actuator is depressed or released, at least one connector of the plurality of connectors is configured to move along at least one of the receivers of the inner plate, the outer plate is configured to move along the inner plate, via at least one sliding interface oriented in a first direction, and the at least one connector of the plurality of connectors is configured to move along at least one of the receivers of the outer plate, wherein at least one of the receivers of the outer plate is oriented in a second direction different than the first direction.

15. The device of claim 14, wherein the centering assembly comprises a pair of centering plates, and wherein the device comprises a pair of springs configured to hold each of the pair of centering plates at a minimum distance apart.

16. The device of claim 15, wherein the plurality of connectors comprises a plurality of pins configured to connect the centering plates to at least one of the upper assembly or the lower assembly and configured to permit the movement of the centering plates.

17. The device of claim 14 further comprising a guidance assembly configured to be operatively coupled to the lower assembly, wherein the guidance assembly is configured to permit the blade to cut the item.

18. The device of claim 14, wherein the centering assembly is configured to secure the item in a position that lies substantially in a center of the device to facilitate a substantially even bisection of the item, and wherein the centering assembly is configured to align the item within a margin of error of about +/−one-sixteenth of an inch.

19. The device of claim 14, wherein the centering assembly is configurable for a minimum plate spacing of about 0.125 inch.

20. The device of claim 14, wherein the lower assembly further comprises a vertical slot configured to receive an external cutting device for slicing the item.

* * * * *